(12) United States Patent
Takenaka et al.

(10) Patent No.: US 7,120,518 B2
(45) Date of Patent: Oct. 10, 2006

(54) DEVICE FOR GENERATING MOTION OF LEGGED MOBILE ROBOT

(75) Inventors: Toru Takenaka, Wako (JP); Takashi Matsumoto, Wako (JP); Tadaaki Hasegawa, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 187 days.

(21) Appl. No.: 10/476,153

(22) PCT Filed: Apr. 25, 2002

(86) PCT No.: PCT/JP02/04135

§ 371 (c)(1),
(2), (4) Date: Oct. 27, 2003

(87) PCT Pub. No.: WO02/087832

PCT Pub. Date: Nov. 7, 2002

(65) Prior Publication Data

US 2004/0143369 A1 Jul. 22, 2004

(30) Foreign Application Priority Data

Apr. 27, 2001 (JP) ............................. 2001-133621

(51) Int. Cl.
*G06F 19/00* (2006.01)
(52) U.S. Cl. ............... 700/245; 700/247; 700/249; 700/250; 700/252; 700/253; 700/258; 318/568.1; 318/568.11; 318/568.15; 318/568.16; 318/568.17; 901/1; 901/33; 901/47; 901/48

(58) Field of Classification Search ................ 700/245
See application file for complete search history.

(56) References Cited

U.S. PATENT DOCUMENTS 5,459,659 A  10/1995  Takenaka
6,289,265 B1  9/2001  Takenaka et al.

FOREIGN PATENT DOCUMENTS

| EP | 856457 A | 2/1998 |
|---|---|---|
| EP | 1120203 A | 4/1999 |
| JP | 05-337849 | 12/1993 |
| JP | 11-300660 | 11/1999 |

*Primary Examiner*—Thomas G. Black
*Assistant Examiner*—McDieunel Marc
(74) *Attorney, Agent, or Firm*—Squire, Sanders and Dempsey, LLP

(57) ABSTRACT

A model's ZMP (full-model's ZMP) is calculated using a dynamic model (inverse full-model) $100c2$ that expresses a relationship between a robot movement and floor reaction, a ZMP-converted value of full model's corrected moment about a desired ZMP is calculated or determined based on a difference (full-model ZMP's error) between the calculated model's ZMP and the desired ZMP, whilst a corrected desired body position is calculated or determined. Since the robot posture is corrected by the calculated ZMP-converted value and the corrected desired body position, the corrected gait can satisfy the dynamic equilibrium condition accurately.

59 Claims, 45 Drawing Sheets

DEVICE FOR GENERATING MOTION OF LEGGED MOBILE ROBOT

TECHNICAL FIELD TO WHICH THE INVENTION RELATES TO

The present invention relates to a motion generation system of a legged mobile robot, and more particularly to a system for generating or determining a motion of a legged mobile robot and to control the robot to follow up the generated motion.

BACKGROUND ART OF THE INVENTION

The gait of a legged mobile robot has hitherto been generated by trial and error using a strict dynamic model of the legged mobile robot. As a result, it has been difficult to generate a gait on a real-time basis. For that reason, the applicant proposes, in Japanese Laid-Open Patent Application No. Hei 10 (1998)-86081, conducting gait generation freely by converting a set of standard gaits, designed with the use of an off-line computer, into a set of time-series data including parameters and a body trajectory to be stored in a memory of a microcomputer mounted on a robot, and by calculating a weighted average of instantaneous values of individual gaits whose parameters relating to time such as a walking period are the same.

However, since a gait is calculated through approximation in the proposed technique, the generated gait fails, occasionally, to satisfy the dynamic equilibrium condition. It should be noted here that the "dynamic equilibrium condition" indicates a situation where a ZMP determined from the gravity and inertial force of a desired gait using a strict dynamic model (that expresses behavior of the robot strictly) is equal to a desired ZMP. To be more specifically, it indicates a situation where horizontal component of a moment produced about the desired ZMP by the resultant force of the determined inertial force and gravity of the robot using a strict dynamic model (that expresses behavior of the robot strictly) is zero. ("walking robot and artificial foot" (written by M. Vukobratovic and translated by Kato and Yamashita); published on 1975 by The Nikkan Kogyo Shimbun Kabushiki Kaisha).

DISCLOSURE OF THE INVENTION

A first object of the present invention is to eliminate the drawback of the above-mentioned technique proposed by the applicant, and to provide a motion generation system of legged mobile robot, in which a generated motion in a gait and the like can satisfy the dynamic equilibrium condition with accuracy.

A second object of the present invention is to provide a motion control system of legged mobile robot, in which a generated motion in a gait and the like can satisfy the dynamic equilibrium condition with accuracy, and can improve posture stability of the robot by controlling the robot to follow up the generated motion.

In order to achieve the first and second objects, the present invention provides a system for generating an instantaneous value of motion including walking of a legged mobile robot having at least a body and a plurality of legs each connected to the body, when the robot performs the motion, comprising: provisional instantaneous value determining means for determining provisional instantaneous values of a desired movement and a desired floor reaction force or ZMP that constitute the motion; model floor reaction force calculating means for calculating a model's floor reaction force or ZMP based on at least the determined provisional instantaneous value of the desired movement, using a dynamic model that expresses a relationship between the movement of the robot and a floor reaction force or ZMP; difference calculating means for calculating a difference between the calculated model's floor reaction force and the determined provisional instantaneous value of the desired floor reaction force, or a difference between the calculated model's ZMP and the determined provisional instantaneous value of the desired ZMP; and desired instantaneous value determining means for determining desired instantaneous values of the desired movement and the desired floor reaction force, by correcting at least the provisional instantaneous value of the desired movement based on at least the calculated difference.

Since the system is arranged such that, provisional instantaneous values of a desired movement and a desired floor reaction force or ZMP that constitute the motion are determined, a model's floor reaction force or ZMP is then calculated based on the determined provisional instantaneous value of the desired movement, using a dynamic model that expresses a relationship between the movement of the robot and a floor reaction force or ZMP, a difference between the calculated model's floor reaction force and the determined provisional instantaneous value of the desired floor reaction force, or a difference between the calculated model's ZMP and the determined provisional instantaneous value of the desired ZMP is then calculated; and desired instantaneous values of the desired movement and the desired floor reaction force are determined, by correcting at least the provisional instantaneous value of the desired movement based on the calculated difference. With this, the system can generate a motion such as a gait that satisfies the dynamic equilibrium condition accurately, and can improve the stability during walking or operation.

Further, in order to achieve the second object, the present invention provides a system for generating a motion including walking of a legged mobile robot having at least a body and a plurality of legs each connected to the body, comprising: desired movement determining means for determining a desired movement that defines the motion; desired floor reaction force calculating means for calculating a desired floor reaction force based on at least the determined desired movement, using a dynamic model that expresses a relationship between the movement of the robot and a floor reaction force; and floor reaction force controlling means for controlling the floor reaction force actually acting on the robot based on at least the calculated floor reaction force.

Since the system is arranged such that, a desired movement that defines the motion is determined, a desired floor reaction force is then calculated based on the determined desired movement, using a dynamic model that expresses a relationship between the movement of the robot and a floor reaction force, and the floor reaction force actually acting on the robot is controlled based on the calculated floor reaction force. With this, the system can generate a motion such as a gait that satisfies the dynamic equilibrium condition accurately, and can improve the posture stability, by controlling the robot to follow up the generated motion.

BRIEF DESCRIPTION OF THE DRAWINGS

FIG. 12 is an explanatory view explaining a steady turning gait (to be used in the processing in the flow chart of FIG. 11) from a robot foot landing position and the like;

FIG. 13 is an explanatory view explaining a body trajectory of the steady turning gait (to be used in the processing in the flow chart of FIG. 11) from the robot foot landing position and the like;

DETAILED DESCRIPTION OF THE PREFERRED EMBODIMENTS

The motion generation system of a legged mobile robot according to the present invention will be explained with reference to the accompanied drawings. A biped robot is taken as an example of the legged mobile robot.

Figure 1:
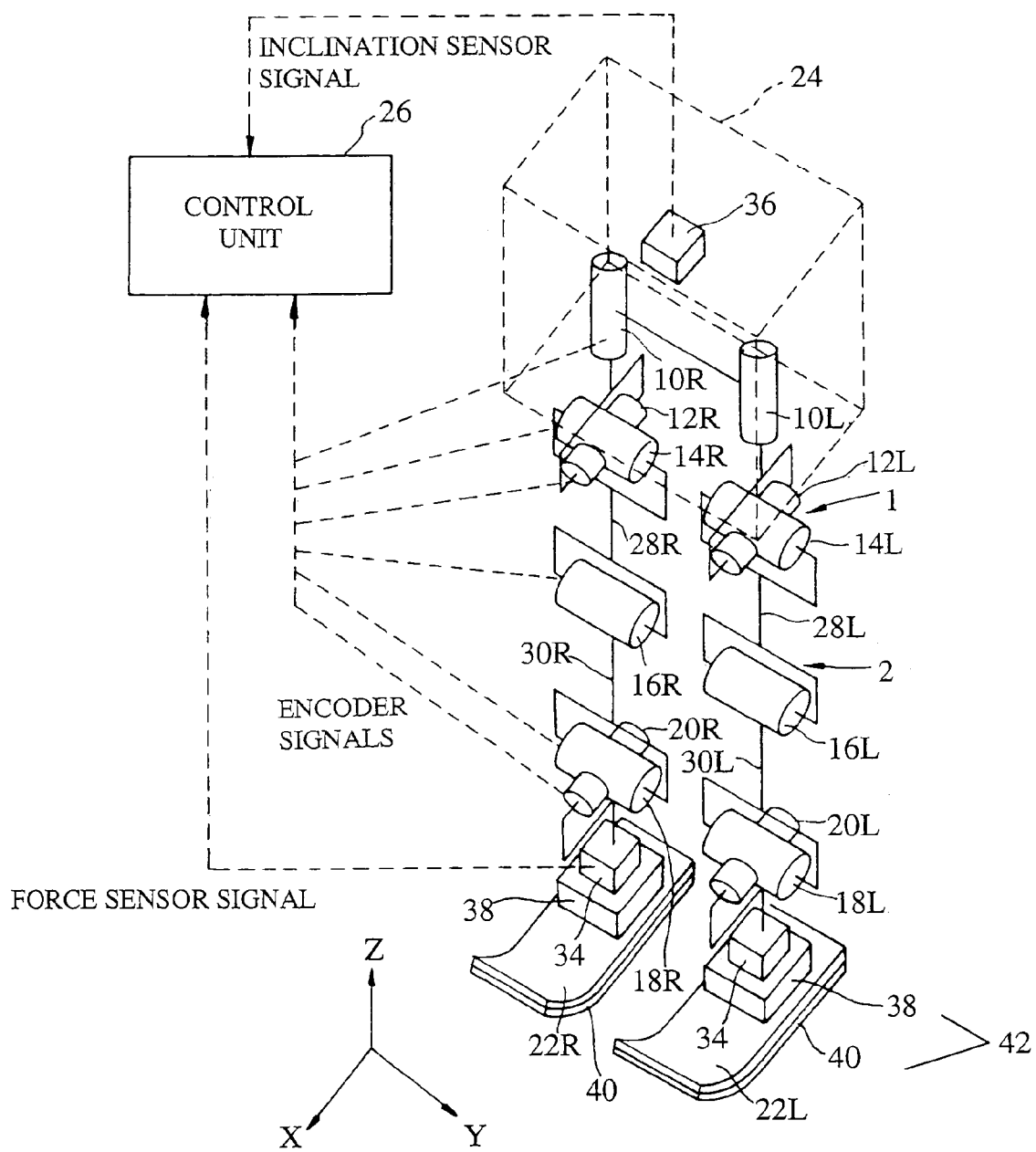
FIG. 1 is a schematic view showing an overall configuration of a legged mobile robot, more particularly a biped robot, to which a motion generation system of a legged mobile robot according to an embodiment of the present invention is applied.

FIG. 1 is an overall schematic view showing a legged mobile robot, more specific, a biped robot to which the motion generation system according to the present invention is applied.

As illustrated in the figure, a biped robot (hereinafter simply referred to "robot") 1 has a pair of right and left legs (leg links) 2 each composed of six joints. The six joints include, arranged successively downward, a pair of hip joints 10R, 10L (the right-hand joint is indicated by R and the left-hand joint by L) for rotating legs with respect to hips, a pair of hip joints 12R, 12L in the rolling axis (about an X-axis), a pair of hip joints 14R, 14L in the pitching axis (about a Y-axis), a pair of knee joints 16R, 16L in the pitching axis, a pair of ankle joints 18R, 18L in the pitching axis, and a pair of joints 20R, 20L in the rolling axis.

The robot is provided with feet 22R, 22L underneath of the joints 18R(L) and 20R(L), and a body (trunk) 24 at its top which houses a control unit 26 comprising microcomputers (explained later). In the above, the joints 10R(L), 12R(L), 14R(L) make up the hip joints, and the joints 18R(L), 20R(L) make up the ankle joints. The hip joints and knee joints are connected to each other by thigh links 28R, 28L, and the knee joints and ankle joints are connected to each other by crus or shank links 30R, 30L.

Further, two arms are connected at upper parts of the body 24 and a head is provided at the top of the body 24. However, since the upper configuration does not have direct relationship with the gist of the present invention, the illustration is omitted.

With the above structure, each of the legs 2 is given six degrees of freedom. When the 6*2=12 joints are driven to suitable angles during walking, a desired motion is imparted to the entire leg structure to enable the robot to walk arbitrarily in a walking environment of three-dimensional (absolute) space. (In the specification, "*" represents multiplication in scalar calculation and outer product in vector calculation.).

It should be noted that a position and a velocity of the body 24 indicate a position and its displacement velocity of a predetermined position of the body 24, specifically a representative point of the body 24. This will be referred to later.

As shown in FIG. 1, a known force sensor (more precisely, known as the six-axis force and torque sensor) 34 is disposed at a position below each ankle joint for generating a signal indicative of three directional components Fx, Fy, Fz of force and three directional components Mx, My, Mz of torque or moment thereby of the force and outputs a signal indicative of foot landing and the floor reaction force (the load acting from the floor). Moreover, the body 24 has an inclination sensor 36 which generates a signal indicative of inclination with respect to a Z-axis (the vertical direction (the direction of gravity)) and its angular velocity. The electric motors of the respective joints are coupled with respective rotary encoders which generate signals indicative of angular displacements or rotation amounts of the electric motors.

Figure 2:
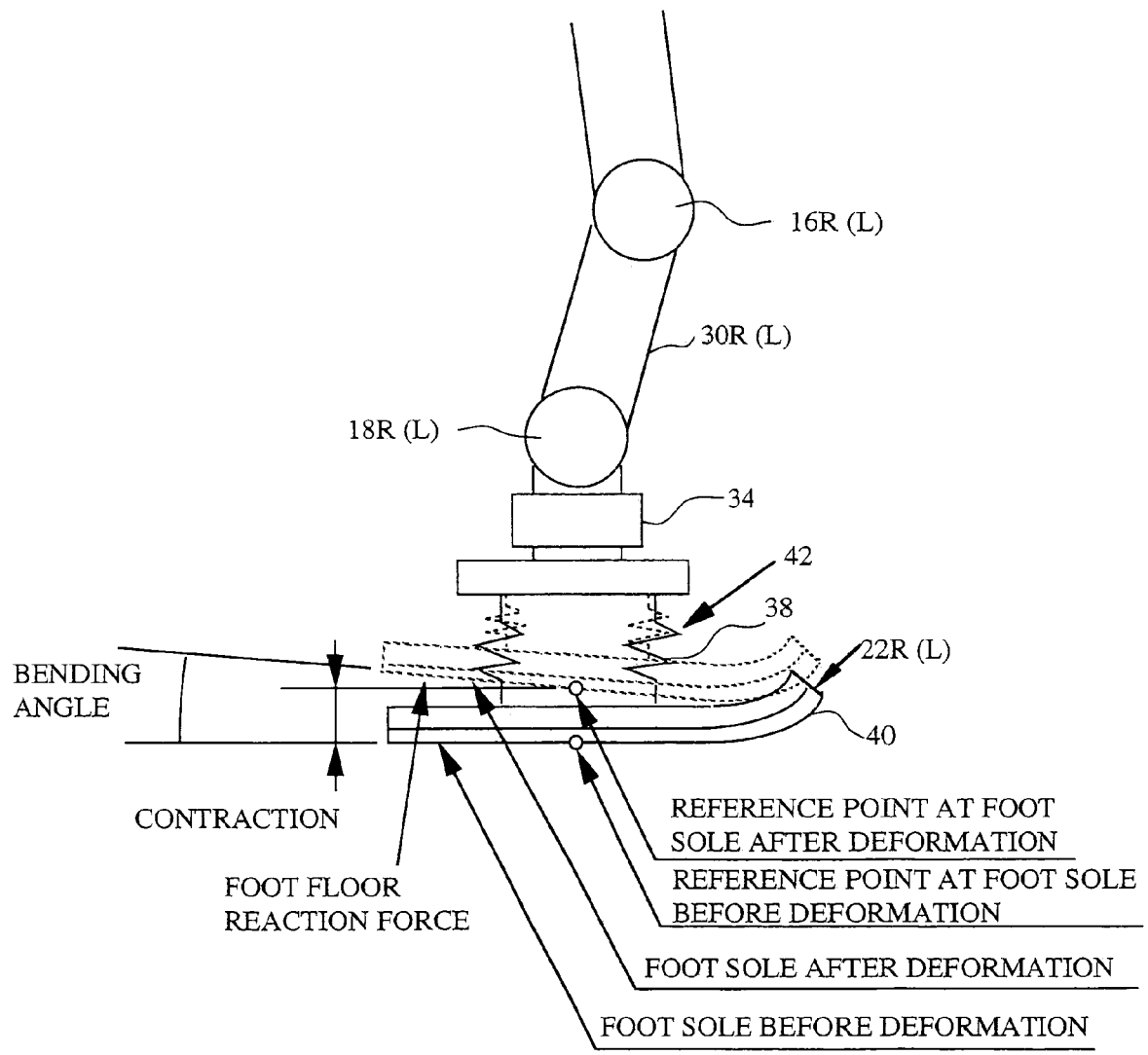
FIG. 2 is an explanatory side view showing the structure of the foot of a legged mobile robot illustrated in FIG. 1.

As illustrated in FIG. 2, a spring mechanism 38 is installed at a position upward from the foot 22R(L), which constitutes a compliance mechanism 42 together with a sole elastic member 40 attached to the sole of the foot 22R(L). The spring mechanism 38 has a box-like guide member (not shown) connected to the foot 22R(L), and a piston member (not shown) connected to the side of the ankle joint 18R(L), 20R(L) and the force sensor 34 and inserted in the guide member with an elastic member such that it moves in the guide member to a slight extent.

In the figure, the foot 22R(L) illustrated in thick lines shows a condition where no floor reaction force is imparted. When subjected to the floor reaction force, the spring mechanism 38 and the sole elastic member 40, which constitute the compliance mechanism 42, deform such that the foot 22R(L) shifts to the position and posture illustrated in dashed lines. This configuration is significant not only for decreasing the foot-landing impact, but also for enhancing the control performance. Since this configuration is disclosed in an application (Japanese Laid-Open Patent Application No. Hei 5 (1993)-305584) proposed by the applicant, no further explanation will be made.

Although not shown in FIG. 1, a joystick 44 is provided at an appropriate location of the biped robot 1, which enables an operator from the outside to input a demand on gait, such as changing from straight advance to turning.

Figure 3:
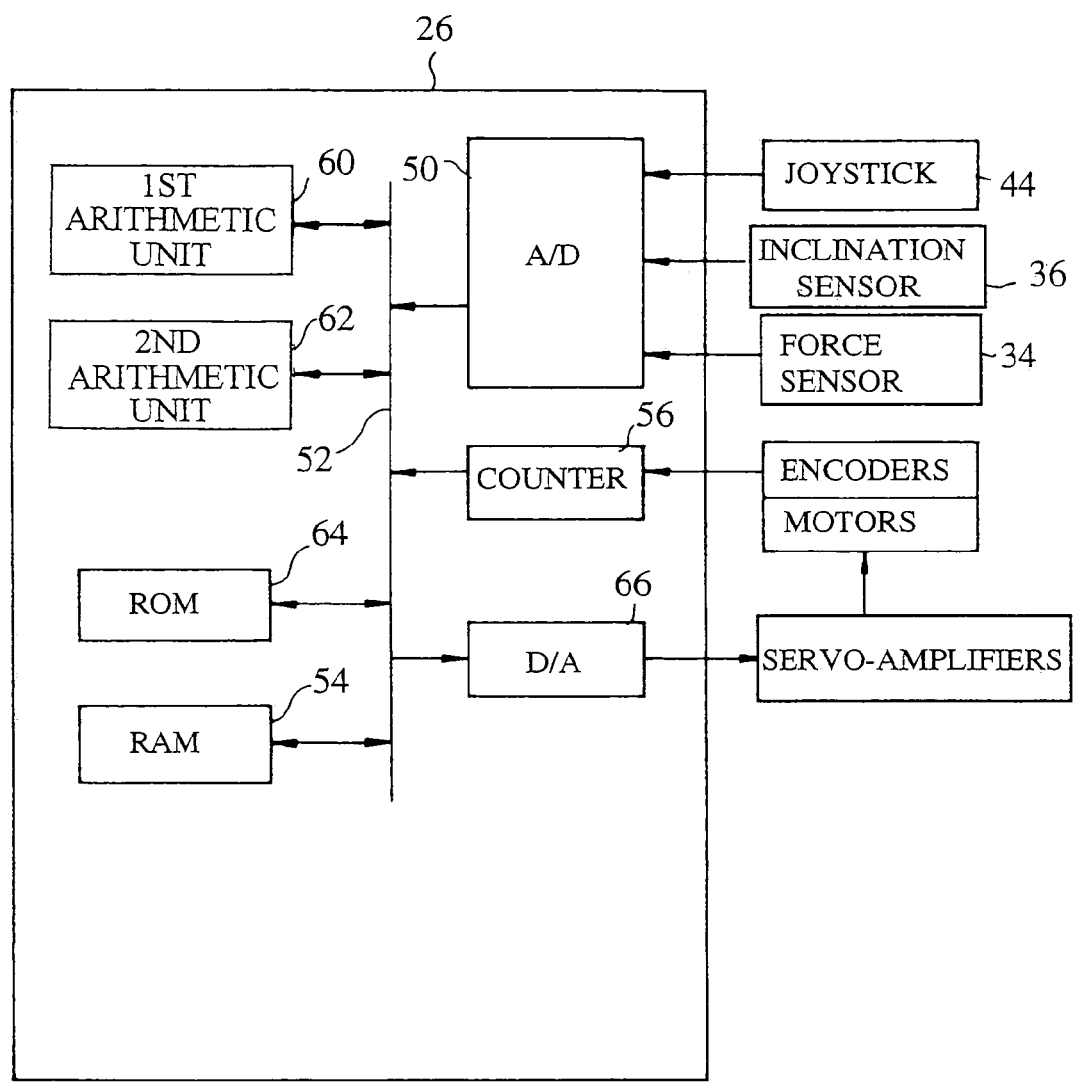
FIG. 3 is a block diagram showing details of a control unit mounted on the robot illustrated in FIG. 1.

FIG. 3 is a block diagram which shows the details of the control unit 26 comprised microcomputers. Outputs from the inclination sensor 36, etc., are converted into digital signals by an A/D converter 50 and are then transmitted through a bus 52 to a RAM 54. Output signals from the rotary encoders that are disposed adjacent to the respective electric motors are transmitted through a counter 56 to the kAM 54.

The control unit 26 includes a first arithmetic unit 60 and a second arithmetic unit 62 respective of which comprises a CPU. As will be explained later, the first arithmetic unit 60 conducts the gait generation, calculates joint angle displacement commands, and outputs the same to the RAM 54. The second arithmetic unit 62 reads the commands and the detected values from the RAM 54, and calculates values (manipulated variables), and outputs the same through a D/A converter 66 and servo-amplifiers to the electric motors which drive the respective joints.

Figure 4:
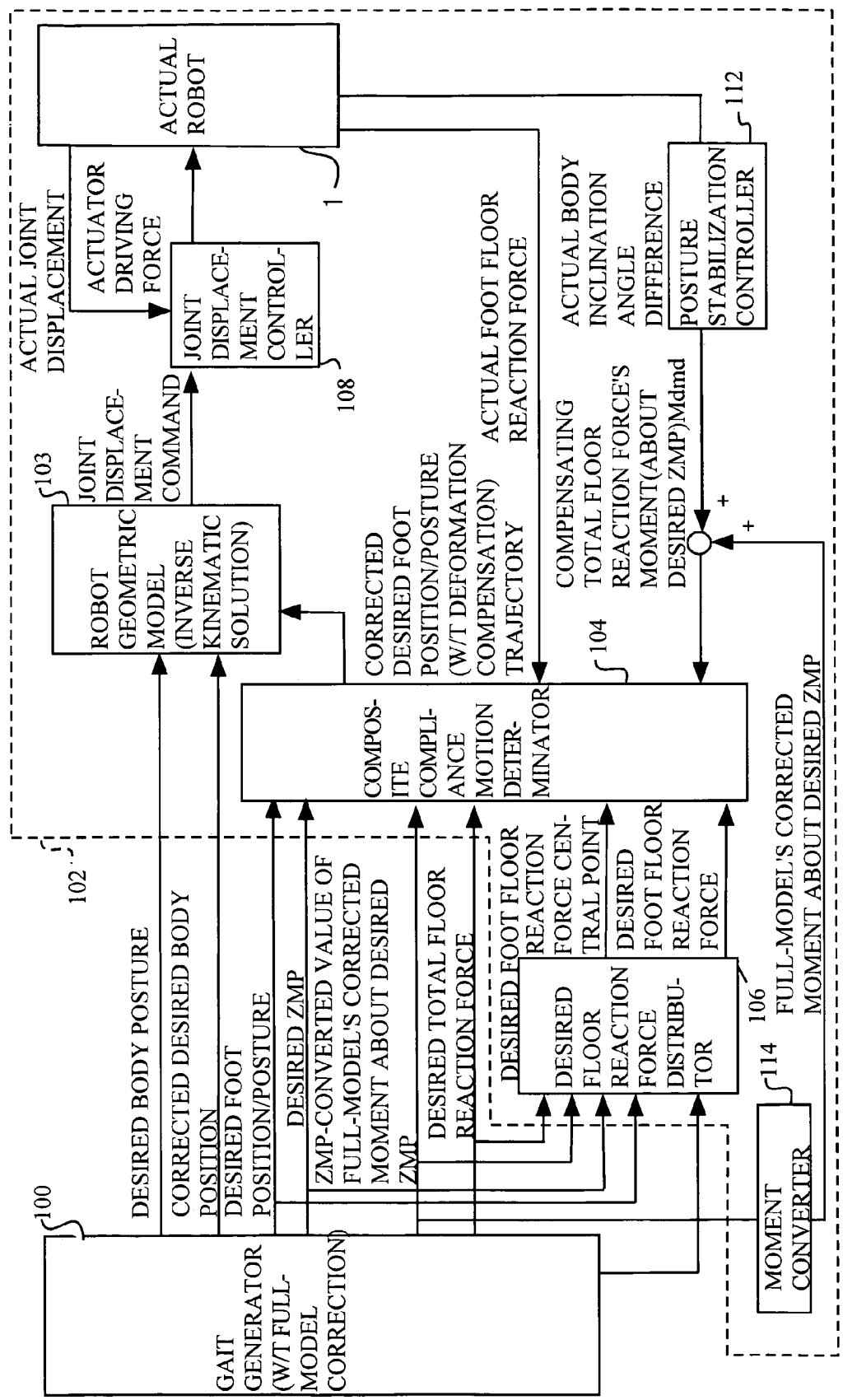
FIG. 4 is a block diagram showing the configuration of a motion control system including the motion generation system of a legged mobile robot illustrated in FIG. 1 in a functional manner.

FIG. 4 is a block diagram showing overall configuration and operation of the motion generation system of legged mobile robot according to the embodiment.

Explaining this, the system includes a gait generator (with full-model correction) 100 which generates a desired gait freely and on a real-time basis and outputs them as will be explained later. The desired gait comprises a desired body posture (trajectory or pattern), a corrected desired body position (trajectory or pattern), a desired foot position and posture (trajectory or pattern), a desired ZMP (desired total floor reaction force central point) (trajectory or pattern), a ZMP-converted value of full-model's corrected moment about desired ZMP, and a desired total floor reaction force (trajectory or pattern).

The floor reaction force acting on each foot 22R(L) is called a "foot floor reaction force", whilst the resultant force of the foot floor reaction forces acting on both feet is called a "total floor reaction force". Since the foot floor reaction force will rarely been referred to in the following, the "floor reaction force" will be used in the meaning of "total floor reaction force" if it is not specifically described.

Explaining first the gait to be generated by the system, the robot 1 should have, as desired values in the control of locomotion, not only a desired movement (or motion) pattern, but also a desired floor reaction force pattern that satisfies the dynamic equilibrium condition against the desired movement pattern.

The desired floor reaction force is generally described or defined by a point of action and by a force and moment acting thereat. Since the point of action can be set at any point, desired floor reaction force has numerous descriptions. However, if the desired floor reaction force is described by selecting the aforesaid desired floor reaction force central point as the point of action, the moment of force is zero except for its vertical component.

As stated above, in a gait that satisfies the dynamic equilibrium condition, since the ZMP calculated from the desired movement trajectory and the desired floor reaction force central point are equal to each other, the desired ZMP trajectory can be used in lieu of the desired floor reaction force central point trajectory.

Therefore, the above can be rewritten as; "the legged mobile robot should have, as desired values to be controlled its locomotion, not only the desired movement (or motion) pattern or trajectory, but also the desired ZMP trajectory (desired floor reaction force pattern)".

Based on the above, the desired gait is defined in this specification as follows:

a) The desired gait is, in a broad sense, a set of the desired movement (or motion) trajectories and the desired floor reaction force pattern extending over a period of a walking step or steps.

b) The desired gait is, in a narrow sense, a set of the desired movement (or motion) trajectories and the ZMP trajectory extending for a period of a single walking step.

c) A series of walking is comprised of a series of gaits.

Hereinafter, for a more rapid understanding, the desired gait is used to represent that gait defined in the narrow sense, unless it is mentioned to the contrary. Specifically, the desired gait is used to mean a gait extending for a period beginning from the initial state of a two-leg supporting period to the terminal state of a one-leg supporting period succeeding thereto. Here, needless to say, the two-leg supporting period means a period during which the robot 1 supports its weight with two legs 2, whereas the one-leg supporting period means a period during which the robot supports its weight with one of the two legs (leg link) 2. The leg 2 which does not support the robot weight during the one-leg supporting period is called a "free leg". Since the definitions are described in detail in the Laid-Open Patent Application (Hei 10(1998)-86081) proposed earlier, no further explanation will be made.

Specifically, the object of the present invention is to generate the desired gait defined above accurately and on a real-time basis such that a generated motion in a gaitsand the like can satisfy the dynamic equilibrium condition, thereby enabling stability of motion such as walking.

Here, conditions which a desired gait must satisfy will be explained.

The conditions which the desired gait must satisfy will generally be classified into the following five:

Condition 1) The desired gait must satisfy the dynamic equilibrium condition. In other words, the ZMP trajectory dynamically calculated from the desired movement trajectories of the robot 1 should accord with the desired ZMP trajectory.

Condition 2) When a demand(s) on stride, turning angle, etc., is made by a locomotion planner or path planner (neither shown) of the robot 1 or is inputted by an operator, the desired gait must satisfy it.

Condition 3) The desired gait must satisfy constraint conditions in kinematics that the robot foot must not dig or scrape the floor on which it walks, the joint angle must be within a movable range, the joint angular velocity must not exceed a permissible range, etc.

Condition 4) The desired gait must also satisfy conditions of constraint in dynamics that the ZMP must remain within the foot sole floor-contact area during the one-leg supporting period, the joint torque must not exceed a possible maximum power of the joint actuators, etc.

Condition 5) The desired gait must satisfy boundary conditions. As a matter of course, Condition 1) results in the boundary condition that the position and velocity of robot's each part such as the body must be continuous in the gait boundary. (If not, infinite force would occur or the ZMP would move far away from the foot sole floor-contact area).

More specifically, the initial state of n+1-th gait should correspond to the terminal state of n-th gait, especially in the body position, posture and velocity relative to the foot position. If the initial state of n+1-th gait has been determined, it suffices if the terminal state of n-th gait will be accorded with the n+1-th gait initial state. If not determined, it suffices if the terminal state of n-th gait will be within a range that ensures continuous walking without losing posture stability. However, as will be discussed later, it is quite difficult to determine the terminal state range which ensures continuous walking without losing posture stability.

Generally speaking, the desired gait is generated by a gait generation algorithm including parameter values or time-series table data. (In other words, to determine a gait is to determine the parameter values or time-series table data appropriately.)

Various kinks of gaits can be generated by changing the parameter values or time-series table data. However, if the parameters or time-series table data are determined without paying careful attention, it is not guaranteed if the generated gait can satisfy all of the conditions mentioned above.

In particular, when generating a body trajectory that satisfies Condition 1) based on the ZMP trajectory by a gait generation algorithm, even if a range, suitable for continuous walking, of the body position and velocity at the gait terminal is known, it is still difficult to determine the parameters of the ZMP trajectory in such a way that both the body position and body velocity will fall within the range at the gait end.

The reasons of the difficulty are as follows:

Reason 1) The robot body tends, once begins to move away from the ZMP, to move farther away therefrom.

This will be explained by an inverted pendulum model which approximates the behavior of the robot body. If the inverted pendulum's floor point (at which its center of gravity is projected) deviates from the supporting point, the deviation will diverge and the pendulum will turn over. Even when it is turning over, the resultant force of the inertial force and gravity of the inverted pendulum continues to act on the supporting point (in other words, the ZMP is kept equal to the supporting point), and the resultant force remains balanced with the floor reaction force acting through the supporting point. The dynamic equilibrium condition can merely describe a relationship between the inertial force and gravity and the floor reaction force of a moving object at every moment.

It is likely to misunderstand that continuous robot walking is ensured, when the dynamic equilibrium condition is satisfied. However, satisfaction of the dynamic equilibrium condition does not always ensure that the robot is at a stable posture. Like the center of gravity of the inverted pendulum tends, if begins to move away, to move further away, the center of gravity of the robot tends, once begins to move away from the position immediately above the ZMP, to move farther away therefrom.

Reason 2) The one-leg supporting period requires that the ZMP must be within the supporting leg foot sole floor-contact area, etc. Due to rigid conditions of constraint like this, it is difficult to determine body acceleration and deceleration patterns freely. If the body patterns are determined mainly taking body position into account, the velocity is likely to deviate from a range, and vice versa. Thus, it is difficult to make both the position and velocity equal to desirable values at the same time.

Figure 35:
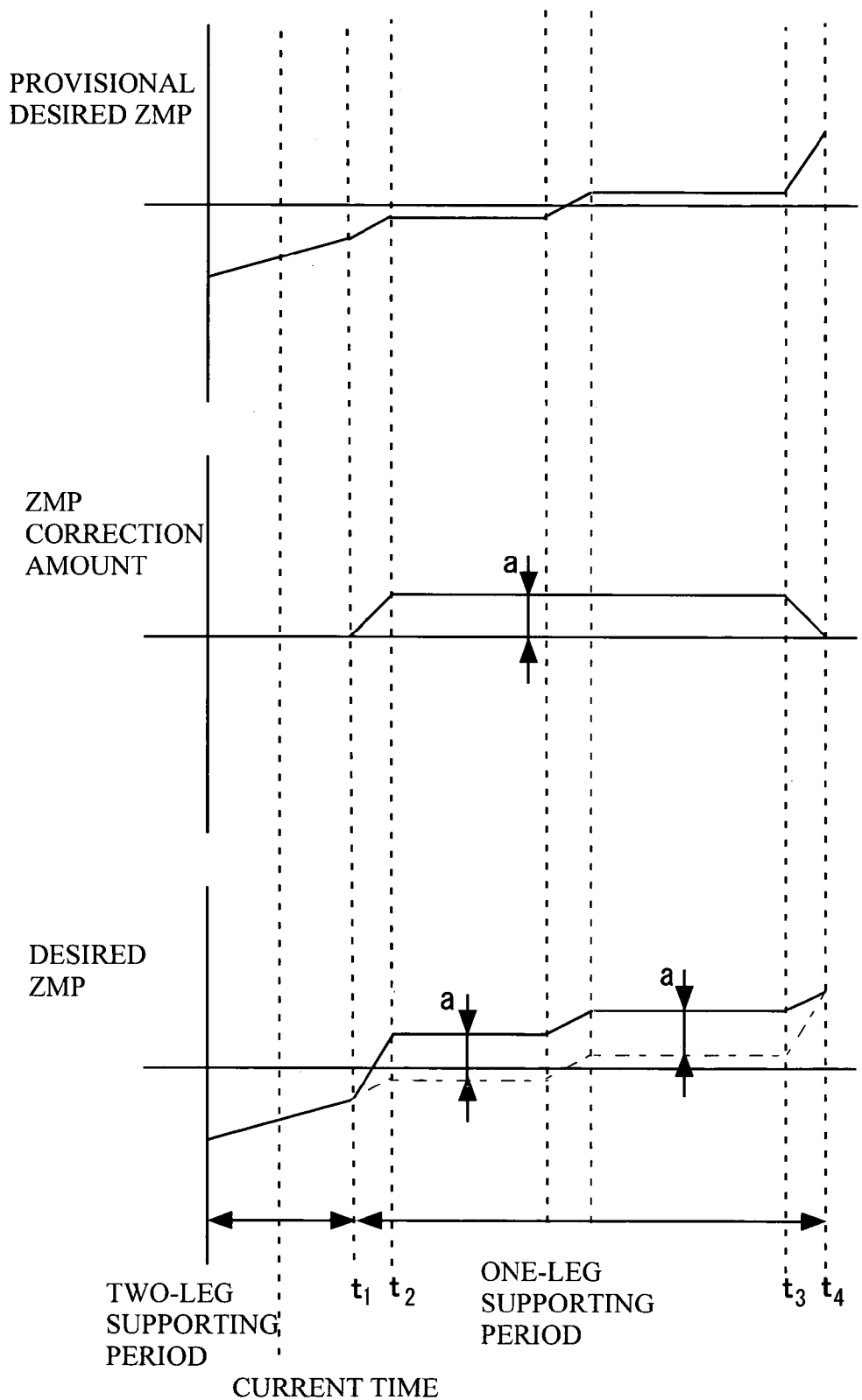
FIG. 35 is a set of time charts explaining re-determination conducted in the gait parameters succeeding to the gait correction of the motion generation system of a legged mobile robot according to the fourteenth embodiment of the present invention.

Continuing the explanation of the gait, the gait is described by gait parameters. The gait parameters comprise movement (or motion) parameters and the ZMP parameter (more generally floor reaction force parameter). The "floor reaction force parameter" is used in this specification to mean a parameter relating to the floor reaction force pattern with respect to time. The ZMP trajectory is expressed by a broken-line pattern as will be explained with reference to FIG. 35 (referred to only in the X-coordinate in the figure) and is described or expressed with respect to the coordinate of X, Y and Z (directions) by the positions of the braking points and passing times of the pattern.

The movement (or motion) parameters comprise foot (trajectory) parameters and the body (trajectory) parameters. The foot trajectory parameters comprise initial free leg (foot lifting) position and posture, terminal free leg (foot landing) position and posture, and durations of the two-leg supporting period and the one-leg supporting period, etc.

The body trajectory parameters comprise parameters determining the body posture (the direction or inclination of the body 24 in space), parameters determining the body height (value in the Z-direction), parameters determining initial body position (displacement) and velocity, etc.

Figure 5:
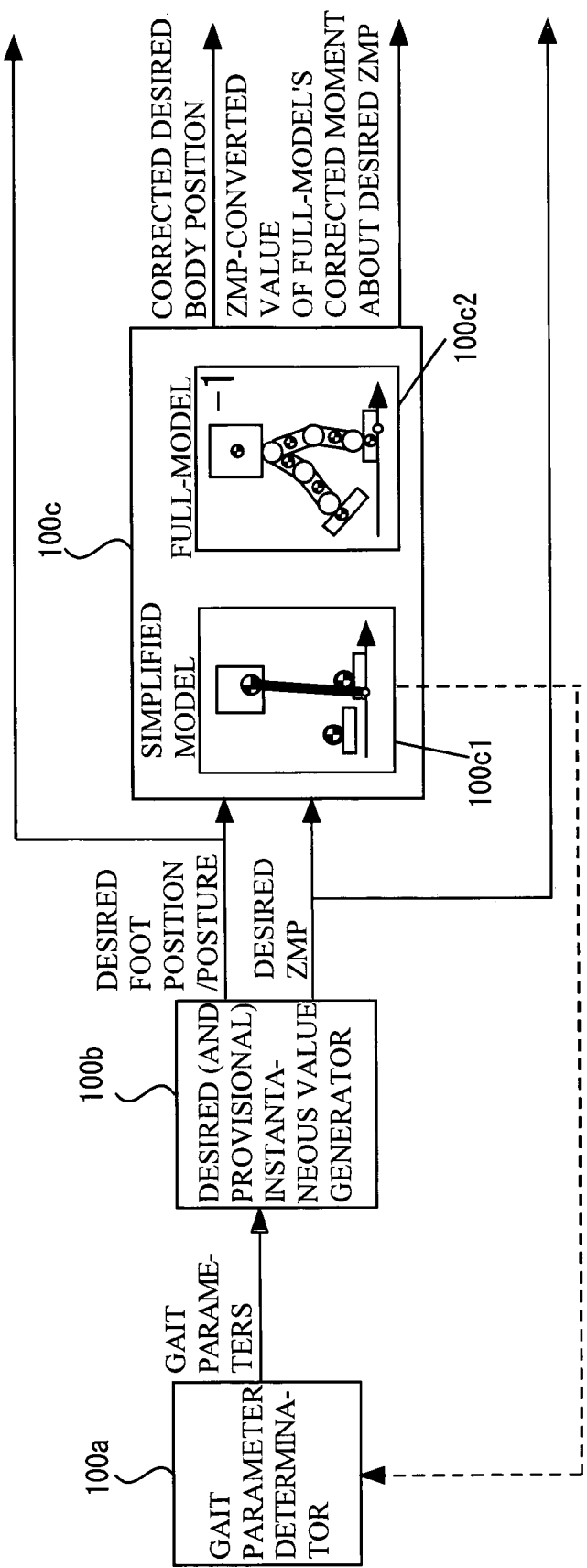
FIG. 5 is a block diagram functionally showing a gait generator (with full-model correction) illustrated in FIG. 4.

FIG. 5 is block diagram showing the gait generator (with full-model correction) 100 in details.

As illustrated, the gait generator (with full-model correction) 100 has a gait parameter determinator 100a which determines the values (or time-series table) of the parameters in such a manner that they satisfy the aforesaid conditions that the desired gait must satisfy. The determined gait parameters are inputted to a desired (and provisional) instantaneous value generator 100b which generates or calculates the desired foot position and posture, the desired ZMP and desired body posture, more precisely their desired instantaneous values and provisional instantaneous values at time t, based on the inputted values, using techniques proposed by the applicant in Japanese Laid-Open Patent Application Nos. Hei 5-318339 and Hei 5-324115. In the specification and figures, "posture" indicates an inclination or direction (orientation) in space.

It should also be noted that, for the sake of brevity, the desired body posture is omitted from illustration in most figures including FIG. 5.

The generated (calculated) desired foot position and posture, the desired ZMP and the desired body posture (more precisely their desired and provisional instantaneous values) are inputted to a full-model corrector 100c. The full-model corrector 100c has a simplified model 100c1 (proposed by the applicant in Japanese Patent Application No. 2000-352011) and a full-model 100c2 (proposed in the present application and will be explained later), determines the desired body position (more precisely a desired horizontal body position) based on the simplified model and corrects the determined desired body position using the full-model (explained later).

It should be noted here that the simplified model 100c1 may be removed from the full-model corrector 100c.

It should also be noted that the full-model 100c2 includes an inverse full-model (inverse dynamic model) and a direct full-model (direct dynamic model), as will be explained later.

Specifically, the gait generator (with full-model correction) 100 corrects the calculated desired body position using the simplified model in such a way that it can satisfy the dynamic equilibrium condition more accurately than a gait generated merely using such a simplified model. At the same time, the generator 100 outputs a ZMP-converted value of full-model's corrected moment about the desired ZMP, or outputs the ZMP-converted value of full-model's corrected moment about the desired ZMP, while correcting the desired body position. The ZMP-converted value of full-model's corrected moment about the desired ZMP may be outputted as not in a ZMP-value, but as in the moment itself.

Since the robot 1 has twelve joints as illustrated in FIG. 1, desired joint displacement commands can be determined solely from the inverse kinematics solution (as will be explained later) based on the given position and posture of the feet and the body. In other words, a desired robot posture at a current time can be immediately determined.

For the ease of understanding, the technique (proposed in Japanese Laid-Open Patent Application No. 2000-352011) to generate a gait freely and on a real-time basis will be explained.

Beginning the explanation from its premise, since the generation of an ideal desired gait can not act against physical laws, a demanded situation cannot be reached immediately. The transition to the demanded situation should be achieved slowly by changing gait parameters such as the ZMP trajectory, landing position and landing time, etc., within permissible ranges. In particular, assuming the dynamic system of the illustrated biped robot as a system that inputs the ZMP and outputs the body position, it is a kind of divergence system. Unless the gait parameter is changed carefully, it becomes difficult to restore to a normal state.

Therefore, when generating a gait as desired on a real-time basis, it is preferable to predict robot's future behavior and to determine the gait parameters such that the robot's future behavior, e.g., a behavior at the time after several walking steps from now, will not diverge, and to correct the gait so as to avoid divergence if a possibility of occurrence of the divergence is predicted.

Figure 6:
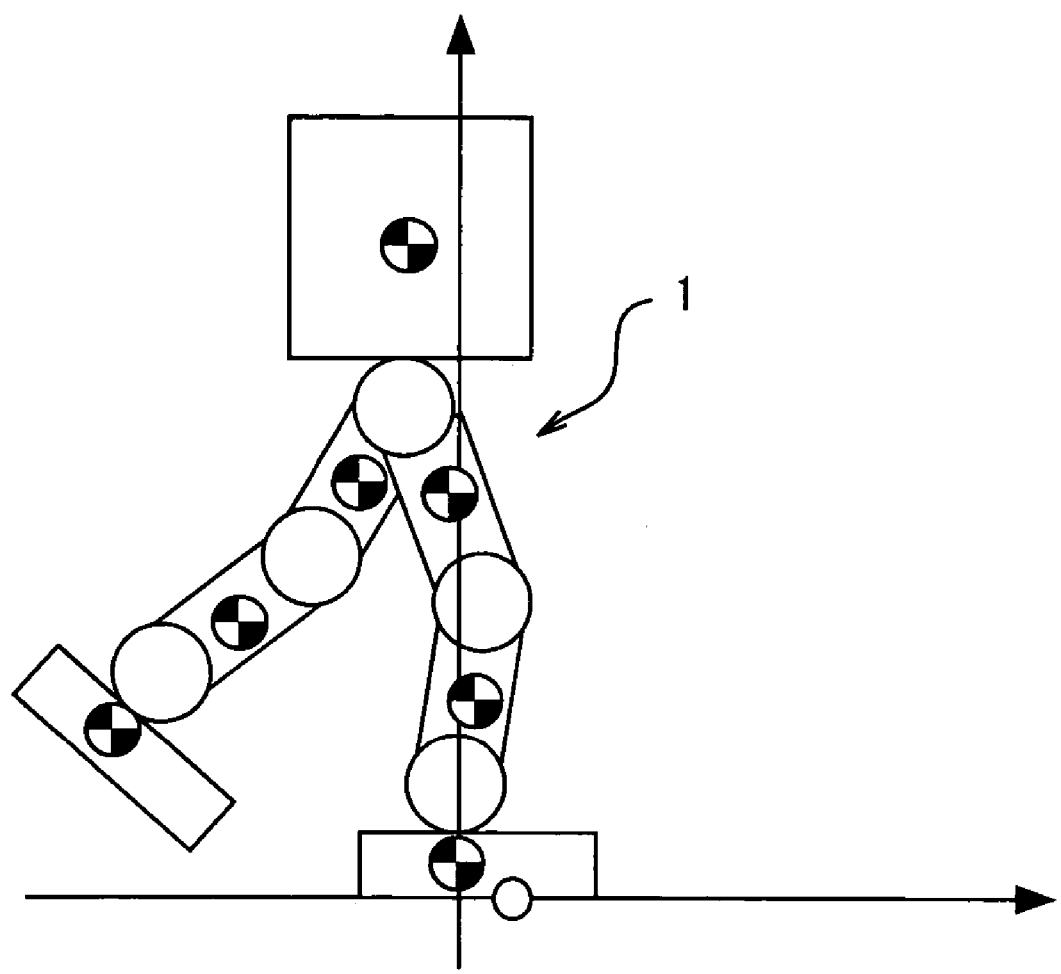
FIG. 6 is an explanatory view showing a multiple-material-point model that is an example of a full-model in the gait generator (with full-model correction)

However, when a multiple-material-point model (the aforesaid full-model indicates this) as shown in FIG. 6 is used, since it needs a large volume of dynamic calculation and the system is not linear, it is quite difficult for an ordinary on-board CPU (mounted on the robot, i.e., the first arithmetic unit 60) to determine the gait terminal state on a real-time basis.

Figure 7:
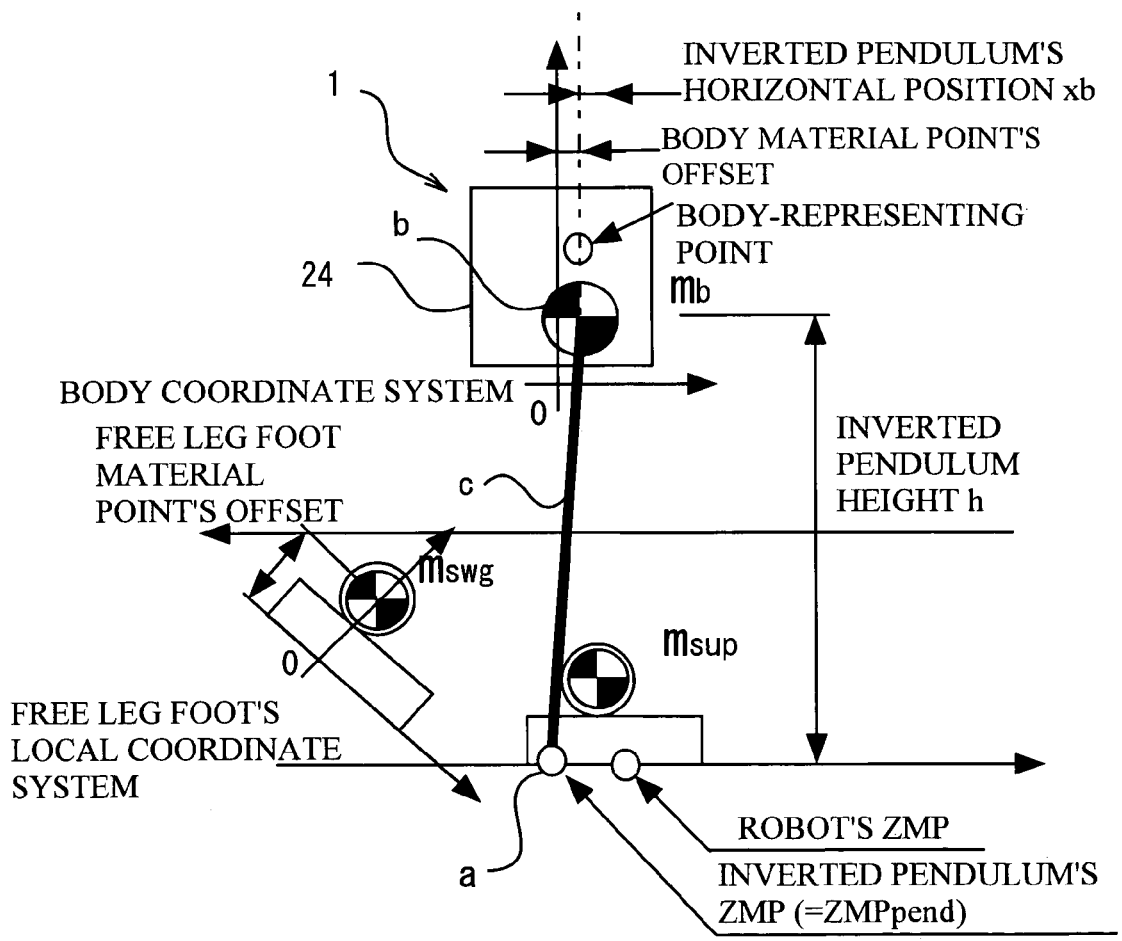
FIG. 7 is an explanatory view showing a simplified model (dynamic model) that approximates the legged mobile robot illustrated in FIG. 1 by an inverted pendulum to be used by the gait generator (with full-model correction) illustrated in FIG. 5.
Figure 8:
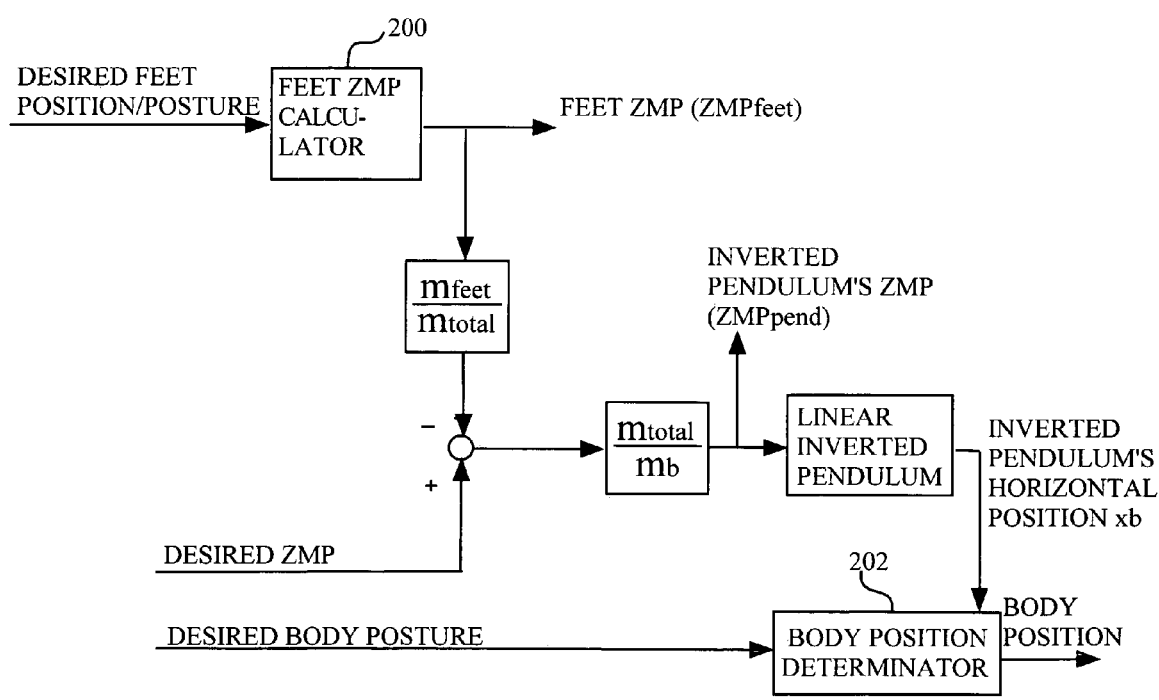
FIG. 8 is a block diagram showing dynamic calculation conducted by a gait generator (proposed in an earlier patent application) with the use of the model illustrated in FIG. 7.

In view of the above, in the technique proposed earlier, the system is arranged such that a dynamic model that describes dynamic behavior of the robot 1 is simplified in such a way that its future behavior can analytically be predicted in calculation on a real-time basis. FIG. 7 shows the simplified robot dynamic model. As illustrated, this dynamic model is a three-material-point model and is decoupled, i.e., the dynamics of the leg (foot) and those of the body do not interfere with each other and the dynamics of the robot as a whole is expressed by their linear combination. FIG. 8 is a block diagram showing dynamic calculation (conducted at a dynamic calculator in the gait generator 100) using the dynamic model illustrated in FIG. 7.

The dynamic model will be explained.

1) This model comprises three material points made up of an inverted pendulum, a foot material point of the supporting leg and a foot material point of the free leg.

2) The supporting leg foot material point is set at a fixed point on a coordinate system set locally at the supporting leg foot. The coordinate system is an XYZ rectangular coordinate system in which the origin is defined on a sole of the foot, projected from the center of ankle onto the sole of the foot, the X-Y plane is equal to the sole and the X-axis is defined as the direction from the heel to toe. This coordinate system is hereinafter referred to as "supporting leg local coordinate system". A coordinate system on the fixed point on the supporting leg local coordinate system is hereinafter referred to as "supporting leg foot material point's offset".

Similarly, the free leg foot material point is set at a fixed point on a coordinate system that is set at the free leg foot. This coordinate system is hereinafter referred to as "free leg local coordinate system". A coordinate system on the fixed point on the free leg local coordinate system is hereinafter referred to as "free leg foot material point's offset".

A coordinate system whose origin is defined on a foot point projected from the center of ankle onto the floor when the supporting leg foot is entirely in contact with the floor, and whose coordinate axes are fixed on the floor in such a manner that the X-axis is defined as the front direction of the supporting leg foot, the Y-axis is defined in the left direction and the Z-axis is defined in the vertical direction, is hereinafter referred to as "supporting leg coordinate system" (that is different from the above-mentioned supporting leg local coordinate system). Unless it is mentioned to the contrary, the position, the velocity, the force, etc., are expressed by the supporting leg coordinate system.

3) The inverted pendulum comprises a supporting point a that is freely movable in the horizontal direction, a material point b and a link c that connects the supporting point and the material point. The link is expansible and has no mass. It is assumed here that the link expands, when tilting, such that the height of the mass viewed from the supporting point is kept constant.

The material point of the inverted pendulum corresponds to the material point of the body 24 in the sense of physics (the body's material point does not always indicate the center of gravity). Accordingly, the material point of the inverted pendulum is the same as the material point of the body. The position (more broadly, the displacement) of the inverted pendulum's material point is simply referred to as "inverted pendulum position".

4) The horizontal position of the body is geometrically determined from the inverted pendulum's horizontal position. Specifically, it is determined such that a horizontal position (the X-Y coordinate system viewed from the supporting leg coordinate system) of the representative point (hereinafter referred to as "body-representing point") on a coordinate system locally set at the body (the coordinate is hereinafter referred to as "body coordinate system") becomes equal to the inverted pendulum's horizontal position. More specifically, the body-representing point and the inverted pendulum's material point b are determined such that they are on the same vertical line, as illustrated in FIG. 7. A horizontal coordinate of the body-representing point on the body coordinate system is referred to as "body material point's offset".

The description of variables and parameters relating to the illustrated dynamic calculation model will then be explained.

For ease of explanation, variables and parameters relating to the dynamic calculation model are defined and described as follows:

The ZMP of the inverted pendulum shall be present at the supporting point a, since the ZMP is defined as a point at which no moment is generated and the supporting point is free and hence no moment is generated there. Accordingly, since the inverted pendulum's supporting point can be regarded as the ZMP of the pendulum itself, it is referred to as "inverted pendulum's ZMP" and is, on and after, described or expressed as "ZMPpend".

Mass and position of the individual material points are described as follows:

msup: supporting leg's material point mass
    mswg: free leg's material point mass
    mb: inverted pendulum's material point mass (body's material point mass)
    mtotal: robot mass (=mb+msup+mswg).
    mfeet: feet mass (=msup+mswg)
    xsup: supporting leg's material point position
    xswg: free leg's material point position
    xb: inverted pendulum's position (body's material point position)

On and after, xb is expressed by three-dimensional vector (XYZ coordinate system vector), if not mentioned to the contrary. The height of the inverted pendulum indicates the height from the supporting point to the material point and is described as h.

d(xb)/dt is the first order differential of xb and indicates the velocity of the inverted pendulum, whereas d2(xb)/dt2 is the second order differential of xb and indicates the acceleration of the inverted pendulum. The value g is a constant of the acceleration of gravity. G is a vector of the acceleration of gravity and is defined as a vector whose X, Y components are zero (0) and Z component is −g.

In the illustrated three-material-point model, moment of total inertial force of the leg material point acting about a point of action P is defined as "leg's total inertial force moment about point P". Here, the resultant force of the inertial force and gravity is hereinafter referred to "total inertial force". The coordinate (or position) of the point of action P is described as xp.

Eq. 1, mentioned below, is an equation strictly defining, in terms of dynamics, of the leg's total inertial force moment about P.

Leg's total inertial force moment about $P = msup(xsup-xp)*G - msup(xsup-xp)*d2(xsup)/dt2 + mswg(xswg-xp)*G - mswg(xswg-xp)*d2(xswg)/dt2$  Eq. 1

The feet ZMP is described as ZMPfeet and is defined by Eq. 2. The height of the feet ZMP (i.e., the Z component of ZMPfeet) is set to the same value as the height of the point P. Thus, the feet ZMP is a pseudo value to be corresponding to the resultant force (total inertial force) generated by the leg motion.

Leg's total inertial force moment about $P = mfeet*(ZMPfeet-xp)*G$  Eq. 2

Inherently, the dynamics of the robot 1 illustrated in FIG. 1 is non-linear. Therefore, by approximation, the relationship among the desired ZMP, the feet ZMP (ZMPfeet) and the inverted pendulum's ZMP (ZMPpend) are defined by Eq. 3 as follows:

$ZMPpend = mtotal/mb * desired\ ZMP - mfeet/mb * ZMPfeet$  Eq. 3

Generally, the differential equation describing the behavior of a linear inverted pendulum is expressed by Eq. 4.

d2(xb)/dt2's horizontal component=$g/h$*(xb's horizontal component−ZMPpend's horizontal component)  Eq. 4

Figure 9:
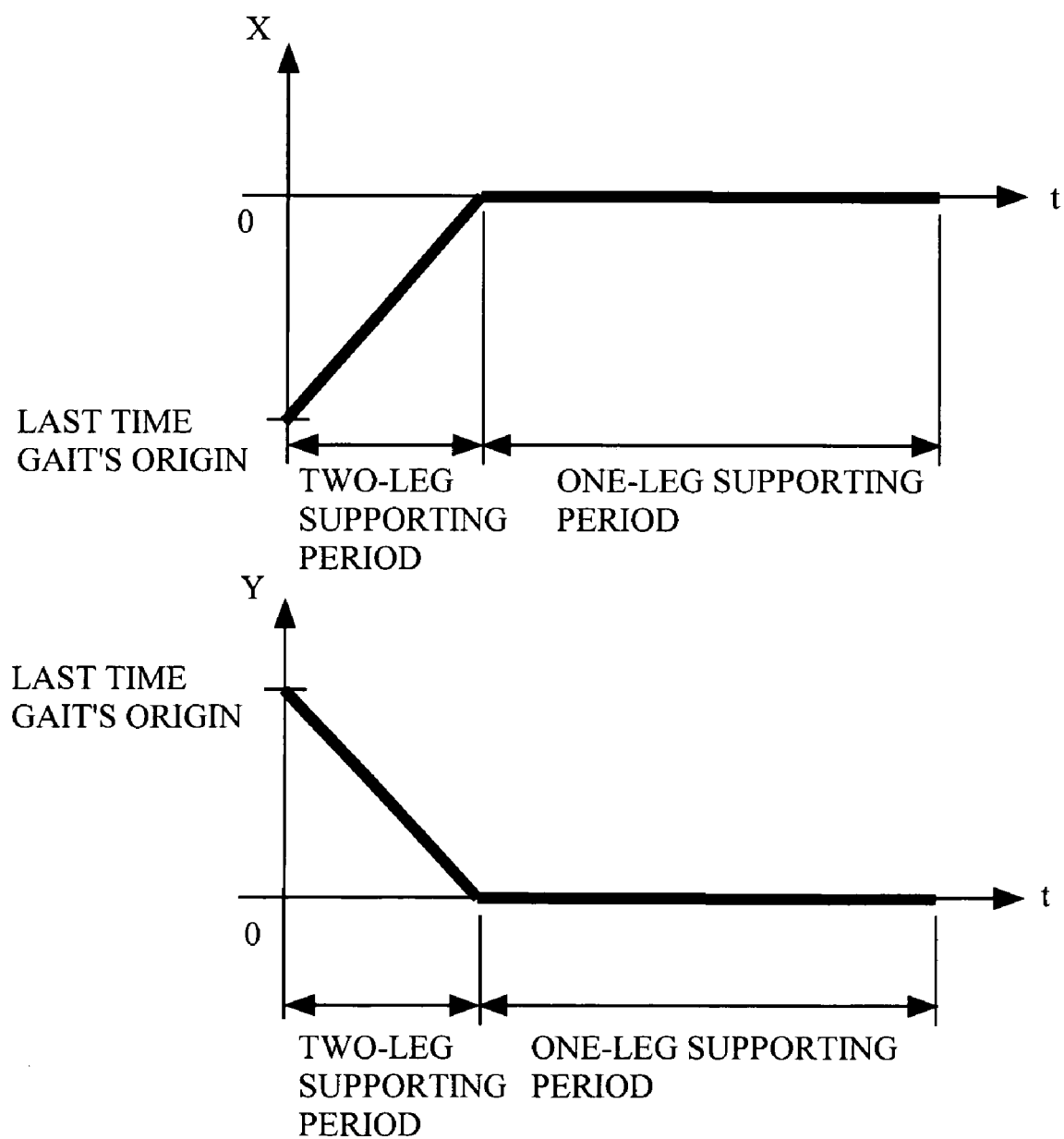
FIG. 9 is a set of time charts showing a trajectory of a point of action P of the resultant force of the inertial force and gravity of the leg's material point, to be used in calculating a pseudo ZMP value ZMPpend indicative of a supporting point of the inverted pendulum in dynamic calculation illustrated in FIG. 8.

Here, the point of action P is set to improve the accuracy of model approximation. For example, as illustrated in a time chart of FIG. 9, the point of action P is set in such a manner that it moves, at the same speed during the two-leg supporting period, from the origin of the supporting leg coordinate system of gait immediately before (last time gait) to that of the current time gait.

The dynamic model proposed in this earlier application is expressed by the offsets describing the relationship between the foot, the body and the material points illustrated in FIG. 7 and the equations (Eqs. 1 to 4). This configuration makes it easy to predict future behavior, as will be explained later.

Explaining the operation of a dynamic calculator of the earlier application with reference to FIG. 8, it has a feet ZMP calculator 200. The calculator 200 calculates the feet ZMP (ZMPfeet) based on Eqs. 1 and 2 and on the point of action P illustrated in FIG. 9.

Then, it calculates the inverted pendulum's ZMP (ZMPpend) by multiplying the calculated ZMPfeet by mfeet/mtotal (second coefficient), by subtracting the product from the desired ZMP, and by multiplying the difference by mtotal/mb (first coefficient). In other words, the inverted pendulum's ZMP is determined or calculated by subtracting the product obtained by multiplying ZMPfeet (corresponding to or indicative of the feet ZMP) by the ratio between the leg's mass mfeet and the body material point's mass mb from the product obtained by multiplying the desired ZMP by the ratio of the robot mass mtotal and the body material point's mass mb. This processing corresponds to the processing of Eq. 3.

The behavior of the inverted pendulum is expressed by Eq. 4. From this, the inverted pendulum material point's horizontal position (displacement) xb is determined or calculated.

Further, as illustrated in FIG. 8, the dynamic calculator has a body position determinator 202 which determines the horizontal body position xb. Specifically, the determinator 202 determines the horizontal body position in such a way that the horizontal position of the body-representing point (illustrated in FIG. 7) is equal to the horizontal position of the inverted pendulum.

Describing the above more generally, this model (first model) is a model obtained by modeling the robot 1 by an inverted pendulum having at least one material point (that may have the moment of inertia) set at a predetermined position or thereabout of the leg 2, and at least one material point set at a predetermined point between the supporting point (that is freely movable on the floor) and the body 24, and the dynamic calculator (first model body position calculating means) is arranged to have the feet ZMP calculating means for calculating the feet ZMP (ZMPfeet; indicative of a pseudo ZMP at the feet corresponding to the resultant force of the inertia and gravity generated by a motion of the leg 2) without depending on a behavior of the body 24, the ZMP corresponding value calculating means for calculating a ZMP corresponding value of the inverted pendulum's supporting leg (ZMPpend), based on the calculated feet ZMP (ZMPfeet) and the desired ZMP, the inverted pendulum's displacement calculating means for calculating the displacement (position) of the inverted pendulum (xb), based on the calculated ZMP corresponding value of the inverted pendulum's supporting leg (ZMPpend), and the first model body position determining means for determining the model body position (indicative of the body position of the first model), based on the calculated displacement of the inverted pendulum (xb).

And it is arranged such that the ZMP corresponding value of the inverted pendulum's supporting leg (ZMPpend) is calculated by subtracting the product obtained by multiplying the feet ZMP by the second coefficient (mfeet/mtotal) from the product obtained by multiplying the desired ZMP by the first coefficient (mtotal/mfeet).

Figure 10:
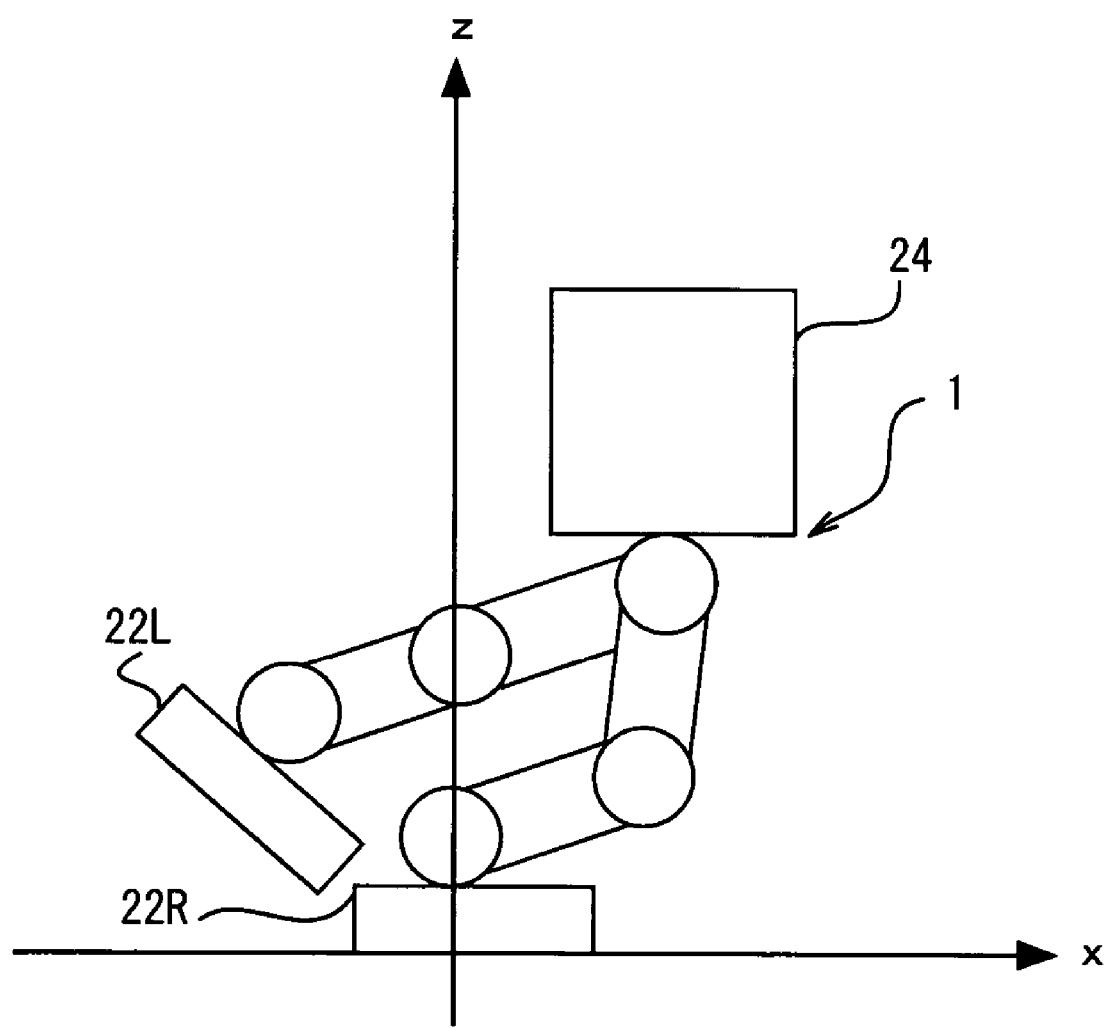
FIG. 10 is an explanatory view showing a situation where a trajectory of the body of the robot (illustrated in FIG. 1) diverges.

Then, explaining the gait for maintaining posture stability continuously, the dynamic model itself does merely calculate the body trajectory from the desired ZMP in such a manner that the dynamic equilibrium condition at each instant is approximately satisfied. It can not prevent the body trajectory from diverging (it can not avoid the position of the body 24 from deviating from a position corresponding to the positions of the feet 22R(L), as illustrated in FIG. 10).

It will then be discussed how the relationship between the body and the feet is appropriately retained so as to avoid divergence.

For ease of understanding, the nature of the linear inverted pendulum that is especially significant for obtaining future body trajectory analytically will first be discussed. The explanation will be made with the use of a discrete-time-series model.

Variables and parameters will be additionally defined for the inverted pendulum as follows:

ω0: natural angular frequency of inverted pendulum
ω0=sqrt (g/h) (here, sqrt indicate square root)
Δt: sample time
x[k]: inverted pendulum's position at k-th step (time kΔt)
v[k]: inverted pendulum's velocity at k-th step (time kΔt)
ZMPpend[k]: inverted pendulum's ZMP at k-th step (more precisely, it is assured that a signal obtained by zero-order holding the ZMPpend[k] is kept inputted from time kΔt to time (k+1)Δt. More specifically, it is assumed that the same signal is kept inputted to the inverted pendulum during that time of period)

Further, values q[k] and p[k] are defined by Eq. 5 as follows:

$$q[k]=x[k]+v[k]/\omega 0$$

$$p[k]=x[k]-v[k]/\omega 0 \qquad \text{Eq. 5}$$

By discretizing the equation of motion of the inverted pendulum and by solving with respect to q[k] and p[k], we obtain Eqs. 6 and 7. In the equations, "exp" indicates an exponential function (natural logarithm).

$$p[k] = \exp(-\omega 0 k \Delta t) * \left( p[0] + (\exp(\omega 0 \Delta t) - 1) \sum_{i=0}^{k-1} (\exp(i\omega 0 \Delta t) * ZMPpend[i]) \right) \qquad \text{Eq. 6}$$

$$q[k] = \exp(\omega 0 k \Delta t) * \left( q[0] + (\exp(-\omega 0 \Delta t) - 1) \sum_{i=0}^{k-1} (\exp(-i\omega 0 \Delta t) * ZMPpend[i]) \right) \qquad \text{Eq. 7}$$

The meaning of the equations will be discussed.

Assume that ZMPpend[i] is set to satisfy following Eq. 8 with respect to certain definite constants ZMPmin and ZMPmax.

$$ZMPmin \leq ZMPpend[i] \leq ZMPmax \qquad \text{Eq. 8}$$

By substituting the relationship between the middle term and the right term of Eq. 8 into Eq. 6, we obtain following Eq. 9.

$$p[k] \leq \exp(-\omega 0 k \Delta t) * \left( p[0] + (\exp(\omega 0 \Delta t) - 1) \sum_{i=0}^{k-1} (\exp(i\omega 0 \Delta t) * ZMPmax) \right) \qquad \text{Eq. 9}$$

From the theorem of sum of geometric series, we obtain Eq. 10.

$$\sum_{i=0}^{k-1} \exp(i\omega 0 \Delta t) = (1 - \exp(k\omega 0 \Delta exxpt))/(1 - \exp(\omega 0 \Delta t)) \qquad \text{Eq. 10}$$

Accordingly, Eq. 9 can be rewritten as Eq. 11.

$$p[k] \leq \exp(-\omega 0 k \Delta t) * p[0] + (1 - \exp(-\omega 0 k \Delta t)) * ZMPmax \qquad \text{Eq. 11}$$

Similarly, from the relationship between the left term and the middle term of Eq. 8, Eq. 12 can be obtained.

$$p[k] > \exp(-\omega 0 k \Delta t) * p[0] + (1 - \exp(-\omega 0 k \Delta t)) * ZMPmin \qquad \text{Eq. 12}$$

Since exp(−ω0kΔt) converges (gradually approaches) to zero when k becomes infinity, Eqs. 11 and 12 show that p[k] does not diverge and fall between ZMPmax and ZMPmin in due course, even if ZMPpend fluctuates.

Further, as a specific example, let us discuss a case that the ZMPpend becomes a constant value ZMP0 after lapse of a certain time. In that case, defining the time as time zero, Eq. 6 can be rewritten as Eq. 13. This indicates that p[k], irrespectively of its initial value, converges to ZMP0 in a geometrical series manner.

$$p[k]=\exp(-\omega 0 k \Delta t)*(p[0]ZMP0)+ZMP0 \qquad \text{Eq. 13}$$

More generally, it indicates that p[k], no matter what value it was at a certain time point, converges to a certain trajectory (that follows waveform of the ZMPpend) if the ZMPpend waveform is a same waveform.

On the other hand, q[k] tends to diverge as will be understood from Eq. 7.

As a specific example, let us again discuss the case that ZMPpend becomes a constant value ZMP0 after lapse of a certain time. Defining the time as time zero, Eq. 7 can be rewritten as Eq. 14. This indicates that q[k] diverges to ZMP0 in a geometric series manner, unless q[0] is ZMP0.

$$q[k]=\exp(\omega 0 k \Delta t)*(q[0]-ZMP0)+ZMP0 \qquad \text{Eq. 14}$$

Hereinafter, p[k] defined by Eq. 5 is referred to as "convergent component" and q[k] similarly defined by Eq. 5 is referred to as "divergent component".

From the above, it can be said that, in order to avoid divergence of the body trajectory and to retain an appropriate positional relationship between the body and feet, the convergent component can be neglected in practice, and what is significant is that to control the divergent component (viewed from the supporting leg) within a range that ensures robot walking.

More specifically, in order to avoid divergence of the body trajectory and to retain an appropriate positional relationship between the body and feet, it suffices if the ZMP trajectory parameters and other parameters are appropriately determined such that the divergent component does not exceed the range that ensures robot walking (i.e., the range that prevents posture from deviating markedly).

In view of the above, in the system proposed earlier, it inputs demand (demand value) concerning free leg foot's landing position and posture and landing time for next two walking steps, and determines the desired body position and posture trajectory, the desired foot position and posture trajectory and the desired ZMP trajectory. At this time, the gait parameters are partially corrected so as to ensure continuous walking. Hereinafter, the gaits being generated is referred to as "current time gait", a gait succeeding thereto is referred to as "next time gait" and a gait further succeeding thereto is referred to as "next but one time gait".

Thus, the technique proposed earlier simplified the dynamic model describing the dynamic behavior of the robot 1 and made possible to predict future robot behavior on a real-time basis and in an analytic manner, thereby enabling to generate a gait including the floor reaction force (desired ZMP) freely and on a real-time basis and to realize a gait of any stride, turning angle and walking period, etc., However, in the proposed technique, in order to enhance the real-time gait generation, if an excessively-simplified model is used, a generated gait will be far from that satisfies the dynamic equilibrium condition. In other words, an error or deviation of the ZMP grows.

For that reason, the motion generation system of a legged mobile robot according to this embodiment is arranged such that, even when an excessively-simplified model is used, a generated (corrected) gait can correct robot motion in such a manner that the dynamic equilibrium condition is satisfied more accurately.

It should be noted that the technique proposed in this embodiment will be applied not only to a case where a motion such as a gait is generated using the simplified model proposed earlier, but also to a case where a motion such as a gait is generated using a gait prepared beforehand as table values.

Returning to the explanation of the gait generator (with full-model correction) 100 illustrated in FIG. 5, the term "full-model" indicates a robot dynamic model that is different from that used in determining a current time gait parameters. Specifically, the full-model is preferably a robot model that is superior in the approximation accuracy to that used in determining the current time gait parameters. Explaining this with reference to the figures, the full-model should preferably be a robot dynamic model (illustrated, for example, in FIG. 6) that is superior in the approximation accuracy to the simplified model (illustrated in FIG. 7) used in determining the current time gait parameter (in the technique proposed earlier). Moreover, the full-model may be a model in which the moment of inertia is set about each material point.

In this specification, a model used to calculate (or output) the body position based on (with the inputs of) the desired foot position and posture, the desired body posture and the desired ZMP, is named "direct dynamic model", whilst a model used to calculate (or output) the desired ZMP based on (with the inputs of) the desired foot position and posture, the desired body posture and the body position, is named "inverse dynamic model".

The full-model provided at the full-model corrector 100c is a model named "inverse dynamic full-model" (often referred to simply as "inverse full-model") or a model named "direct dynamic full-model" (often referred to simply as "direct full-model"). Since the direct dynamic model calculation can not be solved analytically, the body position must be determined with searching. The volume of the direct dynamic model calculation is usually greater than that of the inverse dynamic model calculation.

The operation of the gait generation system of a legged mobile robot according to this embodiment, i.e., the gait correction will then be explained.

Figure 11:
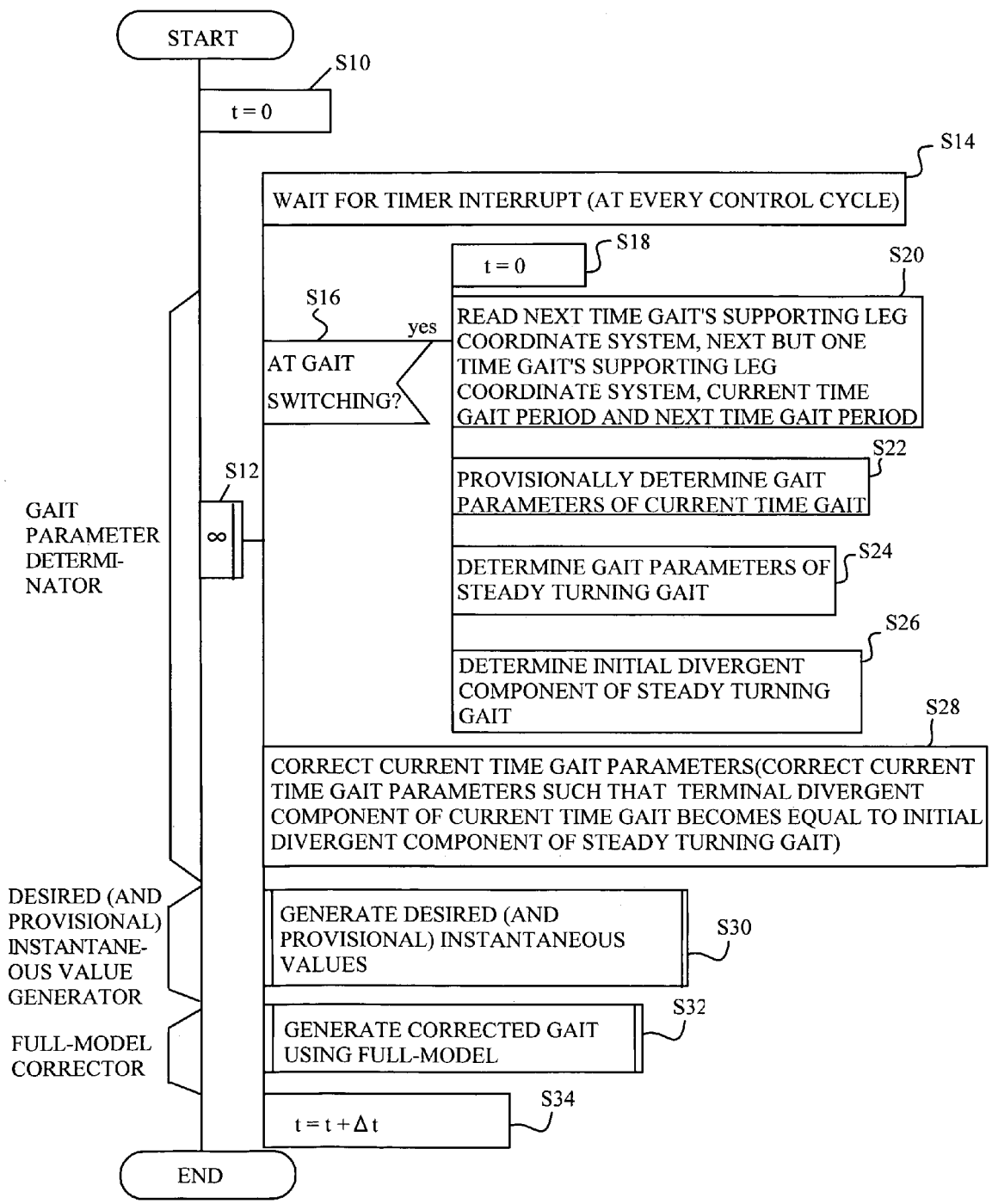
FIG. 11 is a flow chart showing the operation of the motion generation system of a legged mobile robot illustrated in FIG. 1.

FIG. 11 is a flow chart (structuralized flow chart) showing the gait generation of the gait generator (with full-model correction) 100.

The program begins at S10 in which various kinds of initialization processing are conducted. The program then proceeds, via S12, to S14 in which timer interrupt at every control cycle is waited for. The control cycle (period) is Δt. The program then proceeds to S16 in which it is determined whether the gait is at the time of switching. When the result is affirmative, the program proceeds to S18, whilst when the result is negative, the program proceeds to S28.

When the program proceeds to S18, the time t is initialized to zero as a current time. The program then proceeds to S20 in which a next time gait's supporting leg coordinate system, a next but one time gait's supporting leg coordinate system and a current time gait period and a next time gait period are read. There values are corresponding to the aforesaid demand. They may be stored in the memory as a walking schedule or may be determined based on an instruction inputted from the joystick 44 or other operator apparatus and the history of walking up to that time.

The program then proceeds to S22 in which gait parameters of the current time gait are provisionally determined or calculated.

As regards the parameters, the current time gait's initial free leg position and posture are determined to be the current free leg foot position and posture viewed from the current time gait's supporting leg coordinate system (as the initial values). The current time gait's initial supporting leg foot position and posture are determined to be the current supporting leg foot position and posture viewed from the current time gait's supporting leg coordinate system (as the initial values). The current time gait's terminal free leg foot position and postures are determined in response to the next time gait's supporting leg coordinate system viewed from the current time gait's supporting leg coordinate system. Specifically, they are determined in such a way that the foot position and posture of the free leg foot (obtained when rotated horizontally, without slippage, from terminal position and posture in the current gait, while keeping contact with the floor) will shift to the next gait's supporting leg coordinate system.

The current time gait's terminal supporting leg foot position and posture are determined to position and posture where the foot is in surface contact with the floor so as not to slip (those are obtained by being rotated from the current supporting position and posture). As a result, if the floor is flat, the current time gait's terminal supporting leg foot position and posture are equal to the current time gait's supporting leg coordinate system. In the gait mentioned here, although the supporting leg foot is made horizontal at the gait terminal, the foot may take other position and posture.

The ZMP trajectory parameters of the current time gait should be determined such that they are high in the margin of stability and do not change abruptly. The phrase "high in the margin of stability" indicates a condition where ZMP is present at the center or thereabout in a minimum convex polygon (the so-called supporting polygon and is described in detail in Japanese Laid-Open Patent Application Hei 10 (1998)-86081). The determination of current time gait's ZMP trajectory parameters is provisional and they are subject to correction as will be explained later.

The program then proceeds to S24 in which gait parameters of steady turning gait that is to be continuous to the current time gait is determined. It should be noted that the "steady turning gait" indicates a periodic gait that does not bring about discontinuity in motion at gait boundary when the gait is repeated.

Basically, the steady turning gait comprises the first turning gait and the second turning gait. The reason why the term "turning" is used is that, when the rate of turning is set to zero, since this indicates a straight advance, the term makes it possible to include "straight advance" in "turning" in a broad sense. The steady turning gait is generated by the gait generator (with full-model correction) 100 temporarily or tentatively in order to determine the divergent component at the current gait terminal. Therefore, the steady turning gait is not outputted from the gait generator 100.

In the gait setting, boundary conditions of the leg trajectory in the gait parameters of the first turning gait and the second turning gait are set or determined such that the leg trajectory is made continuous in the order of the current time gait, the first turning gait and the second turning gait. Specifically, the initial free leg foot position and posture of the first turning gait are set to be the terminal supporting leg foot position and posture of the current time gait viewed from the next time gait's coordinate system. The initial supporting leg position and posture of the first turning gait are set to be the current time gait's terminal free leg position and posture viewed from the next time gait's supporting leg coordinate system.

The terminal free leg foot position and posture of the first turning gait are, similarly to the determination of the current time gait's terminal free leg position and posture, set or determined in response to the next but one's time gait's supporting leg coordinate system viewed from the next time gait's supporting leg coordinate system. The terminal supporting leg position and posture of the first turning gait are foot position and posture obtained by rotating, while keeping floor contact, the foot (set to the next time gait's supporting leg coordinate system) to be brought in surface contact with the floor so as not to slip. Therefore, if the floor surface is flat, the terminal supporting leg position and posture of the first turning gait become equal to those in the next time gait's supporting leg coordinate system.

The terminal free leg foot position and posture of the second turning gait are set or determined to be the same as the terminal free leg foot position and posture of the current time gait viewed from the current time gait's supporting leg coordinate system. The terminal supporting leg position and posture of the second turning gait are set or determined to be same as those of the supporting leg foot position and posture of the current time gait viewed from the current time gait's supporting leg coordinate system.

Figure 12:
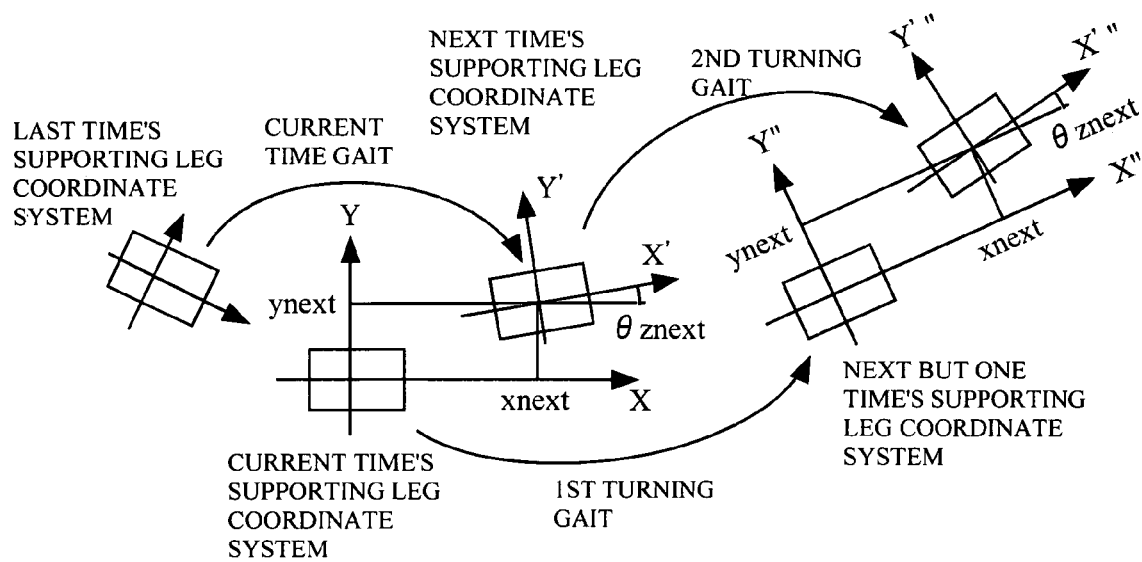

FIG. 12 illustrates relationships among these gait parameters.

The first turning gait and the second turning gait have the same walking period as that of the next time gait. (The walking period should not necessarily be determined to be the same value, but should preferably be determined in response to the next time gait walking period.) Other movement parameters of the current time gait, the first turning gait and the second turning gait (including time parameters such as two-leg supporting period's length) should be determined appropriately in response to the determined parameters mentioned above in such a way that they satisfy the conditions of gait (e.g., the velocity of the electric motors (actuators) are within permissible ranges.)

The ZMP trajectory parameters of the first turning gait and the second turning gait should be set or determined such that they have high margin of stability and do not change abruptly.

Figure 13:
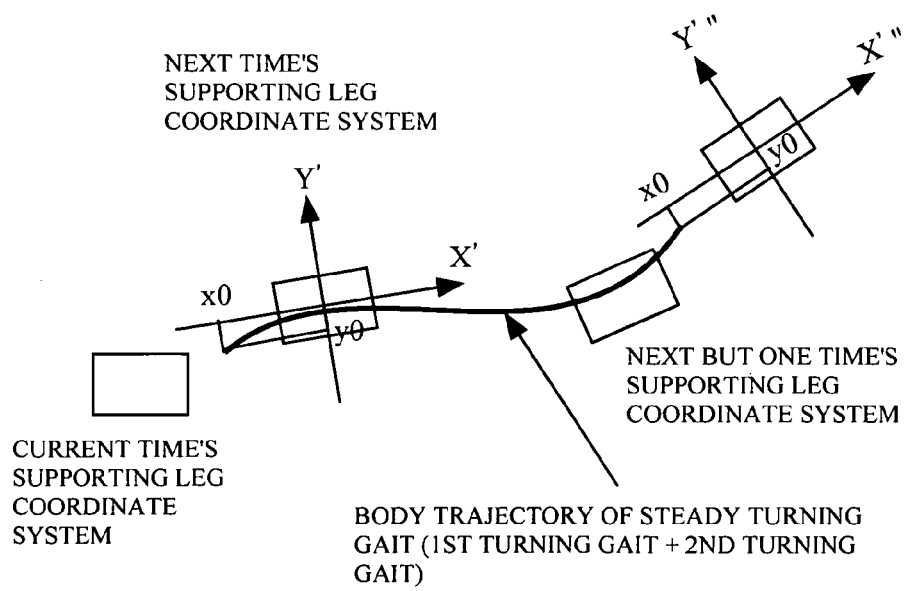

Aside from the above, if initial position and velocity of the body-representing position are set to values X0, V0, after having generated the aforesaid first turning gait and the second turning gait with the use of the simple model illustrated in FIG. 7, the initial position and velocity of the body-representing position when the first turning gait generation is again started, become equal to the set values X0, V0. The values X0, V0 are hereinafter referred to as "body-representing point's initial position/velocity of the steady turning gait". FIG. 13 shows this. In the figure, the value X0 is illustrated as "(x0, y0)", and the illustration of V0 is omitted.

With this, when the first turning gait and the second turning gait are generated repeatedly using the simplified model illustrated in FIG. 7, the body-representing point's initial position and velocity of the first turning gait are equal to the values X0, V0, unless there are accumulated calculation errors. In other words, the continuity of walking can be ensured. Divergent component at this time, i.e., $X0+V0/\omega 0$ is hereinafter referred to as "steady turning gait's initial divergent component".

Returning the explanation of FIG. 11, the program then proceeds to S26 in which this steady turning gait's initial divergent component is determined. Since the determination is described in detail in Japanese Patent Application No. 2000-352011, no further explanation will be made here.

The program then proceeds to S28 in which the current time gait is corrected. Specifically, the current time gait parameters are corrected such that the current time gait's terminal divergent component becomes equal to the steady turning gait's initial divergent component. Since the determination is described in detail in Japanese Patent Application No. 2000-352011, no further explanation will be made here, also.

The program then proceeds to S30 in which desired (and provisional) instantaneous values of the current time gait are determined from the determined gait parameters.

Figure 14:
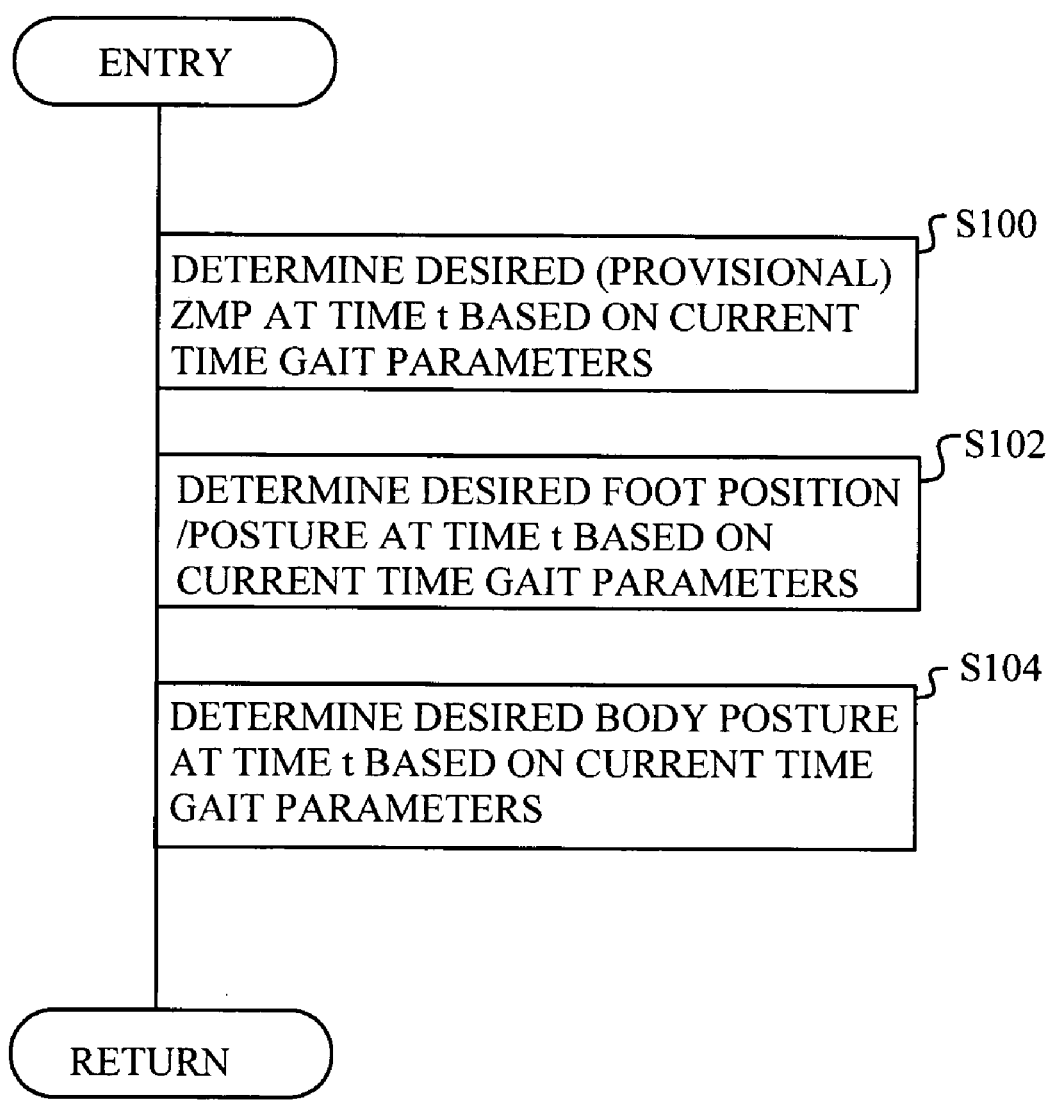
FIG. 14 is a subroutine flow chart showing the generation of desired instantaneous values referred to in the flow chart of FIG. 11.

FIG. 14 is a flow chart showing the subroutine for this.

Explaining it, the program begins in S100 in which the desired ZMP at time (current time) t is determined based on the current time gait parameters, and proceeds to S102 in which the desired foot position and posture at the time t is determined based on the current time gait parameters. The program then proceeds to S104 in which the desired body posture at the time t is determined based on the current time gait parameters.

Returning to the explanation of the flow chart of FIG. 11, the program proceeds to S32 in which a corrected gait is generated (the gait is corrected) using the full-model. Specifically, as explained with reference to FIG. 5, there are conducted the calculation or determination of the corrected desired body position and the ZMP-converted value of full-model's correct moment about the desired ZMP, etc.

The gait correction at S32 of the flow chart of FIG. 11 constitutes the characteristic features of the motion generation of a legged mobile robot of the present invention. Variants or modifications of the features will be discussed in later embodiments. Therefore, the variants or modifications of the gait correction will first be outlined here.

Figure 15:
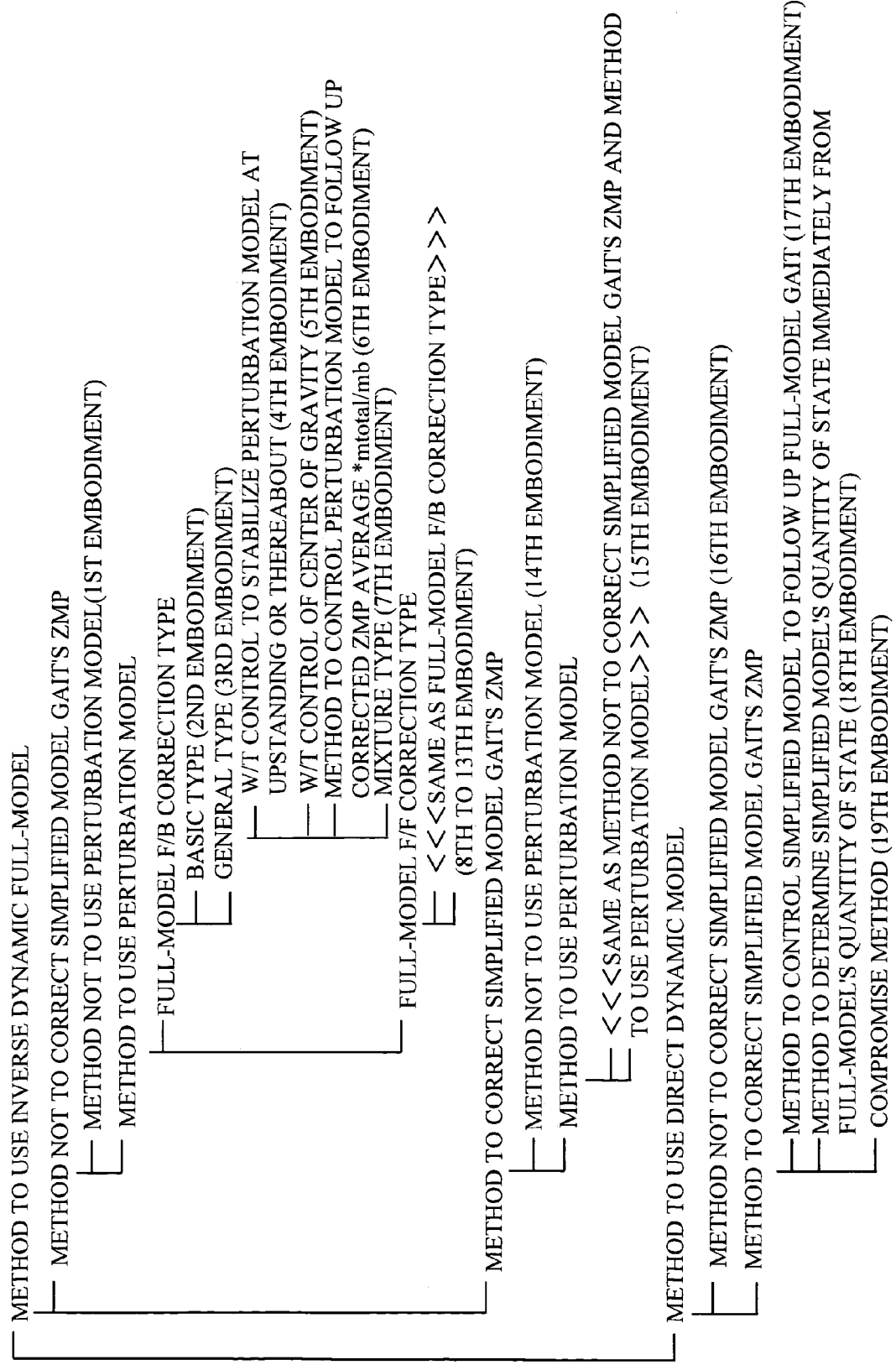
FIG. 15 is a table showing variations or modifications of the gait correction conducted in the first to twentieth embodiments of the motion generation system of a legged mobile robot according to the present invention.

FIG. 15 is a table showing the variations or modifications of the gait correction. The embodiment corresponding thereto is indicated by its number.

The gait correction is grouped into methods to use the inverse dynamic full-model (inverse full-model) and those to use the direct dynamic full-model (direct full-model). Each group is then divided into methods not to correct the simplified model's ZMP (the desired ZMP inputted into the simplified model) and that to correct it.

The group that uses the inverse dynamic full-model, but not to correct the simplified model's ZMP is divided into a group that uses a perturbation dynamic model for correction (hereinafter referred to as "perturbation model") and that does not use it. The group that uses the perturbation model is divided into a group that conducts a feedback (F/B) correction of the full-model and that conducts a feedforward (F/F) correction of the full-model. The other group that uses the inverse dynamic full-model and that corrects the simplified model's ZMP is divided into groups in a manner similar to the group that does not correct the simplified model's ZMP.

Figure 16:
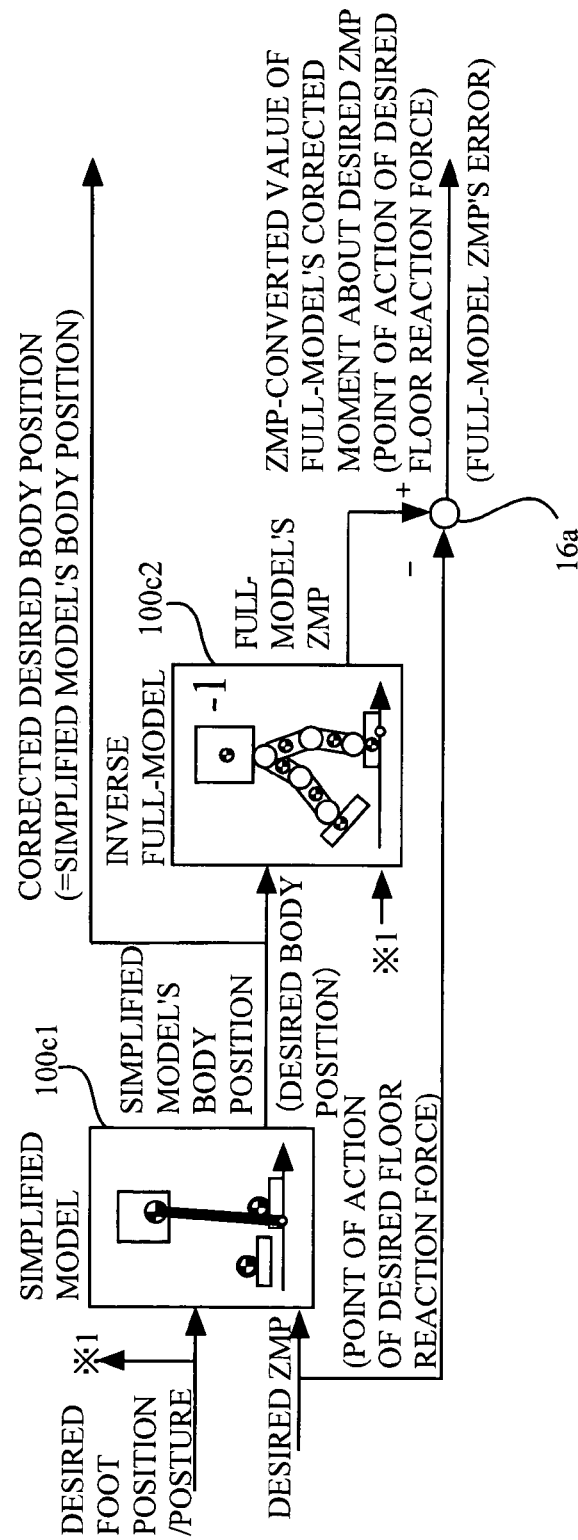
FIG. 16 is a functional block diagram showing the gait correction conducted in the motion generation system of the first embodiment of the motion generation system of a legged mobile robot according to the present invention.

FIG. 16 is a functional block diagram showing the gait correction of the motion generation system according to the first embodiment.

It should be noted that in all embodiments including the first embodiment (shown in FIG. 16) but excluding eighth to thirteenth embodiment explained later, the gait correction must satisfy the condition expressed in the following equation.

Full-model's ZMP=Desired ZMP+ZMP-converted value of full-model's corrected moment about the desired ZMP  Eq. 15

This indicates that, on the premise that the full-model is a strict model, the gait must be corrected to strictly satisfy the dynamic equilibrium condition. Specifically, the full-model corrector 100c corrects the gait by changing the desired body trajectory in the desired gait comprising the desired body trajectory, the desired foot trajectory and the desired ZMP trajectory, or by generating the desired floor reaction force's moment about the desired ZMP (that is zero in the original desired gait). In the above, the term "full-model's ZMP" indicates a ZMP calculated by using the inverse dynamic full-model (inverse full-model) or by causing the model to output the ZMP. In the eighth to thirteenth embodiments, the gait is corrected to almost satisfy the dynamic equilibrium condition, since the correction is conducted in a feedforward fashion, it can not correct the gait to strictly satisfy the condition.

As illustrated, in the first embodiment, the simplified model's body position (the desired body position) is calculated with the use of the desired foot position and posture, the desired body posture (not shown) and the simplified model. Here, the desired body position indicates the "desired body position" before having been corrected as the "corrected desired body position" illustrated in FIG. 4.

In the correction, specifically, the feet ZMP (ZMPfeet) at time t is calculated, from the desired foot position and posture at time t and preceding thereto, using Eqs. 1 and 2. Then, the inverted pendulum's ZMP (ZMPpend) is calculated using Eq. 3, the inverted pendulum's horizontal position is then calculated from the inverted pendulum's ZMP using Eq. 4, and the horizontal position of the body is next determined in such a way that it becomes equal to the inverted pendulum material point's horizontal position, whilst the body height is determined using a technique of body height determination proposed by the applicant earlier in Japanese Laid-Open Patent Application No. Hei 10 (1998)-86080.

Next, the full-model's ZMP is calculated based on the determined body position using the inverse full-model, and a full-model ZMP's error is calculated from the following equation.

Full-model ZMP's error=Full-model's ZMP−Desired ZMP  Eq. 15a

The full-model ZMP's error, thus calculated, is determined or outputted as the ZMP-converted value of full-model's corrected moment about the desired ZMP. (In this and later embodiments, the desired body posture inputted to the inverse full-model is set to an upstanding posture, for the ease of explanation).

Thus, the correction is achieved in such a manner that a deviation from the dynamic equilibrium condition produced by modeling error of the simplified model is canceled by the floor reaction force's moment about the desired ZMP, more specifically, the motion of the leg 2 to push or kick the floor is changed such that the total floor reaction force's moment generated cancels the deviation.

As mentioned above, the ZMP calculated with the use of the inverse full-model is called the full-model's ZMP. The body position calculation using the simplified model is determined or outputted as the corrected desired body position, and is inputted into a robot geometric model 103 illustrated in FIG. 4.

The arrangement or structure shown in FIG. 16 can be expressed by the following two equations:

Corrected desired body position=Simplified model' body position  Eq. 16a

ZMP-converted value of full-model's corrected moment about desired ZMP=Full-model's ZMP−Desired ZMP  Eq. 16b Returning to the explanation of the flow chart of FIG. 11, the program then proceeds to S34 in which Δt is added to the time t, and the program returns to S14 to repeat the procedures mentioned above.

Returning to the explanation of FIG. 4 to continue the operation of the gait generation system according to the first embodiment, the desired body posture and the corrected desired body position (trajectory) in the instantaneous values of the desired gait generated by the gait generator (with full-model correction) 100, are forwarded to a later block 102 and are immediately inputted in the aforesaid robot geometric model (inverse kinematics solution) 103 therein.

The other parameters including the desired foot position and posture (trajectory), the desired ZMP (trajectory), the ZMP-converted value of full-model's corrected moment about the desired ZMP and the desired total floor reaction force (trajectory) are directly forwarded to a composite compliance motion determinator 104. These parameters are also forwarded to a desired floor reaction force distributor 106 where the floor reaction force is distributed to each foot 22R, L and the desired foot floor reaction force central point and the desired foot floor reaction force are determined. The determined parameters are forwarded to the composite compliance motion determinator 104.

The composite compliance motion determinator 104 forwards a corrected desired foot position and posture (with deformation compensation) to the robot geometric model 103. The robot geometric model 103 calculates, when inputted with the desired body position and posture (trajectory) and the corrected desired foot position and posture (with deformation compensation) (trajectory), joint displacement commands (command values), for the twelve joints including 10R, L, to satisfy them and sends the same to a joint displacement controller 108. The joint displacement controller 108 controls the displacement of the twelve joints such that they follow up the calculated joint displacement commands (command values).

The actual foot floor reaction force resulting in the robot 1 is detected from the output of the six-axis force sensor 34 and the detected values are forwarded to the aforesaid composite compliance motion determinator 104. The actual inclination angular error resulting in the robot 1 is detected from the output of the inclination sensor 36 and the detected value is sent to a posture stabilization controller 112 where a compensating total floor reaction force's moment about the desired ZMP (desired total floor reaction force central point) Mdmd for restoring posture inclination is calculated.

Further, the aforesaid ZMP-converted value of full-model's corrected moment about the desired ZMP is converted into a moment at a moment converter 114 and is added to the compensating total floor reaction force's moment Mdmd. The resultant sum of the moments is forwarded to the composite compliance motion determinator 104. The determinator 104 generates moment corresponding thereto about the desired ZMP by correcting the desired foot position and posture based on the inputted values. Since the ZMP-converted value of full-model's corrected moment about the desired ZMP is added to the compensating total floor reaction force's moment about the desired ZMP Mdmd, as mentioned just above, they need not always be directly inputted to the composite compliance motion determinator 104 or the desired floor reaction force distributor 106.

Since the arrangement or structure and operation of the composite compliance motion determinator 104 (illustrated in the block enclosed by dashed lines in FIG. 4) are described in detail in Japanese Laid-Open Patent Application Hei 10 (1998)-277969 proposed by the applicant, no further explanation will be made here.

Having been arranged in the foregoing manner, the system according to the first embodiment can correct the gait generated with the use of the simplified model proposed earlier such that the dynamic equilibrium condition is satisfied accurately. Further, the system can generate a motion of the gait that satisfies the dynamic equilibrium condition accurately and can control the robot 1 to follow up the generated motion, thereby enabling to improve the posture stabilization.

Furthermore, by incorporating the free gait generation proposed in the earlier application of the applicant's Japanese Patent Application No. 2000-352011 into this system, it becomes possible to generate a gait (including the floor reaction force) that satisfies the dynamic equilibrium condition, freely and on a real-time basis, to generate a gait of any stride, turning angle and walking period, etc., and to generate a gait that is continuous at a boundary of adjacent gaits in displacement and velocity of the robot's components.

It should be noted that, although the gait correction in this embodiment has an advantage that the volume of calculation is decreased since only the floor reaction force is manipulated, the margin of stability of the motion resulting in from the corrected gait is somewhat degraded when compared to the embodiments explained later.

Figure 17:
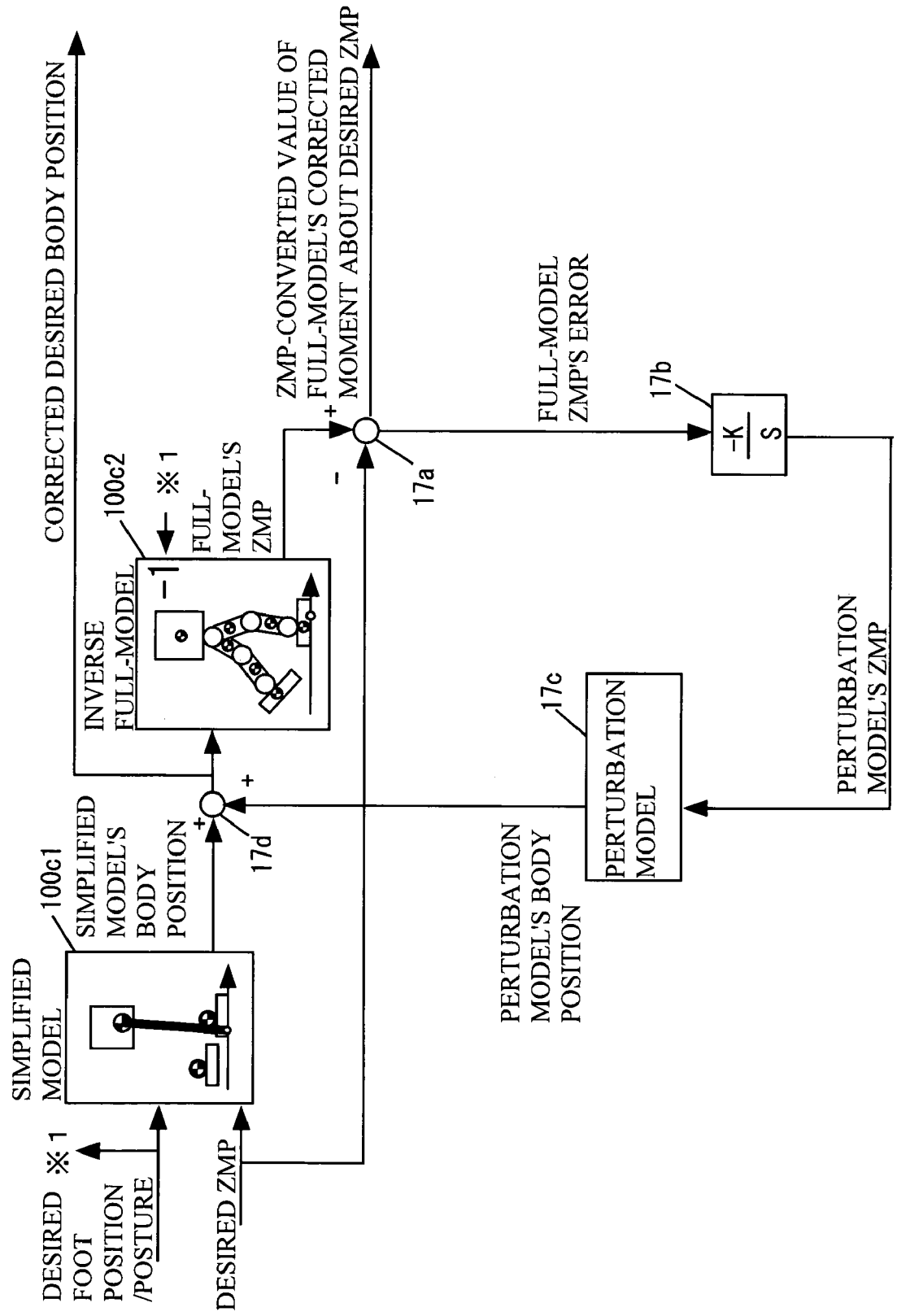
FIG. 17 is a functional block diagram showing the gait correction conducted in the motion generation system of a legged mobile robot according to a second embodiment of the present invention.

FIG. 17 is a functional block diagram showing the operation of the motion generation system of a legged mobile robot according to a second embodiment of the present invention. More specifically, it shows the gait correction explained with reference to S32 of the flow chart of FIG. 11.

The gait correction in the second embodiment is a method to use the inverse dynamic full-model (inverse full-model), a method not to correct the ZMP of the simplified model's gait, and a method to use the perturbation model. Further, it is a method of the full-model feedback correction and is the basic of full-model feedback corrections described in the embodiments up to a seventh embodiment.

As illustrated, in the second embodiment, a feedback loop is added to the arrangement or structure of the first embodiment. The feedback loop inputs a value obtained by integrating (1/S; S: Laplace operator) the full-model ZMP's error and by multiplying it by an integral gain (−K that is a value corresponding to a feedback gain) to the perturbation model. And, it inputs a perturbation model's body position outputted from the perturbation model to the inverse-full model as an additional inputted.

To be more specific, the system calculates the full-model's ZMP, using the inverse full-model, based on the desired foot position and posture, the desired body posture and the corrected desired body position (explained below), calculates an error from the desired ZMP (full-model ZMP's error), and determines (outputs) the error as the ZMP-converted value of full-model's corrected moment about the desired ZMP. At the same time, it integrates the calculated error, multiplies the integrated value by the integral gain, and inputs the obtained product to the perturbation model as the perturbation model's ZMP such that the output of the perturbation model (perturbation model's body position) is added to desired body position (before correction) calculated using the simplified model to obtain the corrected desired body position (that is to be inputted to the inverse full-model).

Here, different form the first embodiment, the body position (calculated with the use of the simplified model) is added with the perturbation model's body position (calculated with the use of the perturbation model), and the sum is determined or outputted as the corrected desired body position.

Figure 18:
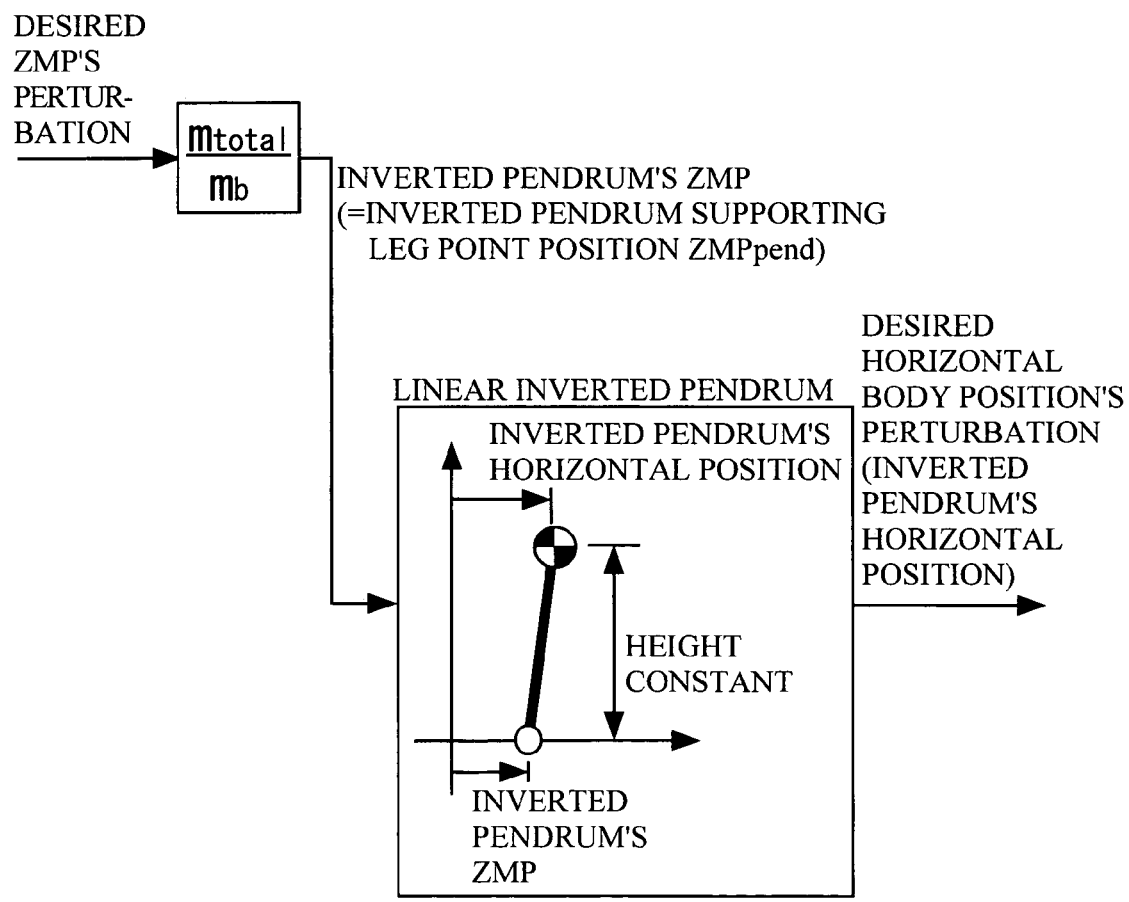
FIG. 18 a block diagram showing the dynamics calculation using a perturbation model to be used in the gait correction conducted in the motion generation system of a legged mobile robot according to the second embodiment of the present invention.

As illustrated in FIG. 18, the perturbation model is a model that expresses a relationship between the desired ZMP's perturbation and the desired body horizontal position's perturbation under a constraint condition that the foot position and posture are not perturbed. More specifically, it is a model similar to the simplified model illustrated in FIG. 7, but is modified to express the relationship between the desired ZMP's perturbation and the desired body horizontal position's perturbation without changing behavior of (without perturbing) the feet material points.

Figure 19:
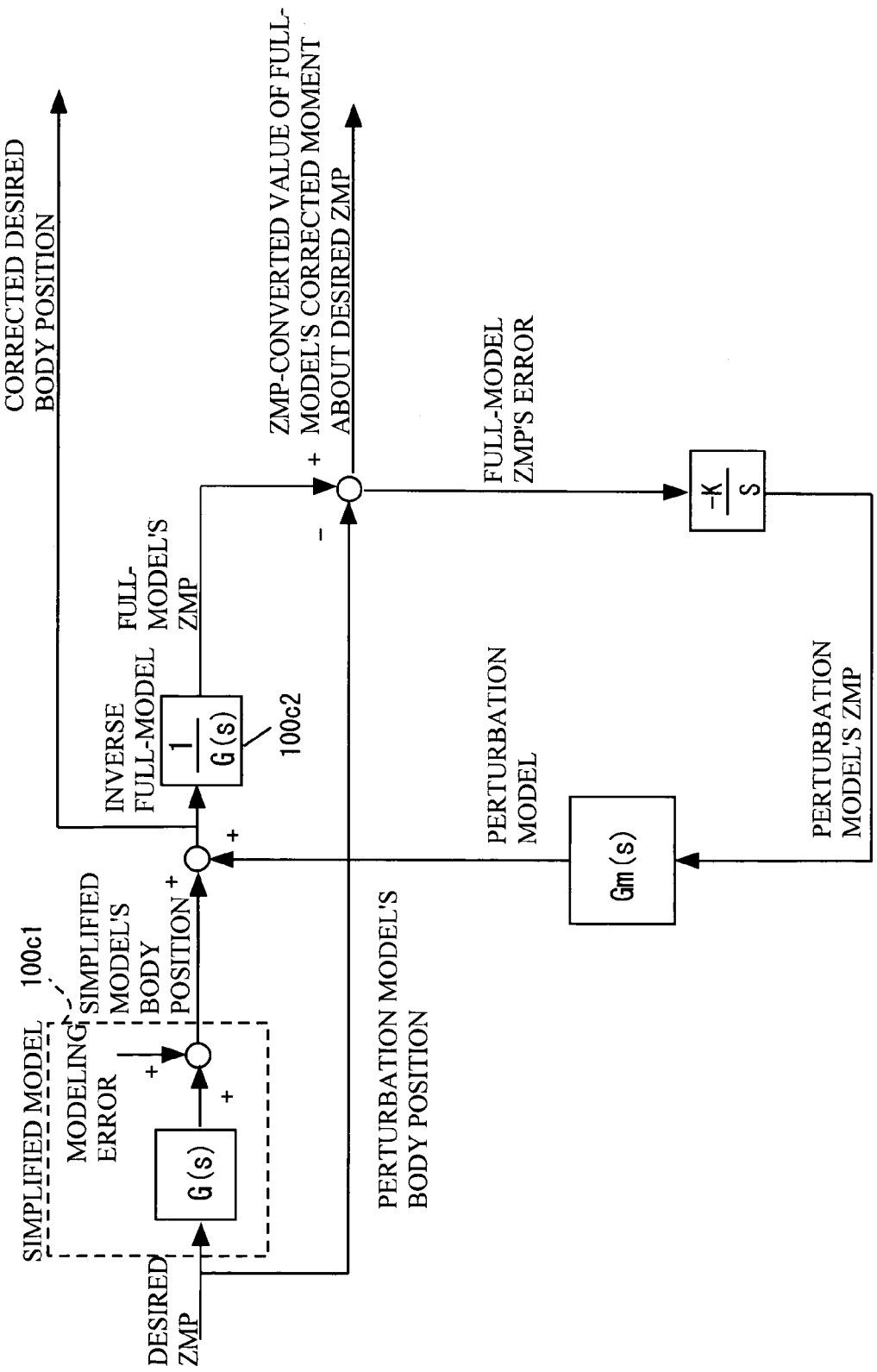
FIG. 19 is a functional block diagram showing a modification of the gait correction conducted in the motion generation system of a legged mobile robot according to the second embodiment of the present invention.
Figure 20:
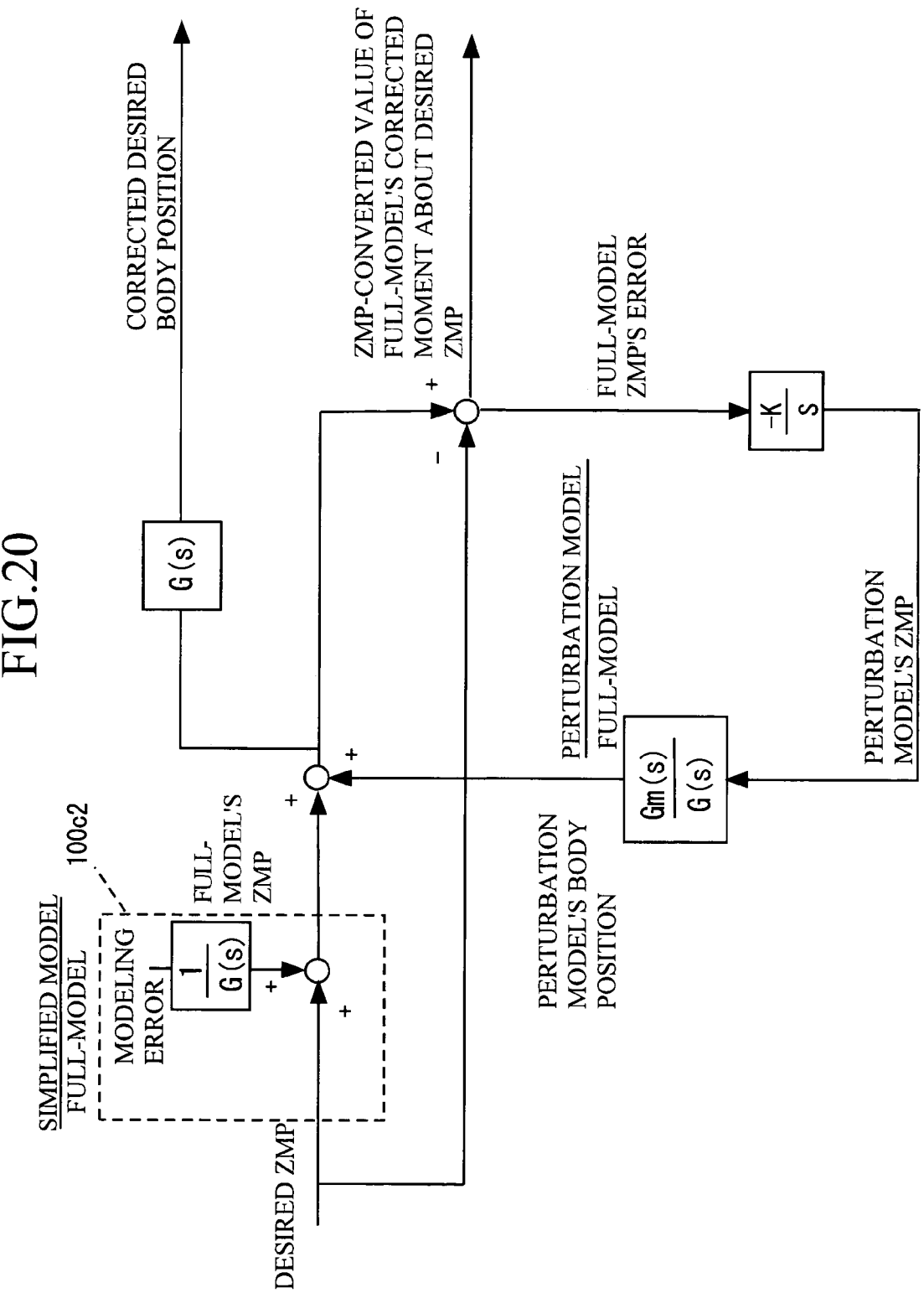
FIG. 20 is a functional block diagram similarly showing a modification of the gait correction conducted in the motion generation system of a legged mobile robot according to the second embodiment of the present invention.
Figure 21:
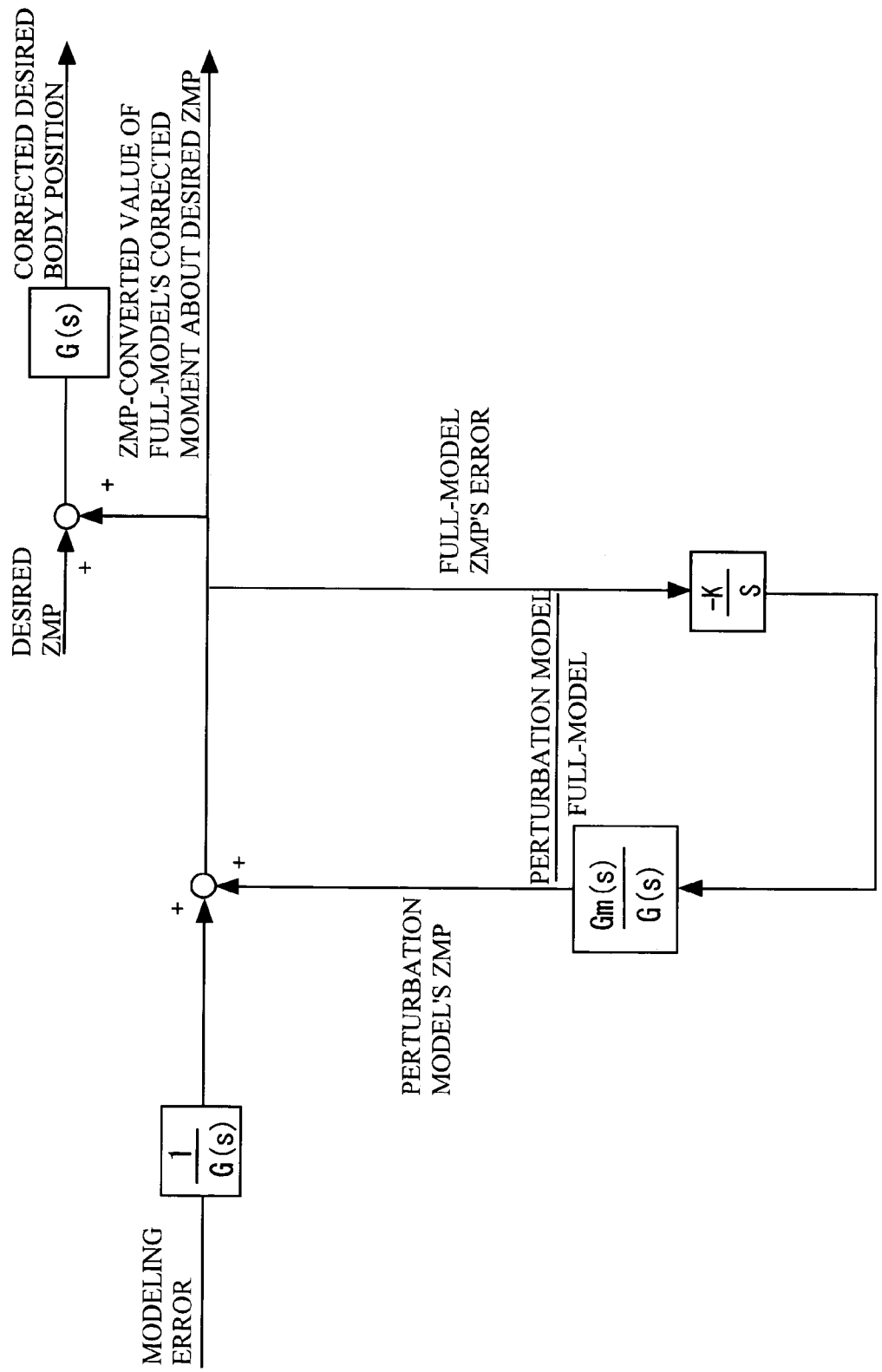
FIG. 21 is a functional block diagram similarly showing a modification of the gait correction conducted in the motion generation system of a legged mobile robot according to the second embodiment of the present invention.

In the illustrated arrangement or structure, when defining a transfer function of the inverse full-model as 1/G(s) and that of the perturbation model as Gm(s), and approximating that of the simplified model as (G(s)+modeling error), the illustrated arrangement or structure can be approximated by an arrangement shown in FIG. 19 and can be further modified as those as shown in FIGS. 20 and 21.

Figure 22:
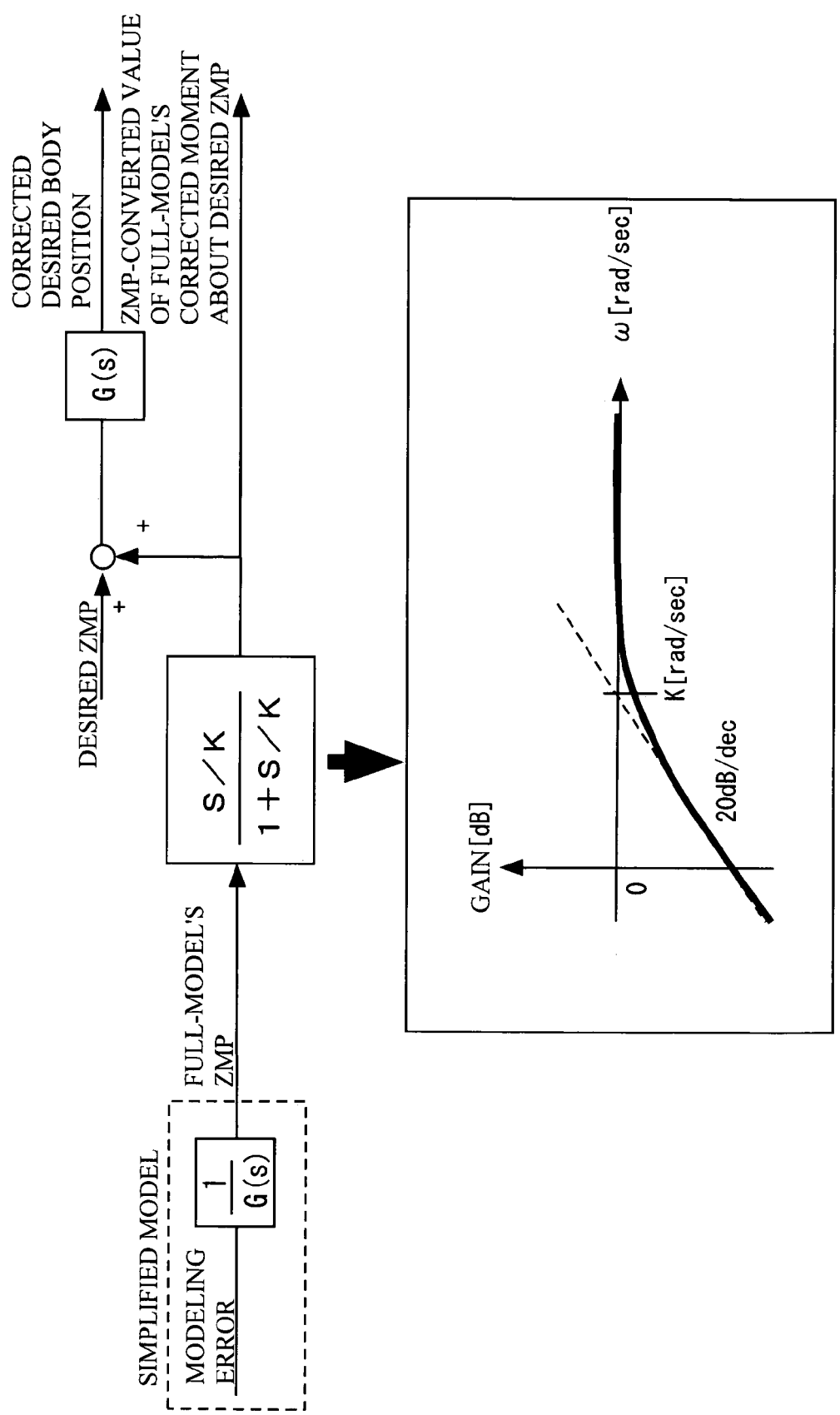
FIG. 22 is a functional block diagram similarly showing a modification of the gait correction conducted in the motion generation system of a legged mobile robot according to the second embodiment of the present invention.

Further, when the perturbation model's transfer function Gm(s) is approximated by the inverse transfer function G(s) of the inverse full-model's transfer characteristic, since Gm(s)/G(s) can be deemed as 1, the illustrated arrangement or structure can eventually be modified as shown in FIG. 22 in an approximated manner.

From the above, it will be understood that, in the gait correction in the second embodiment, the ZMP-converted value of full-model's corrected moment about the desired ZMP is almost equal to a value obtained by filtering its modeling error by a low-cut filter (high-pass filter) whose cutoff frequency is $K/2\pi$ [Hz] (or whose cutoff angular frequency is K [rad/sec]).

Aside from the above, to generate the full-model's corrected moment about the desired ZMP equals to correct the desired ZMP to a sum of the desired ZMP and the ZMP-converted value of full-model's corrected moment about the desired ZMP. Since the desired ZMP must have been designed in an ideal pattern taking the margin of stability and some similar factors into account, the ZMP-converted value of full-model's corrected moment about the desired ZMP should ideally be zero.

In the gait correction in the second embodiment, if the absolute value K of the integral gain is sufficiently large, the ZMP-converted value of full-model's corrected moment about the desired ZMP will almost be zero and will be close to the ideal.

Having been arranged in the foregoing manner, the system according to the second embodiment can have the same effects as those of the first embodiment and can generate a gait of high margin of stability. However, although the system still has the advantage that the volume of calculation is small, since the perturbation model's body position tends to oscillate, the system is not always practical.

Figure 23:
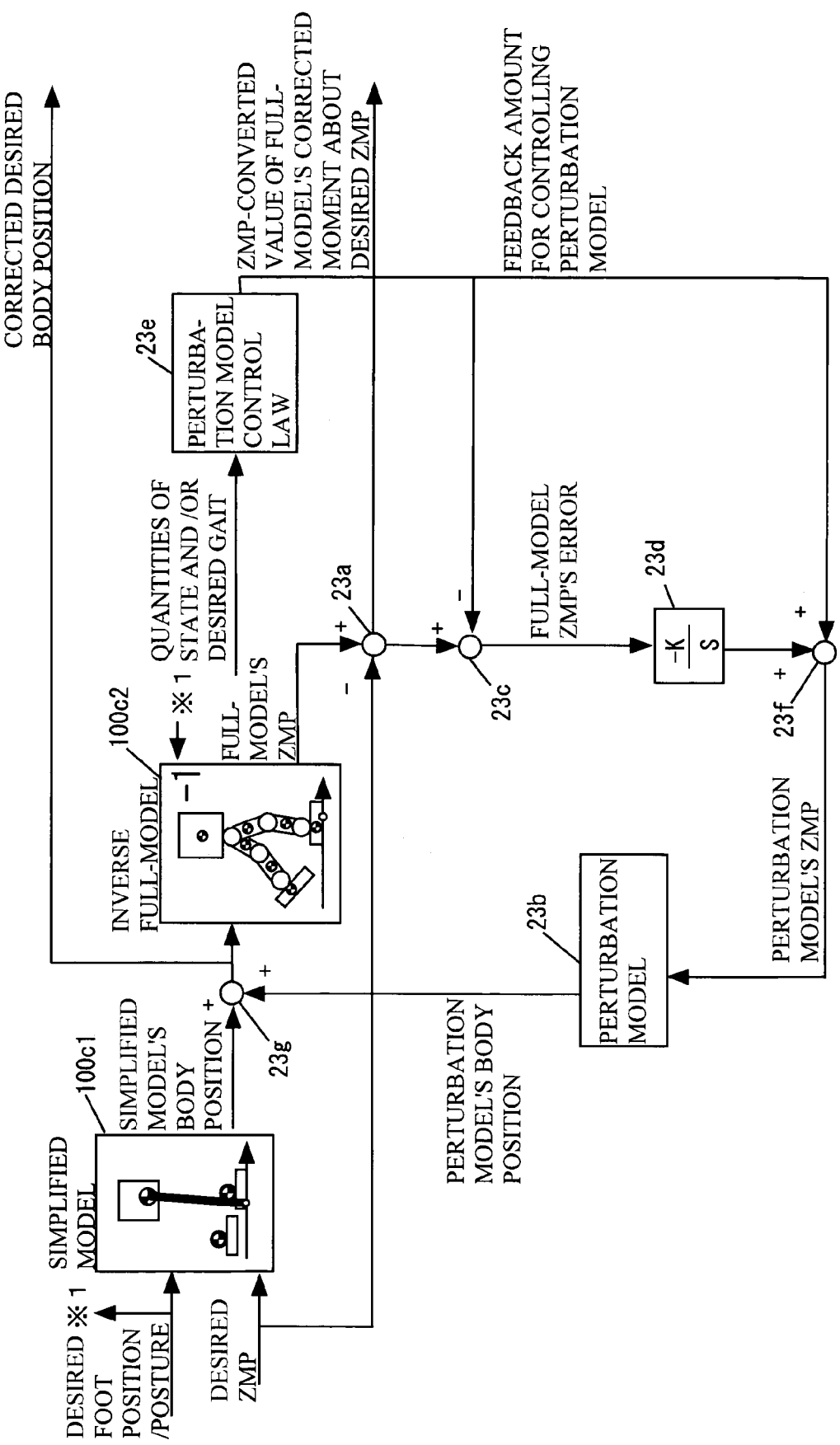
FIG. 23 is a functional block diagram showing the gait correction conducted in the motion generation system of a legged mobile robot according to a third embodiment of the present invention.

FIG. 23 is a functional block diagram showing the operation of the motion generation system of a legged mobile robot according to a third embodiment of the present invention. More specifically, it shows the gait correction explained with reference to S32 of the flow chart of FIG. 11.

The gait correction in the third embodiment is a method to use the inverse dynamic full-model (inverse full-model), a method not to correct the ZMP of the simplified model's gait, and a method to use the perturbation model. Further, it is a method of the full-model feedback correction and is a general method common to the embodiments up to the seventh embodiment.

Explaining this with focus on a difference from the foregoing embodiments, in the third embodiment, in order to solve the drawback of the second embodiment, i.e., in order to prevent the perturbation model oscillation, a perturbation model control law 23e is added to the arrangement or structure of the second embodiment in such a manner that a feedback control amount for controlling the perturbation model (that is an output of the control law) 23b is inputted to the inverse-full model as an additional input.

To be more specific, like the first and second embodiments, the system calculates the full-model ZMP's error, and outputs the error as the ZMP-converted value of full-model's corrected moment about the desired ZMP. At the same time, it inputs various quantities of states (e.g., perturbation model's inverted pendulum's position and velocity, full-model's center of gravity's position and velocity) and/or the desired gait (the desired gait parameters), and calculates the feedback control amount for controlling the perturbation model using the perturbation model control law. Then, it subtracts the calculated value from the ZMP-converted value of full-model's corrected moment about the desired ZMP to determine the full-model ZMP's error, integrates the determined full-model ZMP's error, multiplies the error by an integral gain (−K), adds the feedback amount for controlling the perturbation model to the product, and inputs the sum to the perturbation model.

Giving a supplementary explanation to the calculation of the full-model ZMP's error, as mentioned in the second embodiment, since the product of the transfer functions of the perturbation model and the inverse full-model is almost 1 when the transfer function of the perturbation model is approximated by the inverse transfer function of the transfer function of the inverse full-model, the augmentative amount due to the feedback amount for controlling the perturbation model added at the time of calculating the perturbation model ZMP, becomes almost equal to the feedback amount for controlling the perturbation model. Since the amount is added intentionally to prevent the perturbation model from oscillating, it is not the simplified model's error.

In the third embodiment, therefore, taking into account the fact that the feedback amount for controlling the perturbation model is added, the equation for calculating the full-model's ZMP error is modified as follows:

Full-model ZMP's error=Full-model's ZMP−Desired ZMP−Feedback amount for controlling perturbation model     Eq. 17

When the absolute value K of the integral gain is sufficiently great, the full-model ZMP's error becomes almost zero. Accordingly, Eq. 17 can be approximated by the next equation.

Full-model's ZMP−Desired ZMP≈Feedback amount for controlling perturbation model     Eq. 18

From Eqs. 15 and 18, the following equation can be obtained:

ZMP-converted value of full-model's corrected moment about desired ZMP≈Feedback amount for controlling perturbation model     Eq. 19

Therefore, when determining or calculating the ZMP-converted value of full-model's corrected moment about the desired ZMP, instead of Eq. 15, Eq. 19 may be used. The rest of the arrangement or structure is the same as that of the second embodiment.

In contrast to the second embodiment in which the ZMP-converted value of full-model's corrected moment about the desired ZMP is close to the ideal value (i.e., zero), in the third embodiment, disadvantageously, this value is almost equal to the feedback amount for controlling the perturbation model. For this reason, the feedback control law should be designed in such a way that the feedback amount for controlling the perturbation model becomes small as far as possible (ideally to zero).

Having been arranged in the foregoing manner, the system according to the third embodiment can have the same effects as those of the second embodiment and can prevent the perturbation model from oscillating.

Figure 24:
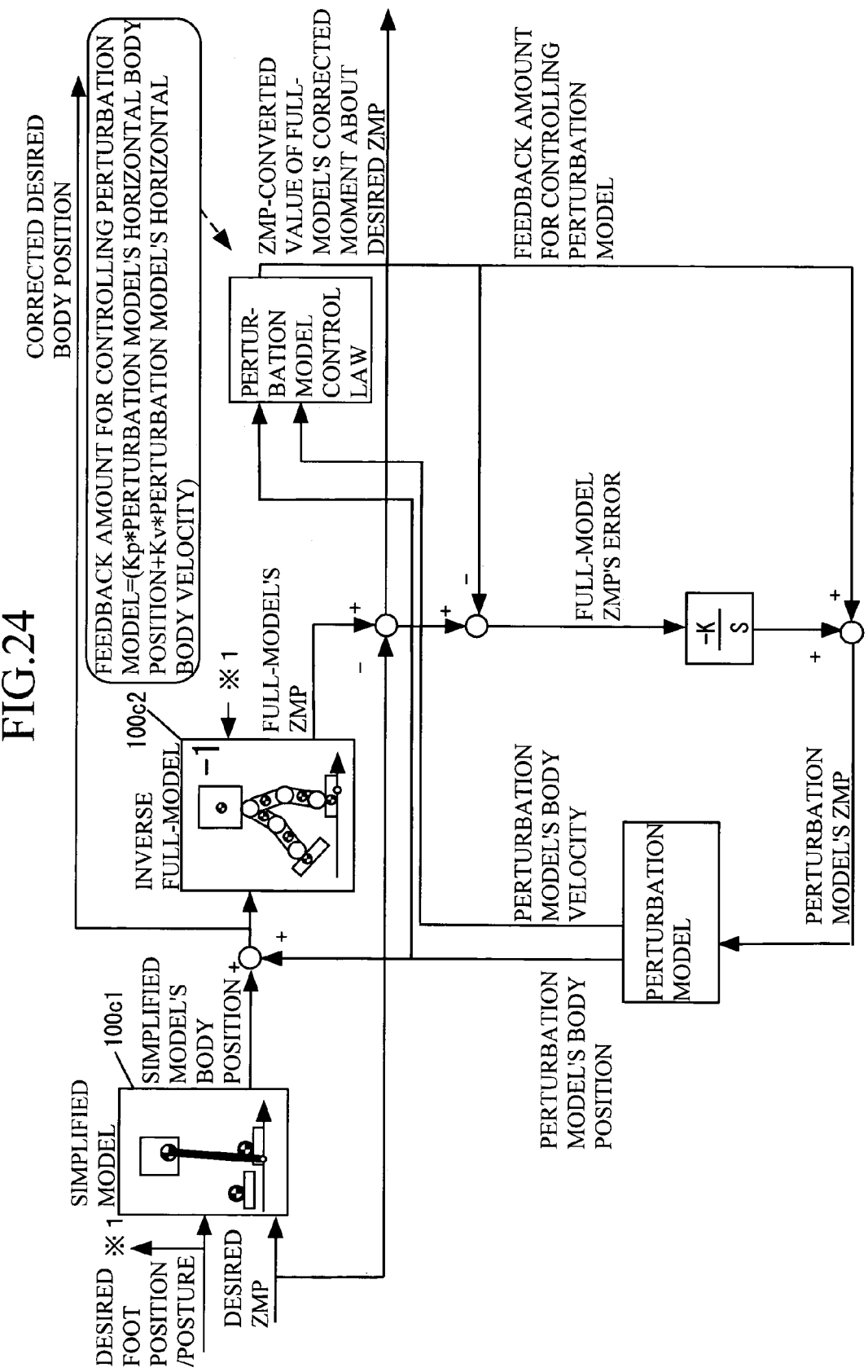
FIG. 24 is a functional block diagram showing the gait correction conducted in the motion generation system of a legged mobile robot according to a fourth embodiment of the present invention.

FIG. 24 is a functional block diagram showing the operation of the motion generation system of a legged mobile robot according to a fourth embodiment of the present invention. More specifically, it shows the gait correction explained with reference to S32 of the flow chart of FIG. 11.

The gait corrections in the fourth embodiment to a seventh embodiment are concrete examples of the third embodiment. Specifically, the characteristic feature in the corrections is that there is added a control to stabilize the perturbation model at an upstanding position or thereabout.

Explaining this with focus on a difference from the third embodiment, in the fourth embodiment, the following equation is used as the control law for the perturbation model:

Feedback amount for controlling perturbation model=$K_p$*Perturbation model's horizontal body position+$K_v$*Perturbation model's horizontal body velocity     Eq. 20

In the above, Kp and Kv are control gains.

Specifically, the embodiment is arranged such that, the feedback amount for controlling the perturbation model is calculated based on the perturbation model's horizontal body position and velocity (that are calculated by using the perturbation model). The rest of the arrangement or structure is the same as that of the third embodiment.

Having been arranged in the foregoing manner, the system according to the fourth embodiment can have the same effects as those of the third embodiment and can prevent the perturbation model from oscillating. However, the fourth embodiment has a disadvantage that an average value of the feedback amount for controlling the perturbation model does not become zero, although the control law is made simple.

Figure 25:
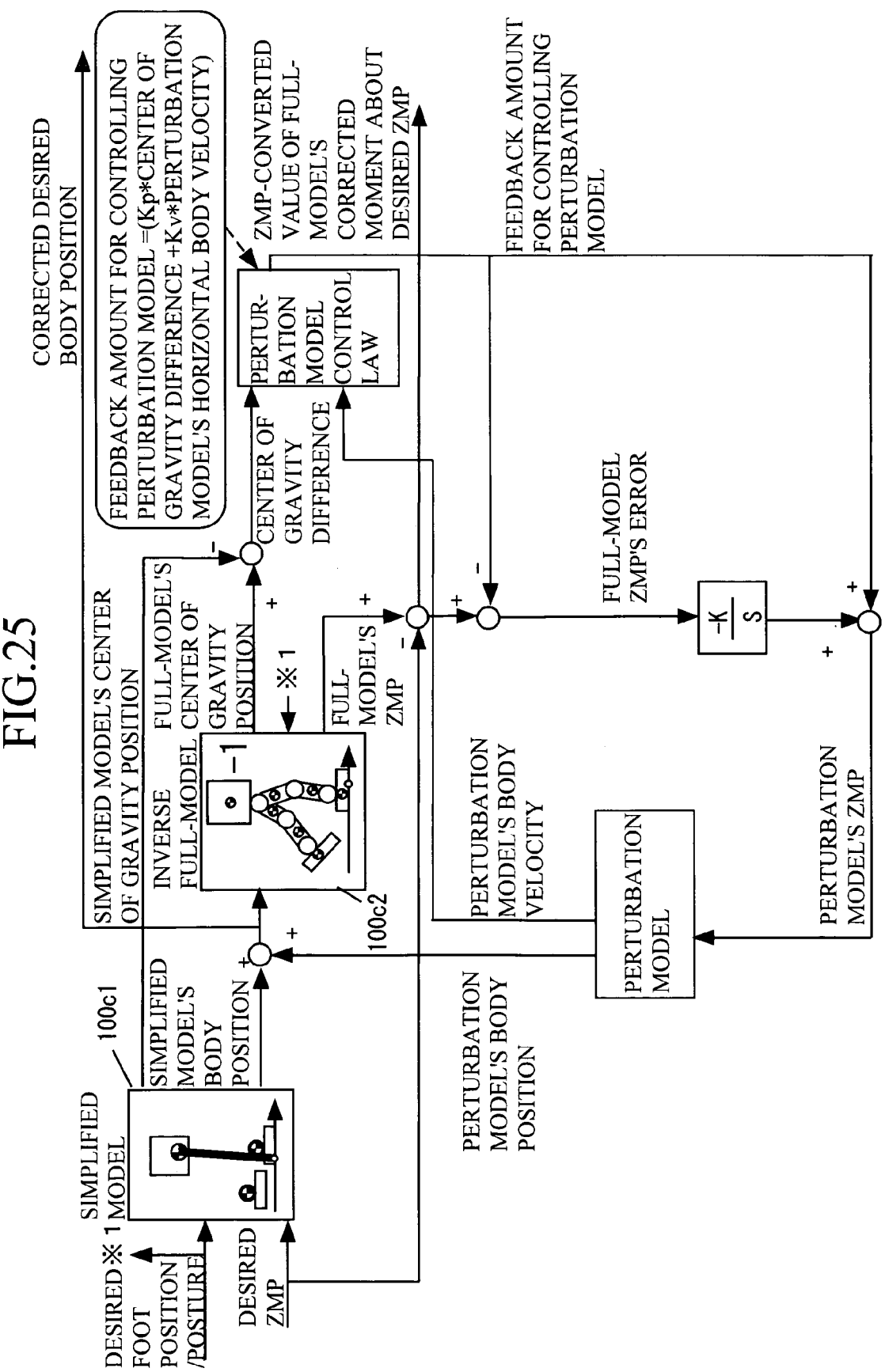
FIG. 25 is a functional block diagram showing the gait correction conducted in the motion generation system of a legged mobile robot according to a fifth embodiment of the present invention.

FIG. 25 is a functional block diagram showing the operation of the motion generation system of a legged mobile robot according to a fifth embodiment of the present invention. More specifically, it shows the gait correction explained with reference to S32 of the flow chart of FIG. 11.

The gait correction in the fifth embodiment is also a concrete example of the third embodiment. Likewise, the characteristic feature in, the corrections is that there is included the control of the center of gravity.

Explaining this with focus on a difference from the foregoing embodiments, in the fifth embodiment, the following equation is used as the control law for the perturbation model:

Feedback amount for controlling perturbation model=$K_p$*Center of gravity difference+$K_v$*Perturbation model's horizontal body velocity     Eq. 21

In the above, The center of gravity difference is determined as follows:

Center of gravity difference=Full-model's center of gravity position−Simplified model's center of gravity position    Eq. 22

Specifically, the embodiment is arranged such that, the feedback amount for controlling the perturbation model is calculated based on the difference of the center of gravity (obtained by subtracting the simplified model's center of gravity position from the full-model's center of gravity position) and the perturbation model's horizontal body velocity (calculated using the perturbation model). With this perturbation model control law, an average value (in time) between the differences of the full-model's center of gravity position and the simplified model's center of gravity position, can be controlled to almost zero.

From the nature of the dynamics of the robot, the average value (in time) of the desired ZMP and that of the simplified model's center of gravity position are almost equal to each other. Further, the average value (in time) of the full-model's ZMP and that of the full-model's center of gravity position are almost equal to each other. From the above, the average value (in time) of the full-model's center of gravity difference and that of the full-model's ZMP are almost equal to each other. Furthermore, Eq. 18 yields the following equation:

Average value (in time) of Full-model's ZMP−Average value (in time) of desired ZMP≈Average value (in time) of the feedback amount for controlling perturbation model    Eq. 23

Accordingly, the average value (in time) of the feedback amount for controlling the perturbation model becomes almost zero. In addition, from the relationship expressed in Eq. 19, an average value (in time) of the ZMP-converted value of the full-model's corrected moment about the desired ZMP becomes almost zero. As a result, the system according to the fifth embodiment can generate a gait of higher margin of stability than that generated in the fourth embodiment. The rest of arrangement is the same as that of the third embodiment.

Having been arranged in the foregoing manner, the system according to the fifth embodiment can have similar effects as those of the fourth embodiment and can make the average value (in time) of the ZMP-converted value of full-model's corrected moment about the desired ZMP almost zero.

Figure 26:
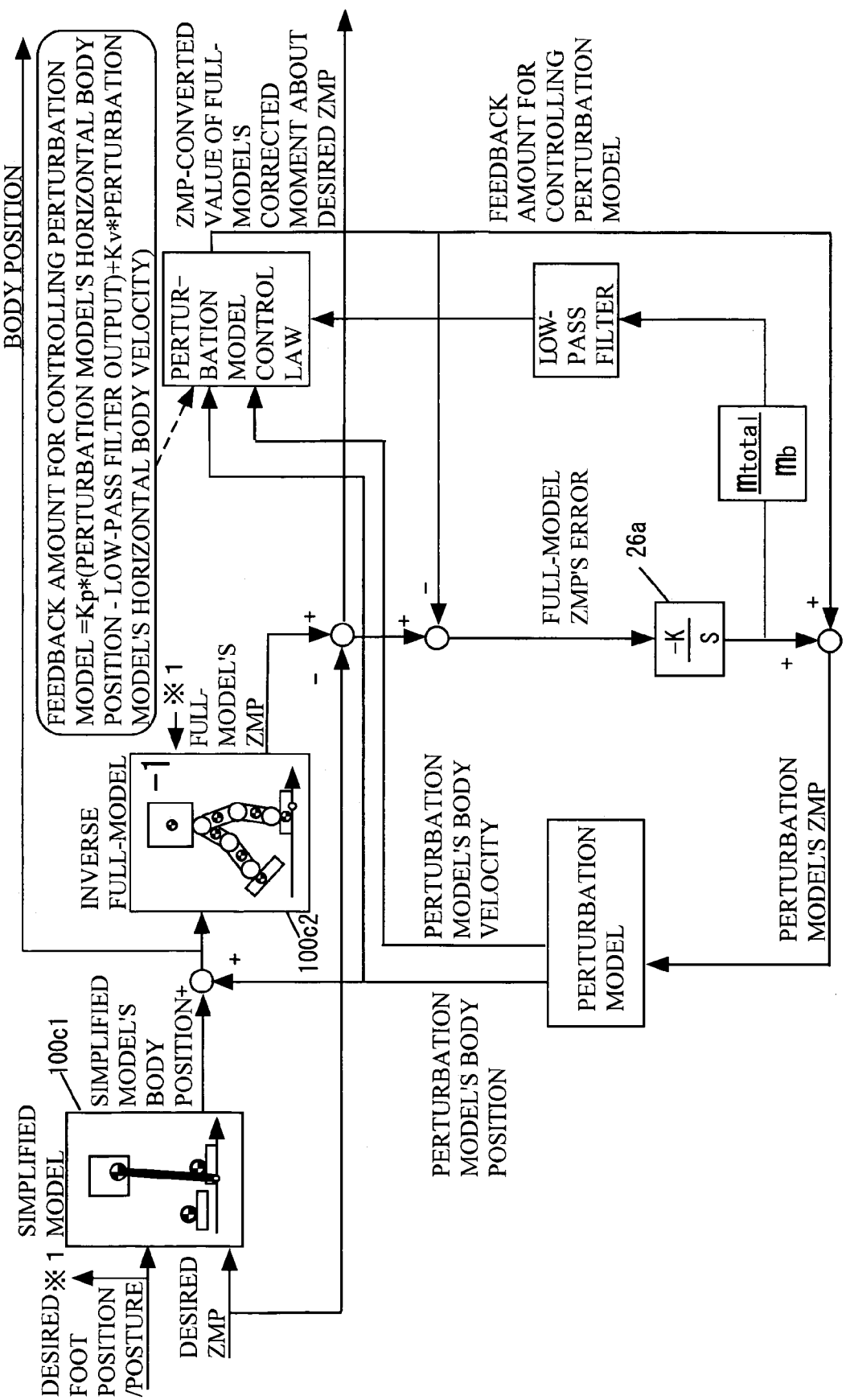
FIG. 26 is a functional block diagram showing the gait correction conducted in the motion generation system of a legged mobile robot according to a sixth embodiment of the present invention.

FIG. 26 is a functional block diagram showing the operation of the motion generation system of a legged mobile robot according to a sixth embodiment of the present invention. More specifically, it shows the gait correction explained with reference to S32 of the flow chart of FIG. 11.

The gait correction in the sixth embodiment is also a concrete example of the third embodiment. Specifically, the characteristic feature in the corrections is that the perturbation model's horizontal body position is controlled to follow up an average value (in time) of a product obtained by multiplying the output of the gain K's integrator (26a in FIG. 26) by mtotal/mb.

Explaining this with focus on a difference from the foregoing embodiments, in the sixth embodiment, the following equation is used as the control law for the perturbation model:

Feedback amount for controlling perturbation model=$Kp$*(Perturbation model's horizontal body position−Low-pass filter output)+$Kv$*Perturbation model's horizontal body velocity    Eq. 24

In the above, the low-pass filter output indicates a low-pass filtered value of −K*mtotal/mb*integrated value of the full-model ZMP's error. In FIG. 26, the value mtotal/mb is the constant of the perturbation model illustrated in FIG. 18.

From perturbation model control law expressed in Eq. 24, an average value (in time) of the perturbation model's horizontal body position becomes almost equal to an average value of the low-pass filter output. Further, from the nature of the dynamics of the perturbation model, the average value (in time) of the perturbation model's horizontal body position becomes almost equal to a product obtained by multiplying the average value (in time) of the perturbation model's ZMP by the value mtotal/mb (indicative of the inverted pendulum's supporting point position), unless the perturbation model oscillates.

Furthermore, as will be understood from FIG. 26, the average value (in time) of the low-pass filter output is almost equal to a difference obtained by subtracting the product obtained by multiplying the average value (in time) of the perturbation model ZMP by mtotal/mb from a product obtained by multiplying the average value (in time) of the feedback amount for controlling the perturbation model by mtotal/mb. Accordingly, the average value (in time) of the feedback amount for controlling the perturbation model is almost zero. In addition, from the relationship expressed in Eq. 19, the average value (in time) of the ZMP-converted value of full-model's corrected moment about the desired ZMP becomes almost zero. As a result, like the correction in the fifth embodiment, the correction according to the sixth embodiment can generate a gait of high margin of stability. The rest of arrangement is same as that of the third embodiment.

Figure 27:
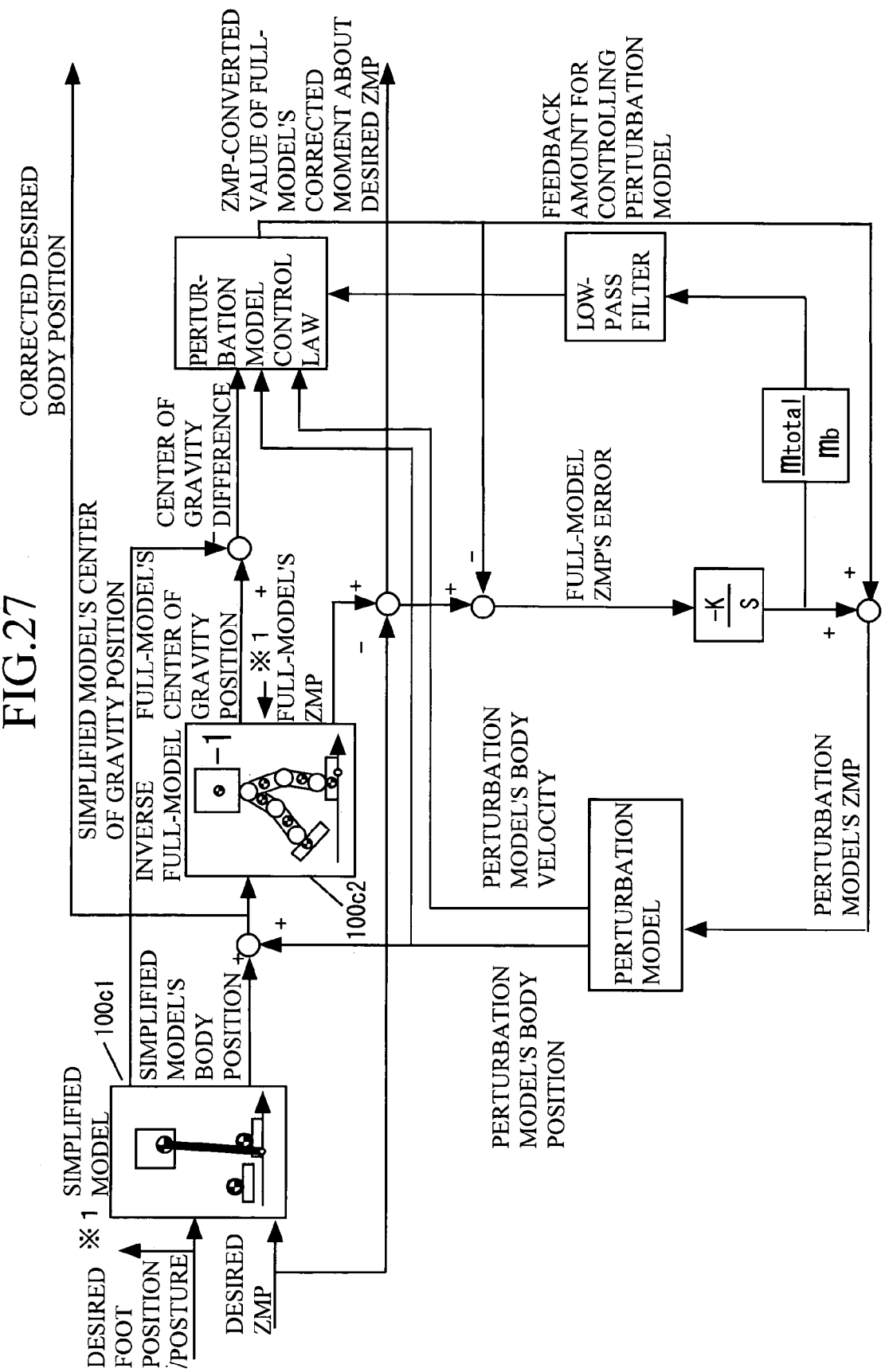
FIG. 27 is a functional block diagram showing the gait correction conducted in the motion generation system of a legged mobile robot according to a seventh embodiment of the present invention.

Having been arranged in the foregoing manner, the system according to the sixth embodiment can have similar effects as those of the fifth embodiment FIG. 27 is a functional block diagram showing the operation of the motion generation system of a legged mobile robot according to a seventh embodiment of the present invention. More specifically, it shows the gait correction explained with reference to S32 of the flow chart of FIG. 11.

The gait correction in the seventh embodiment is also a concrete example of the third embodiment, and is an intermediate or compromise method obtained by mixing the methods of the fourth to sixth embodiments.

In the seventh embodiment, the following equation is used as the control law for the perturbation model:

Feedback amount for controlling perturbation model=$Kp1$*Perturbation model's horizontal body position+$Kp2$*Center of gravity difference+$Kp3$*(Perturbation model's horizontal body position−Low-pass filter output)+$Kv$*Perturbation model's horizontal body velocity    Eq. 25

In the above, the low-pass filter output indicates the low-pass filtered value of −K*mtotal/mb*integrated value of the full-model ZMP's error. The rest of arrangement is same as that of the third embodiment.

Having been arranged in the foregoing manner, the system according to the seventh embodiment can have intermediate or compromise effects as those of the fourth to sixth embodiment.

Figure 28:
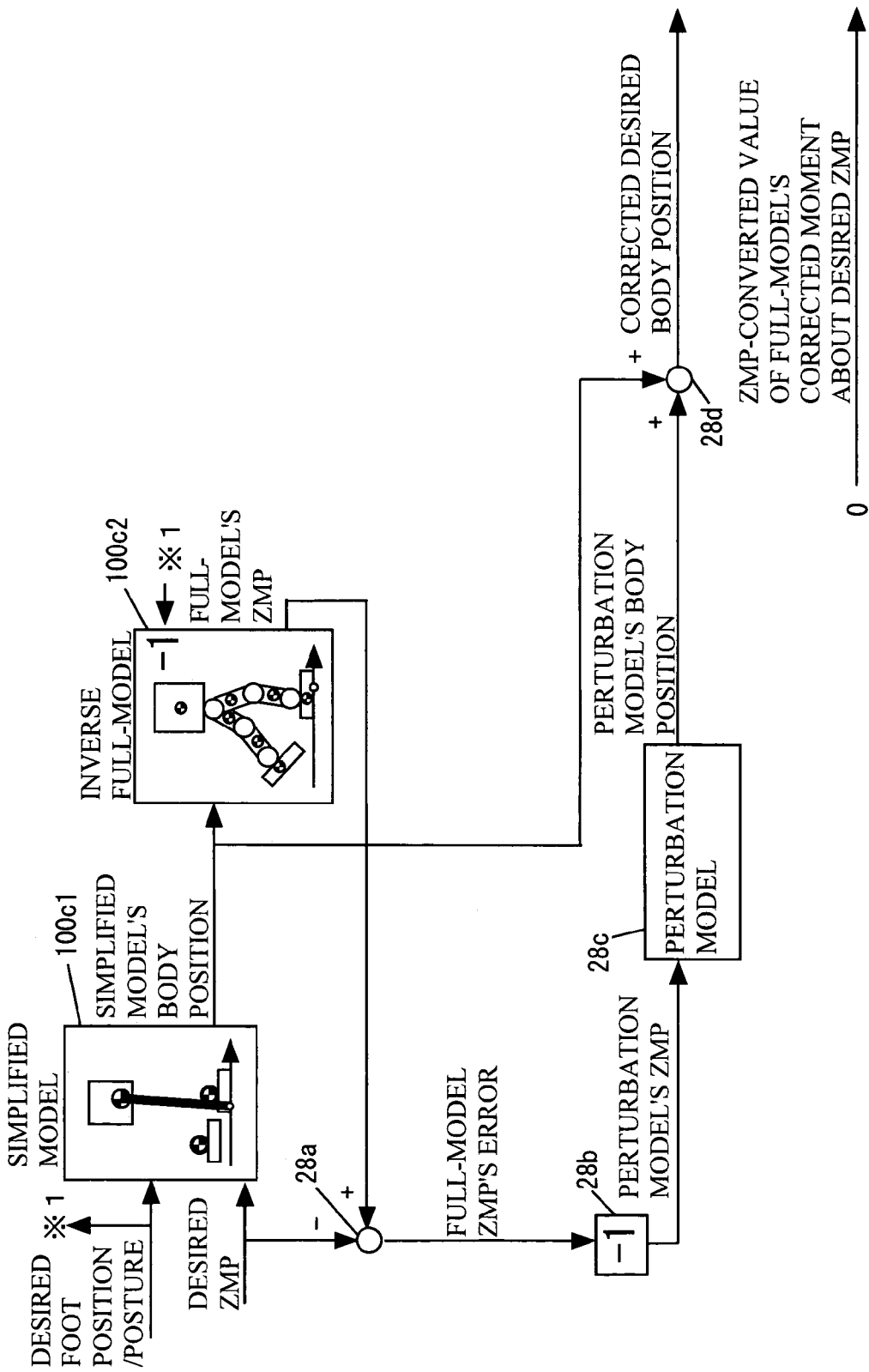
FIG. 28 is a functional block diagram showing the gait correction conducted in the motion generation system of a legged mobile robot according to an eighth embodiment of the present invention.

FIG. 28 is a functional block diagram showing the operation of the motion generation system of a legged mobile robot according to an eighth embodiment of the present invention. More specifically, it shows the gait correction explained with reference to S32 of the flow chart of FIG. 11.

The gait correction in the eighth embodiment is a method to use the inverse dynamic full-model (inverse full-model), a method not to correct the ZMP of the simplified model's gait, and a method to use the perturbation model. Further, it is the basic of similar full-model feedforward corrections in the embodiments up to a thirteenth embodiment.

In the eighth embodiment, as illustrated, the full-model ZMP's error is determined by subtracting the desired ZMP (inputted to the simplified model) from the full-model's ZMP, the perturbation model's horizontal body position is then calculated by inputting a product (obtained by multiplying the determined error by −1) to the perturbation model, and the corrected desired body position is then determined by adding the simplified model's body position (the desired body position before correction) to the calculated perturbation model's horizontal body position.

Here, the ZMP-converted value of full-model's corrected moment about the desired ZMP is set to zero. This is ideal, as mentioned in the feedback type correction. Since, however, the perturbation model is likely to oscillate, this basic correction of the eighth embodiment is not practical.

As regards the body height necessary for calculating the inverse full-model to correct the full-model, the body height at joint angle calculation at a preceding (last) control cycle (preceding or last program loop of the flow chart of FIG. 11) may be used. Alternatively, the body height may be calculated from the first. If the perturbation model's body position is not so large, either will make little difference.

Having been arranged in the foregoing manner, the system according to the eighth embodiment can have the same effects as those of the second embodiment.

Figure 29:
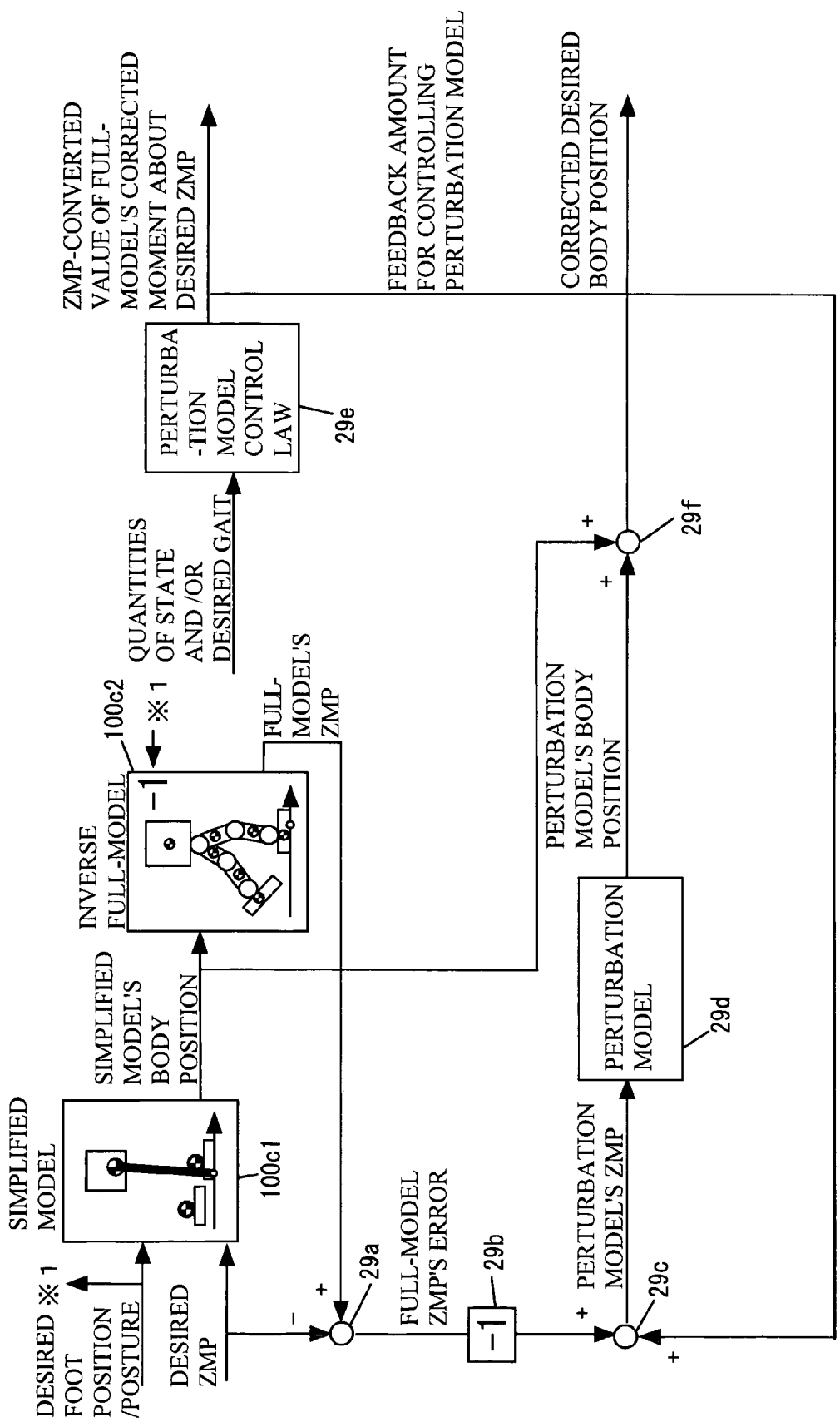
FIG. 29 is a functional block diagram showing the gait correction conducted in the motion generation system of a legged mobile robot according to a ninth embodiment of the present invention.

FIG. 29 is a functional block diagram showing the operation of the motion generation system of a legged mobile robot according to a ninth embodiment of the present invention. More specifically, it shows the gait correction explained with reference to S32 of the flow chart of FIG. 11.

The gait correction in the ninth embodiment is a method to use the inverse dynamic full-model (inverse full-model), a method not to correct the ZMP of the simplified model's gait, and a method to use the perturbation model. Further, it is a general method common to feedforward correction methods in the embodiments up to the thirteenth embodiment.

In the ninth embodiment, similar to the third embodiment, in order to prevent the perturbation model oscillation, the perturbation model control law is provided and based thereon, the feedback control amount for controlling the perturbation model is calculated to be additionally inputted to the perturbation model. In addition, the feedback amount for controlling the perturbation model is determined or outputted as the ZMP-converted value of full-model's corrected moment about the desired ZMP. The rest of the arrangement is the same as the eighth embodiment.

In the ninth embodiment, since the correction is conducted in a feedforward fashion, when the approximation accuracy of the perturbation model is low or when the perturbation model's horizontal body position is so large that the approximation accuracy is low, the approximation accuracy of the gait corrected by the full-model will be somewhat degraded, since the correction amount deviates from an appropriate amount. In that case, in the feedback type correction of the third embodiment, the approximation accuracy of the gait corrected by the full-model is less likely to drop. Nevertheless, since correction error at a certain instant will be remedied (corrected) after expiration of at least one control cycle in the feedforward type, the correction response in the feedforward type is superior to that of the feedback type.

Having been arranged in the foregoing manner, the system according to the ninth embodiment can have the same effects as those of the third embodiment, except for that derived from the difference in the feedback type and the feedforward type.

Figure 30:
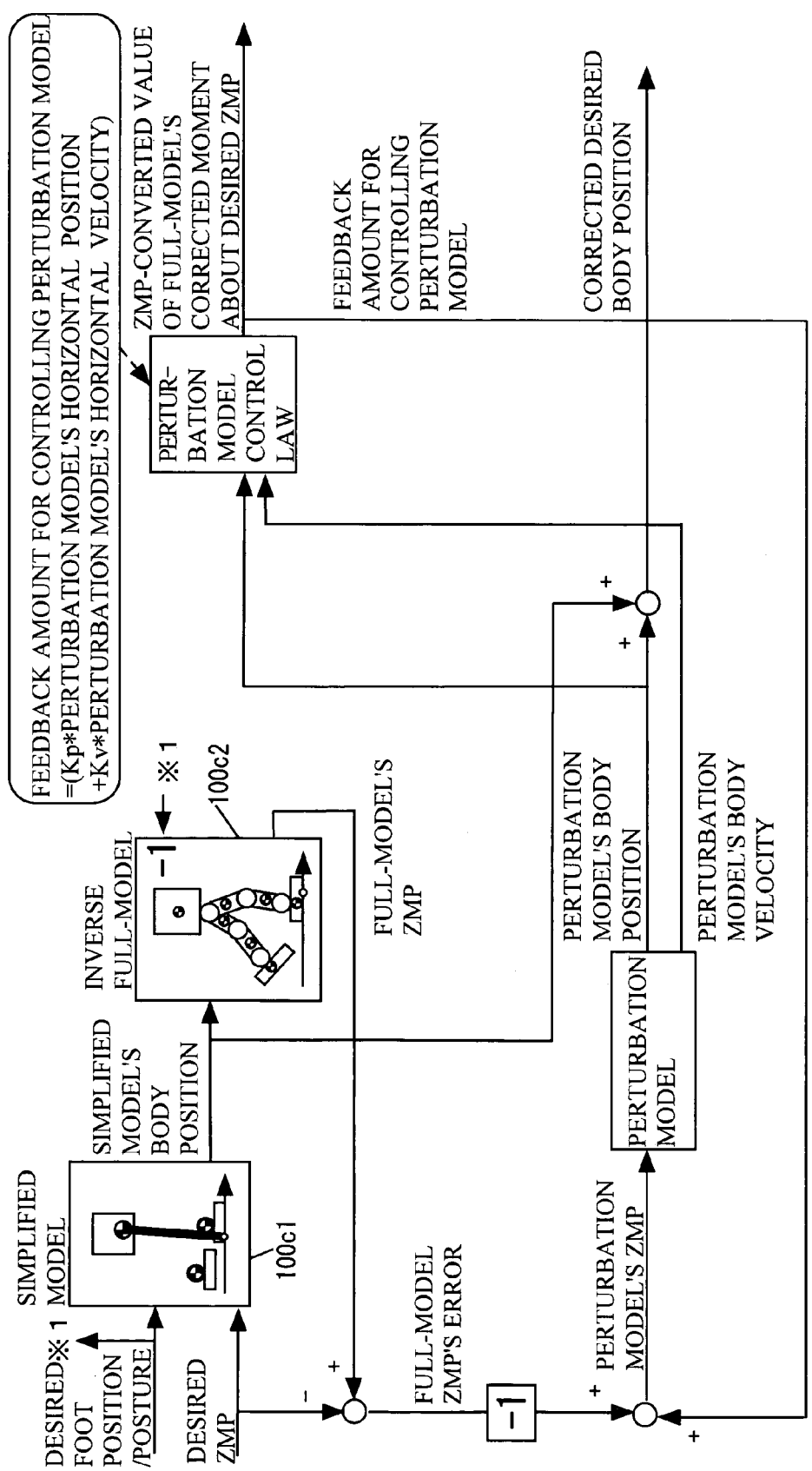
FIG. 30 is a functional block diagram showing the gait correction conducted in the motion generation system of a legged mobile robot according to a tenth embodiment of the present invention.

FIG. 30 is a functional block diagram showing the operation of the motion generation system of a legged mobile robot according to a tenth embodiment of the present invention. More specifically, it shows the gait correction explained with reference to S32 of the flow chart of FIG. 11.

The gait correction in the tenth embodiment is a concrete example of the ninth embodiment. Specifically, the characteristic feature in the corrections is that there is included a control to stabilize the perturbation model at an upstanding position or thereabout.

In the tenth embodiment, the following equation is used as the control law for the perturbation model:

Feedback amount for controlling perturbation model=$Kp$*Perturbation model's horizontal body position+$Kv$*Perturbation model's horizontal body velocity     Eq. 26

The rest of the arrangement is the same as that of the ninth embodiment.

Having been arranged in the foregoing manner, the system according to the tenth embodiment can have the same effects as those of the ninth embodiment and the fourth embodiment.

Figure 31:
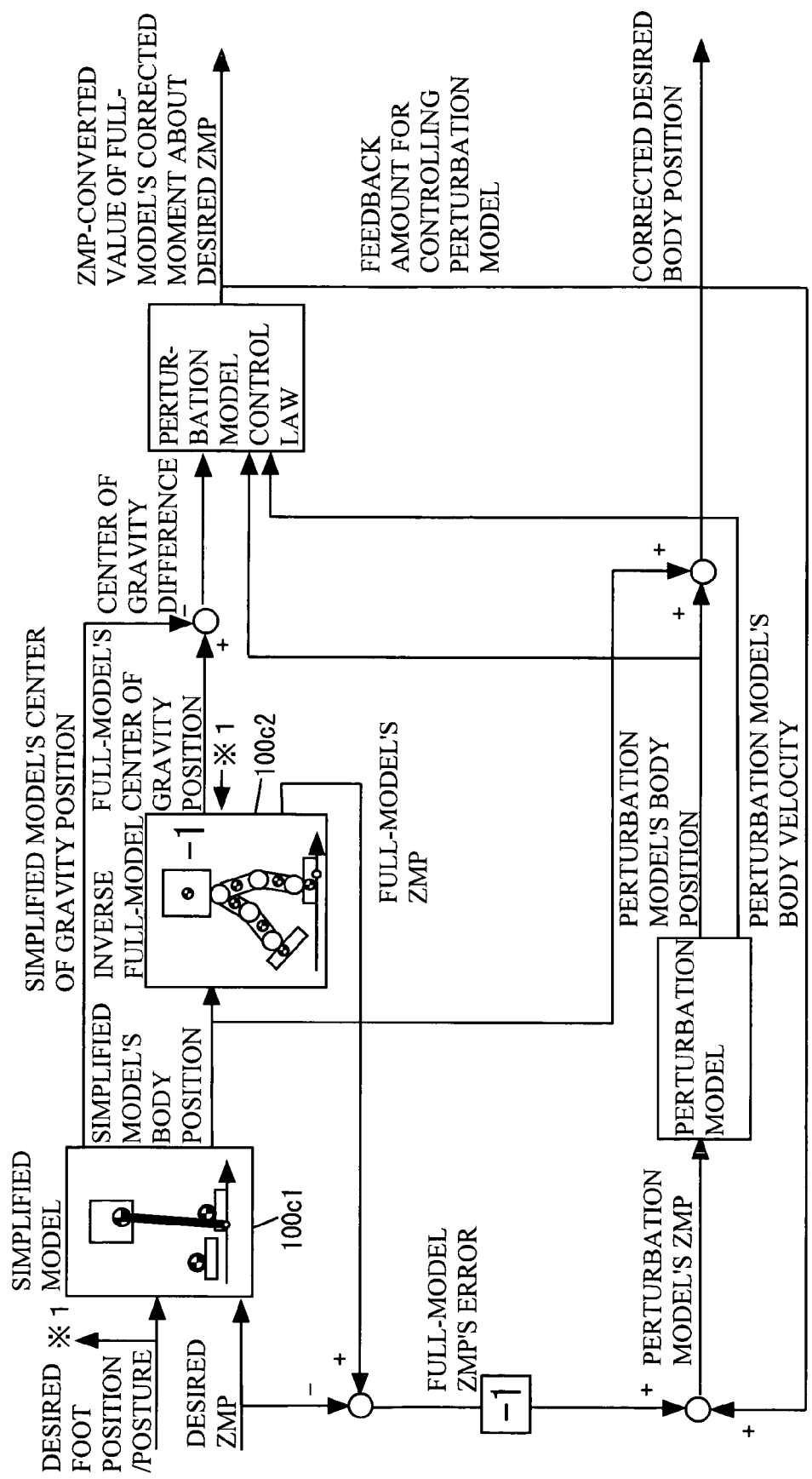
FIG. 31 is a functional block diagram showing the gait correction conducted in the motion generation system of a legged mobile robot according to an eleventh embodiment of the present invention.

FIG. 31 is a functional block diagram showing the operation of the motion generation system of a legged mobile robot according to an eleventh embodiment of the present invention. More specifically, it shows the gait correction explained with reference to S32 of the flow chart of FIG. 11.

The gait correction in the eleventh embodiment is also a concrete example of the ninth embodiment and like the fifth embodiment, the control of the center of gravity is similarly conducted. Specifically, it controls the perturbation model, by setting a desired settling position at a position where the center of gravity's deviation is canceled. The desired settling position is determined, for example, as follows:

Desired settling position=−$m$total/$mb$*Center of gravity difference     Eq. 27

The feedback amount for controlling the perturbation model is calculated as follows:

Feedback amount for controlling perturbation model=$Kp$*(Perturbation model's horizontal body position−Desired settling position)+$Kv$*Perturbation model's horizontal body velocity+$mb/m$total* Perturbation model's horizontal body position     Eq. 28

Having been arranged in the foregoing manner, the system according to the eleventh embodiment can have same effects as those of the ninth embodiment and the fifth embodiment.

Figure 32:
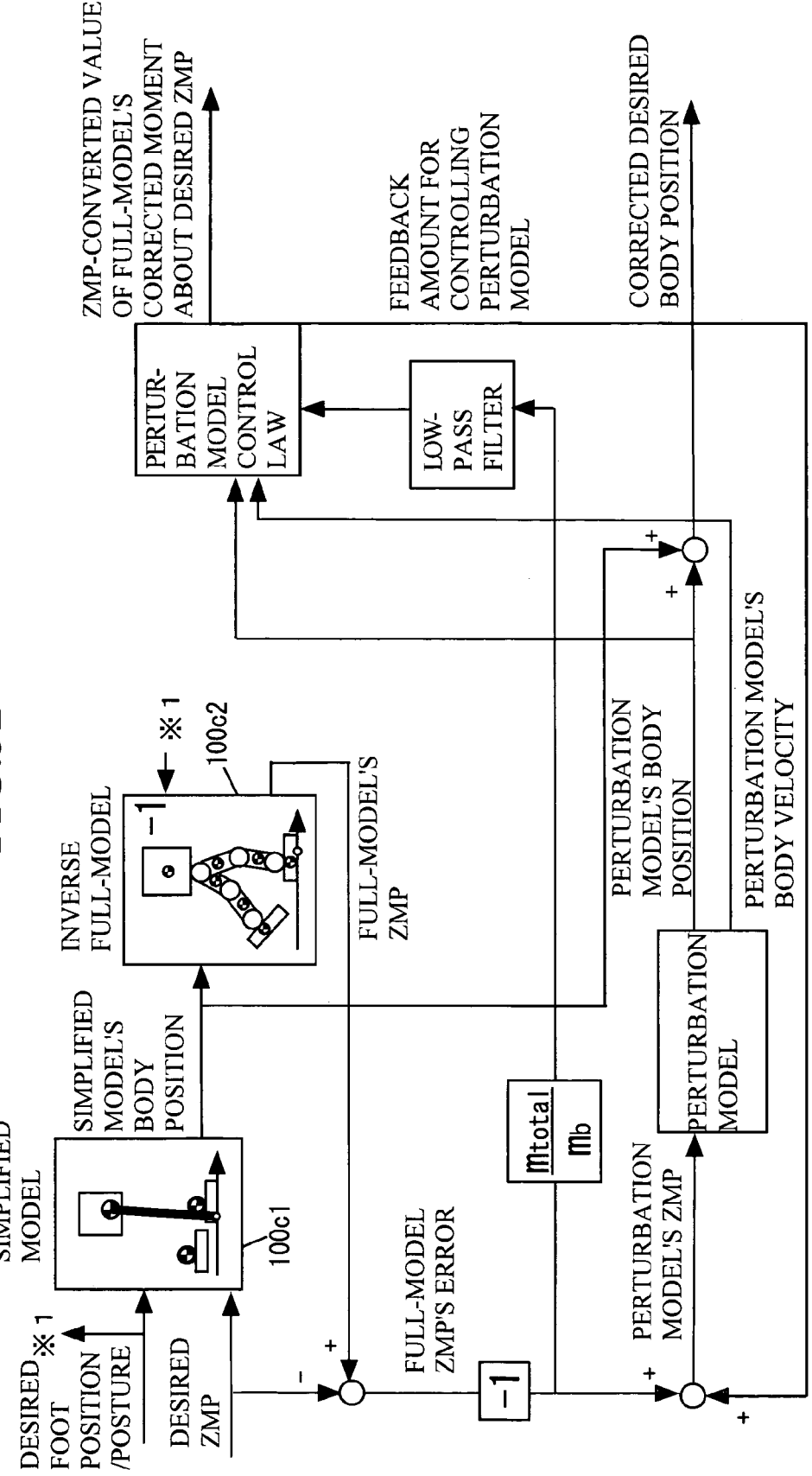
FIG. 32 is a functional block diagram showing the gait correction conducted in the motion generation system of a legged mobile robot according to a twelfth embodiment of the present invention.

FIG. 32 is a functional block diagram showing the operation of the motion generation system of a legged mobile robot according to a twelfth embodiment of the present invention. More specifically, it shows the gait correction explained with reference to S32 of the flow chart of FIG. 11.

The gait correction in the twelfth embodiment is also a concrete example of the ninth embodiment. Similarly, in the corrections, the perturbation model's horizontal body position is controlled to follow up a product obtained by multiplying the average value (in time) of the ZMP error by (−1)

and by the value mtotal/mb. In other words, it controls the perturbation model, by setting the desired settling position at a position where an averaged deviation (in time) of the ZMP error is canceled.

In the twelfth embodiment, the following equation is used as the control law for the perturbation model.

Feedback amount for controlling perturbation model=$Kp$*(Perturbation model's horizontal body position−Low-pass filter output)+$Kv$*Perturbation model's horizontal body velocity+mb/mtotal*Perturbation model's horizontal body position　　　Eq. 29

In the above, the low-pass filter output indicates a low-pass filtered value of −mtotal/mb*full-model ZMP's error. The twelfth embodiment is a feedforward modification of the sixth embodiment.

Having been arranged in the foregoing manner, the system according to the twelfth embodiment can have similar effects as those of the ninth embodiment and the sixth embodiment.

Figure 33:
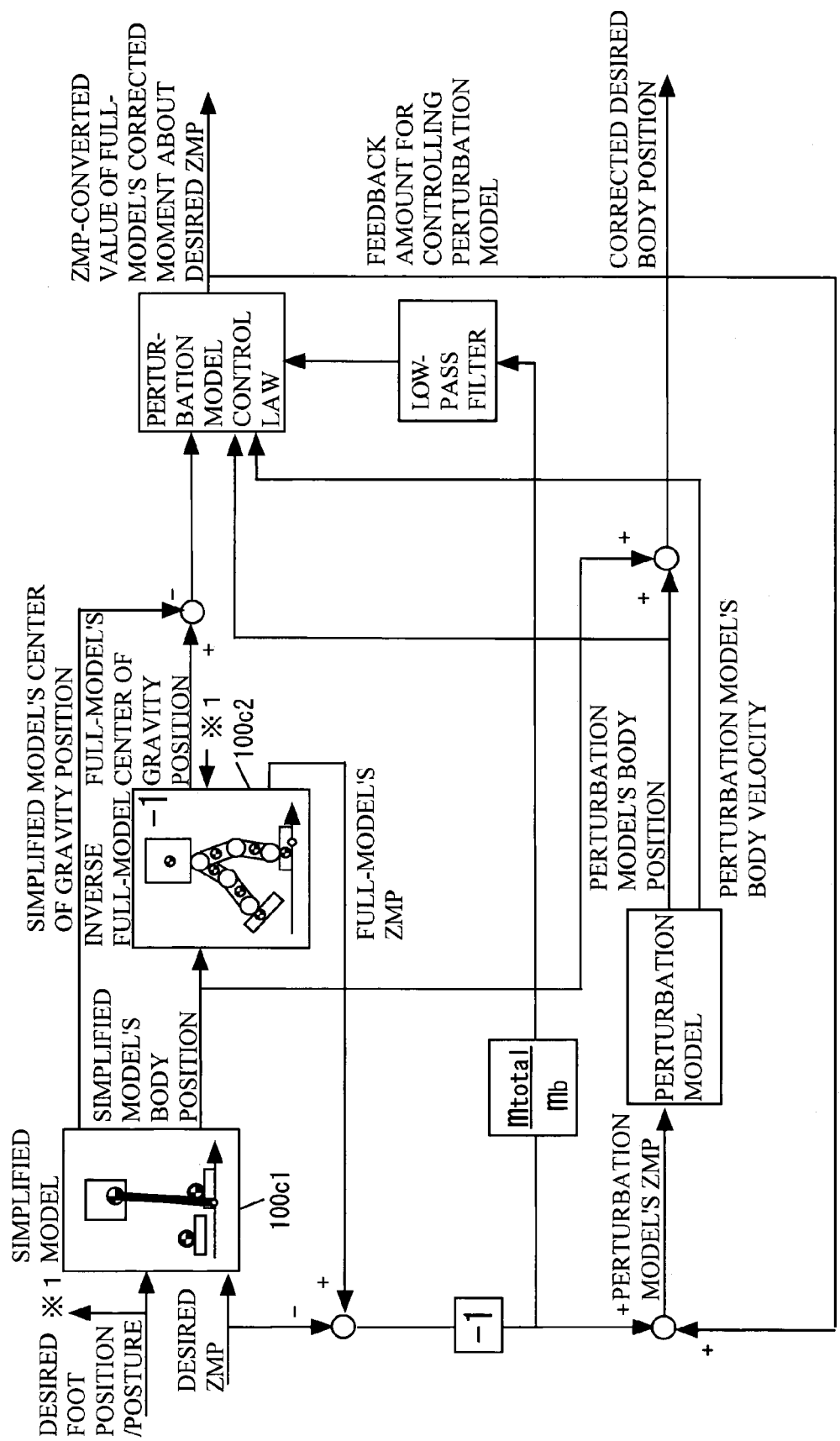
FIG. 33 is a functional block diagram showing the gait correction conducted in the motion generation system of a legged mobile robot according to a thirteenth embodiment of the present invention.

FIG. 33 is a functional block diagram showing the operation of the motion generation system of a legged mobile robot according to a thirteenth embodiment of the present invention. More specifically, it shows the gait correction explained with reference to S32 of the flow chart of FIG. 11.

The gait correction in the thirteenth embodiment is also a concrete example of the ninth embodiment, and like the seventh embodiment, it is an intermediate or compromise method obtained by mixing the methods of the tenth to twelfth embodiments.

In the thirteenth embodiment, the following equation is used as the control law for the perturbation model:

Feedback amount for controlling perturbation model=$Kp1$*Perturbation model's horizontal body position+$Kp2$*(Perturbation model's horizontal body position−(−mtotal/mb*Center of gravity difference)+$Kp3$*(Perturbation model's horizontal body position−Low-pass filter output)+$Kv$*Perturbation model's horizontal body velocity+mtotal/mb*Perturbation model's horizontal body position　　　Eq. 30

Similarly, the low-pass filter output indicates the low-pass filtered value of−mtotal/mb*full-model ZMP's error.

Having been arranged in the foregoing manner, the system according to the thirteenth embodiment can have intermediate or compromise effects as those of the tenth to twelfth embodiment.

Figure 34:
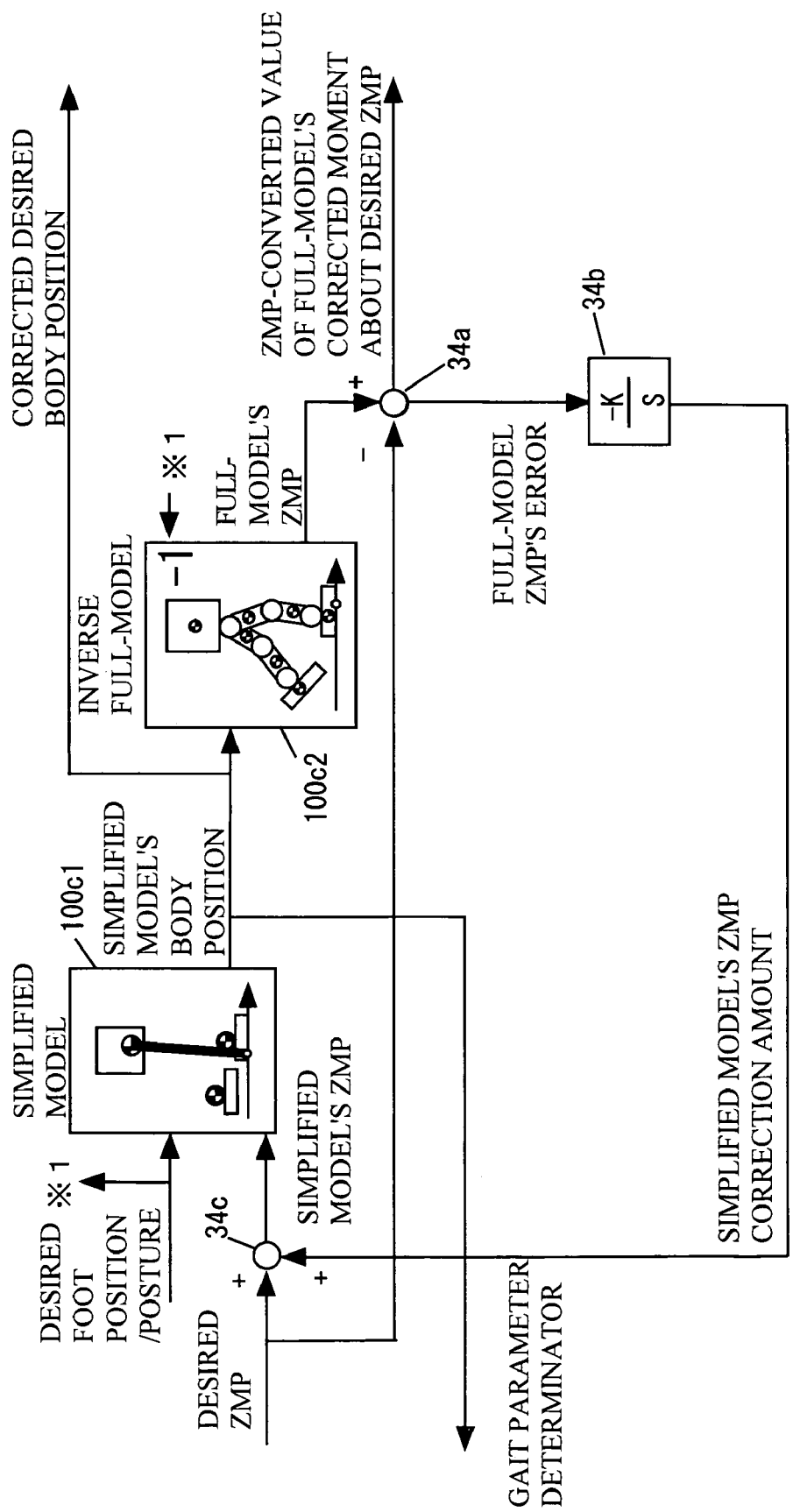
FIG. 34 is a functional block diagram showing the gait correction conducted in the motion generation system of a legged mobile robot according to a fourteenth embodiment of the present invention.

FIG. 34 is a functional block diagram showing the operation of the motion generation system of a legged mobile robot according to a fourteenth embodiment of the present invention.

The gait correction in the fourteenth embodiment is a method to use the inverse dynamic full-model (inverse full-model), a method to correct the ZMP of the simplified model's gait, and a method not to use the perturbation model.

As illustrated in FIG. 34, in the fourteenth embodiment, a feedback loop is added to the arrangement or structure of the first embodiment. The feedback loop additionally inputs a value obtained by integrating the full-model ZMP's error and by multiplying it by the integral gain (−K) to the simplified model. Further, it determines or outputs the simplified model's body position as the corrected desired body position, and it also determines or outputs the full-model's ZMP error as the ZMP-converted value of full-model's corrected moment about the desired ZMP.

Notably, different from the first to thirteenth embodiments, in the fourteenth embodiment, by correcting the desired ZMP, the simplified model's body position deviates from a desired trajectory. Accordingly, it is preferable to newly determine the gait parameters. The gait parameter may be re-determined at every control cycle, or at a time corresponding to each breaking point of the ZMP trajectory, or at every walking step. Since the amount of correction of the gait parameters is decreased as the correction is made earlier, the gait parameters should preferably be corrected repeatedly. The gait parameters are re-determined in response to the quantity of state of the simplified model and some similar factors at S28 in the flow chart of FIG. 11. Since, however, the gait parameter re-determination is described in detail in Japanese Patent Application No. 2000-352011 proposed earlier, no further explanation will be made here.

Further, when changing the ZMP parameter in the gait parameters, it is preferable to merely change a ZMP value at each ZMP breaking point, without changing a time of the breaking point. This is because a problem in sequence is less likely to occur and the correction is simpler.

Further, it will be easy to make the amount of ZMP pattern change in a trapezoid shape. For example, an appropriate one of ZMP breaking point's times after the current time, illustrated in FIG. 35, may be selected as the trapezoid ZMP breaking point time. However, as the time approaches the gait terminal, this trapezoid ZMP breaking time point selection becomes difficult in the rest of period of that gait. In that case, it suffices if the ZMP correction at that gait is skipped, and is conducted at a next walking step.

Having been arranged in the foregoing manner, the system according to the fourteenth embodiment can have same effects as those of the second embodiment and can prevent the gait from oscillating by correcting the gait parameters.

Figure 36:
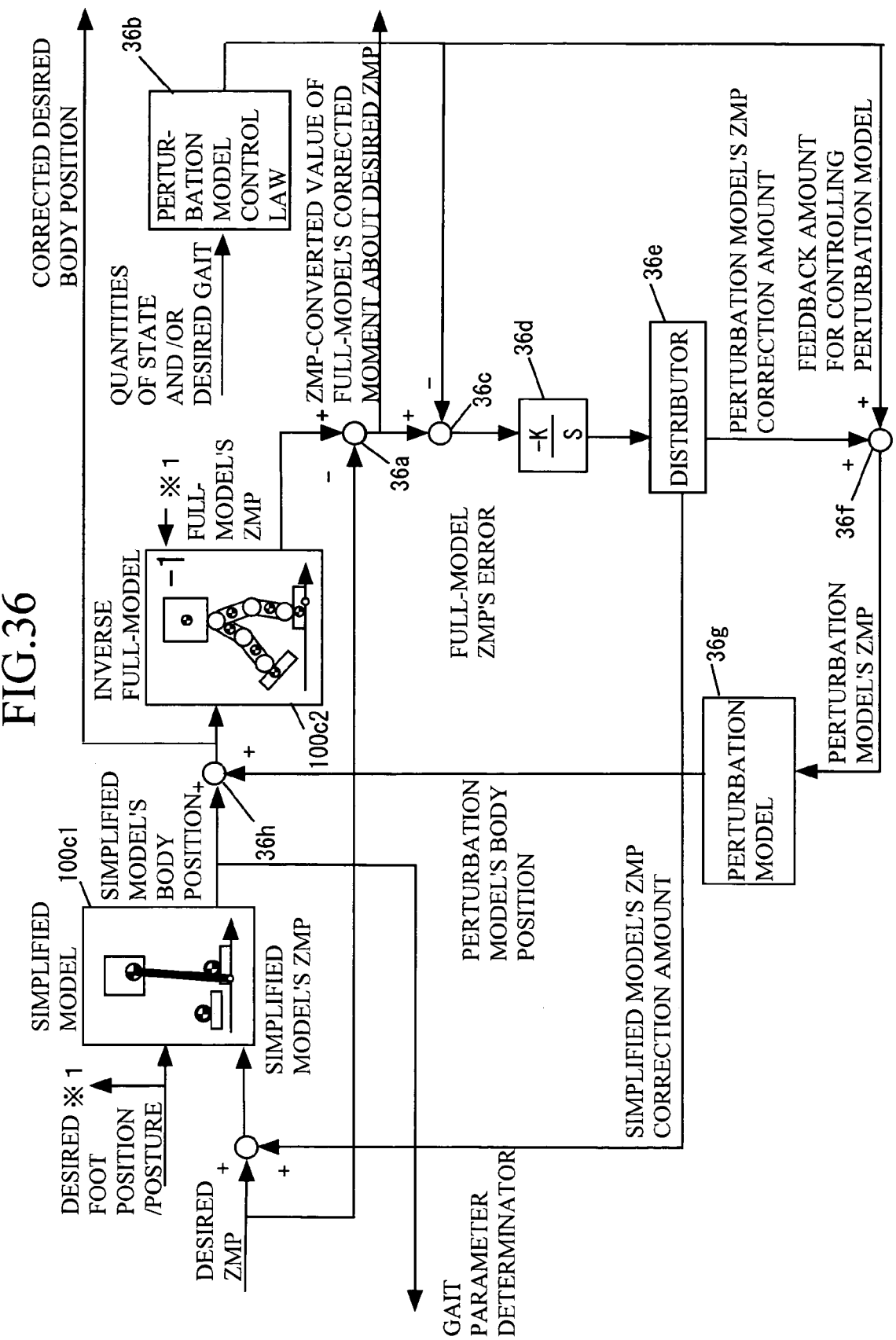
FIG. 36 is a functional block diagram showing the gait correction conducted in the motion generation system of a legged mobile robot according to a fifteenth embodiment of the present invention.

FIG. 36 is a functional block diagram showing the operation of the motion generation system of a legged mobile robot according to a fifteenth embodiment of the present invention. More specifically, it shows the gait correction explained with reference to S32 of the flow chart of FIG. 11.

The gait correction in the fifteenth embodiment is a method to use the inverse dynamic full-model (inverse full-model), a method to correct the ZMP of the simplified model's gait, and a method to use the perturbation model. Further, it is a general method of the full-model feedback correction.

Specifically, in the fifteenth embodiment, based on the arrangement or structure of the third embodiment, the product obtained by multiplying the integrated full-model ZMP's error by the integral gain (−k) is fed back, through a distributor 36$e$, not only to the perturbation model, but also to the simplified model. In other words, the fifteenth embodiment is an intermediate or a compromise correction method constituted as a mixture of the methods in the third embodiment and the fourteenth embodiment. Since the simplified model's behavior deviates from a desired behavior in this embodiment also, like the fourteenth embodiment, it is necessary to correct the gait parameters. It is alternatively possible to mix the methods in the fourteenth embodiment and in any of the second embodiment and the fourth to seventh embodiments.

In the fifteenth embodiment, the distributor may distribute the output at the region of frequency. Alternatively, it may distribute the output using a non-linear element such as a limiter. Since the system is a feedback system, a sum of the outputs from the distributor need not be equal to its input.

Having been arranged in the foregoing manner, the system according to the fifteenth embodiment can have same effects as those of the third and fourteenth embodiments or can have intermediate or compromise effects thereof.

Figure 37:
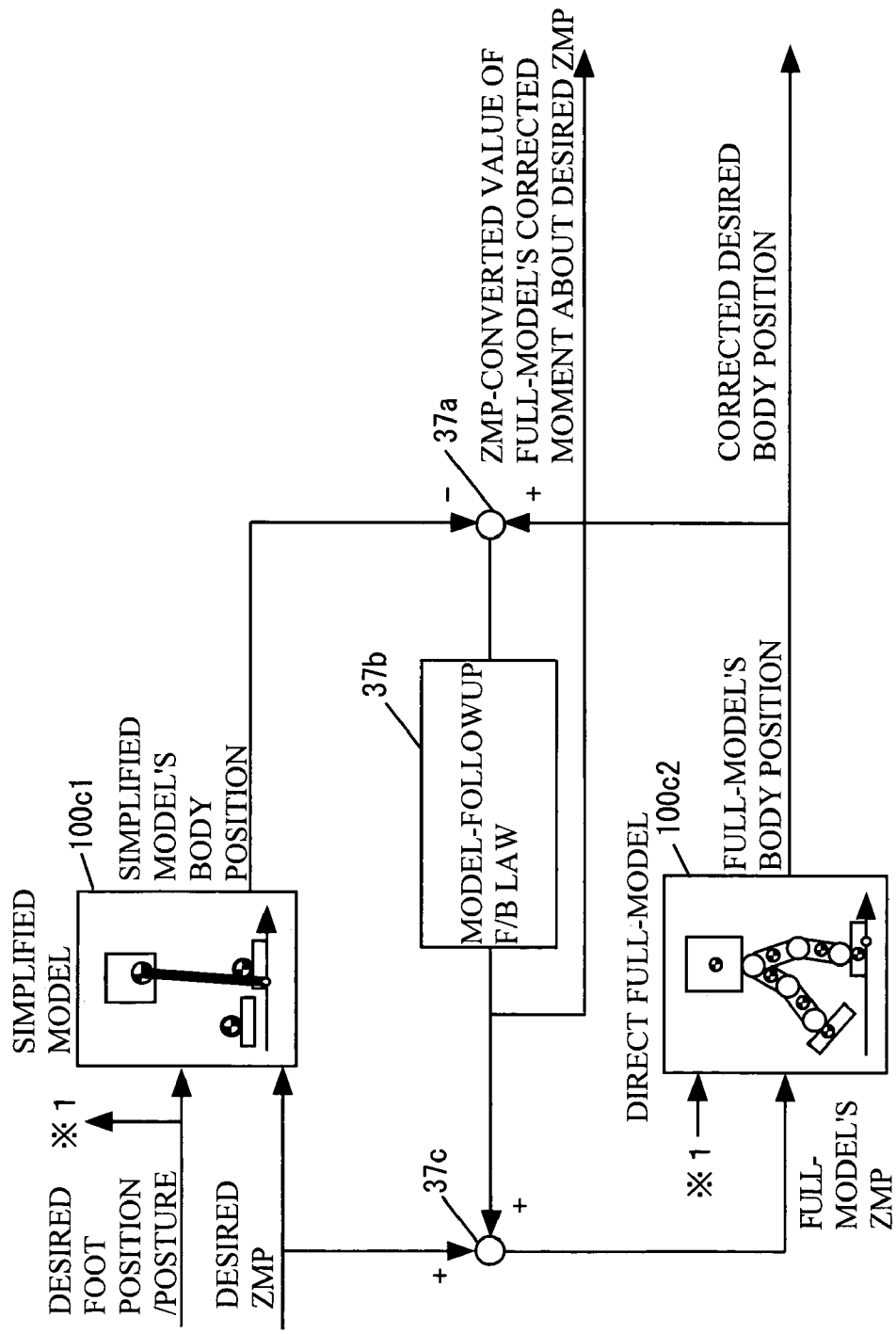
FIG. 37 is a functional block diagram showing the gait correction conducted in the motion generation system of a legged mobile robot according to a sixteenth embodiment of the present invention.

FIG. 37 is a functional block diagram showing the operation of the motion generation system of a legged mobile robot according to a sixteenth embodiment of the present invention. More specifically, it shows the gait correction explained with reference to S32 of the flow chart of FIG. 11.

The gait correction in the sixteenth embodiment is a method to use the direct dynamic full-model (direct full-model), instead of the inverse dynamic full-model (inverse full-model), a method not to correct the ZMP of the simplified model's gait. And, it is a method to control the full-model to follow up the simplified model's gait, specifically, a method to correct the full-model's ZMP such that the body behavior of the full-model follows up that of the simplified model that satisfies the desired ZMP.

More specifically, as illustrated in FIG. 37, in the sixteenth embodiment, the full-model's body position is calculated using the direct full-model, and the simplified model's body position (i.e., the desired body position before correction) is then subtracted therefrom to determine a difference which is then inputted a model-followup control law (constituted as a PID law, etc) 37b to determine the feedback amount. The determined feedback amount is then added to the desired ZMP to determine the full-model's ZMP that is next inputted to the direct full-model to determine the full-model's body position. In other words, the system is arranged to have a feedback loop such that the direct full-model's ZMP is corrected in response to the difference between the direct full-model's body position and the simplified model's body position.

As regards outputs, the system determines or outputs the feedback amount as the ZMP-converted value of full-model's corrected moment about the desired ZMP, and determines or outputs the direct full-model's body position as the corrected desired body position. In the system, instead of the difference in the body positions of the direct full-model and the simplified model, a difference in the center of gravity positions of the models or both the difference in the body position and the difference in the center of gravity positions of the models may be inputted to the model-followup control law.

Having been arranged in the foregoing manner, the system according to the sixteenth embodiment can have the same effects as those of the third embodiment, except for the disadvantage that the volume of calculation is increased.

Figure 38:
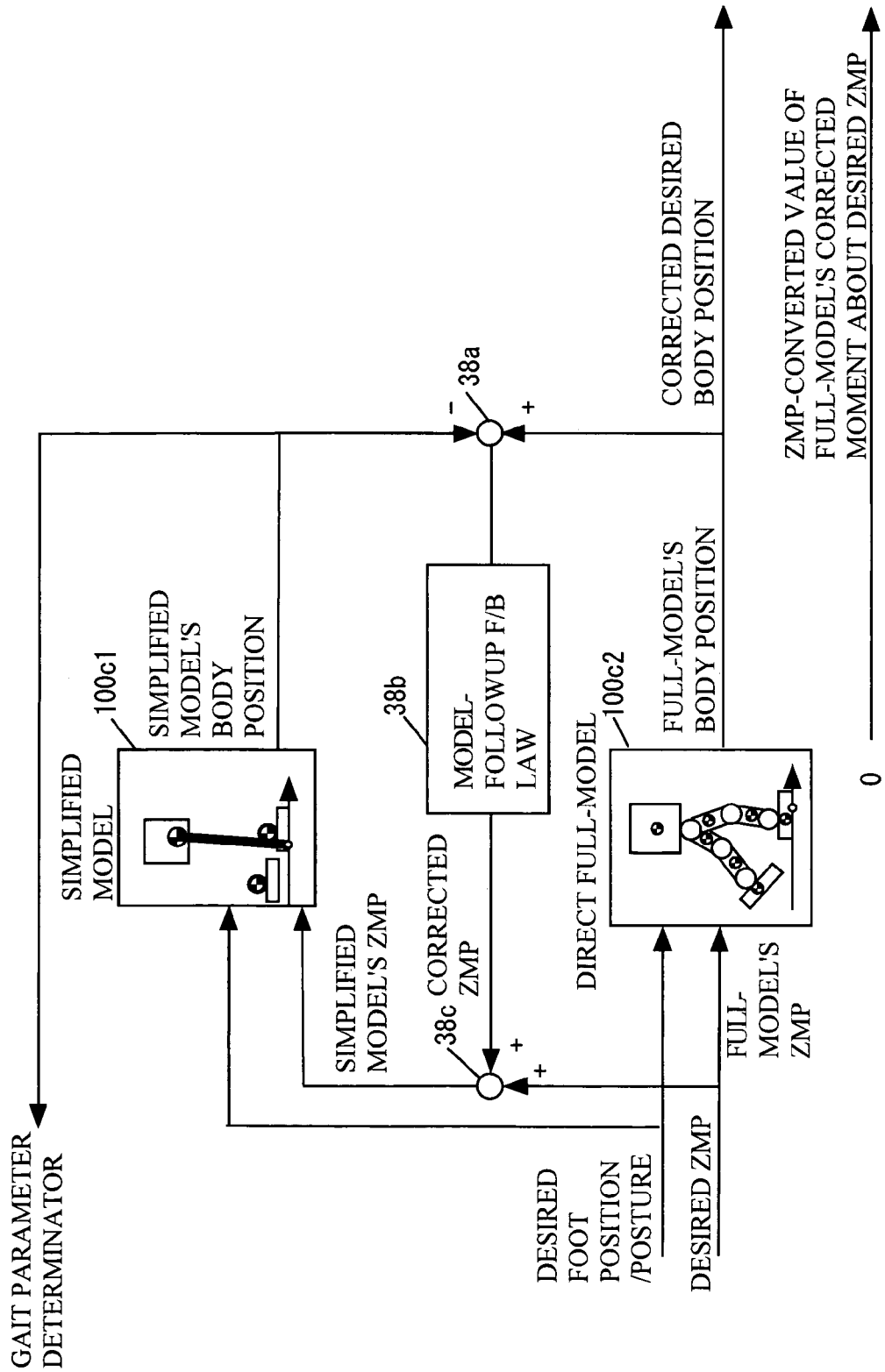
FIG. 38 is a functional block diagram showing the gait correction conducted in the motion generation system of a legged mobile robot according to a seventeenth embodiment of the present invention.

FIG. 38 is a functional block diagram showing the operation of the motion generation system of a legged mobile robot according to a seventeenth embodiment of the present invention. More specifically, it shows the gait correction explained with reference to S32 of the flow chart of FIG. 11.

The gait correction in the seventeenth embodiment is a method to use the direct dynamic full-model (direct full-model), a method to correct the ZMP of the simplified model's gait, and a method to control the simplified model to follow up the full-model's gait. Specifically, on the contrary to the sixteenth embodiment, it corrects the simplified model's ZMP such that the behavior of the simplified model follows up that of the full-model that satisfies the desired ZMP.

More specifically, on the contrary to the sixteenth embodiment where the output of the model-followup control law is additionally inputted to the direct full-model, the seventeenth embodiment is arranged such that, the control law's output is inputted to the simplified model as an additional input. Further, the system is arranged such that it determines the ZMP-converted value of full-model's corrected moment about the desired ZMP zero, and it determines or outputs the direct full-model's body position as the corrected desired body position.

When the feedback gain is high, since the simplified model's body position is almost equal to the direct full-model's position, the simplified model's body position may be determined or outputted as the corrected desired body position. Since the behavior of the simplified model deviates from its desired behavior because the model's ZMP to be inputted to the simplified model is corrected, similar to the fourteenth embodiment, the gait parameters must be corrected.

Having been arranged in the foregoing manner, the system according to the seventeenth embodiment can have similar effects as that of the fourteenth embodiment. In the system, similar to the sixteenth embodiment, instead of the difference in the body positions of the direct full-model and the simplified model, the difference in the centers of gravity position of the models or both the difference in the body position and the difference in the centers of gravity position of the models may be inputted to the model-followup control law.

Figure 39:
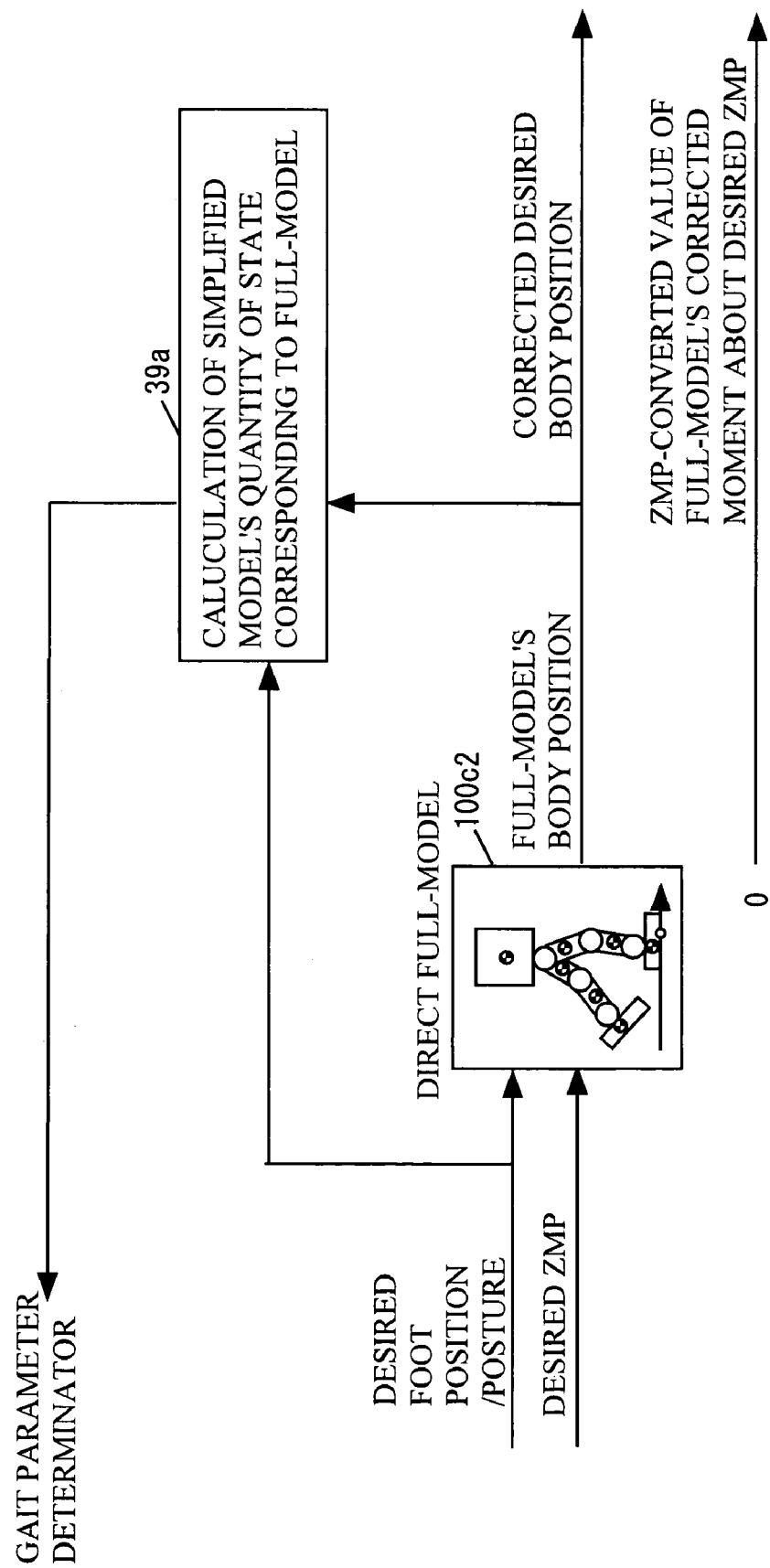
FIG. 39 is a functional block diagram showing the gait correction conducted in the motion generation system of a legged mobile robot according to an eighteenth embodiment of the present invention.

FIG. 39 is a functional block diagram showing the operation of the motion generation system of a legged mobile robot according to an eighteenth embodiment of the present invention. More specifically, it shows the gait correction explained with reference to S32 of the flow chart of FIG. 11.

The gait correction in the eighteenth embodiment is a method to use the direct dynamic full-model (direct full-model) and a method to directly determine the quantity of state of the simplified model (that corresponds to the state of the full-model) from the quantity of state of the full-model.

Specifically, different from the seventeenth embodiment where the simplified model's behavior is controlled to follow up the full-model's behavior that satisfies the desired ZMP, the eighteenth embodiment is arranged such that, the simplified model's quantity of state is directly calculated based on the assumption that the simplified model's behavior has completely followed up the full-model's behavior that satisfies the desired ZMP. The quantity of state of the simplified model is determined, specifically, by calculating the inverted pendulum's body position and velocity (of the simplified model) that satisfy the relationship shown in FIG. 7, relative to the body representing point's position and velocity of the direct full-model. Further, the system is arranged such that it determines the ZMP-converted value of full-model's corrected moment about the desired ZMP zero, and it determines or outputs the direct full-model's body position as the corrected desired body position.

Having been arranged in the foregoing manner, the system according to the eighteenth embodiment can have similar effects as that of the seventeenth embodiment.

Figure 40:
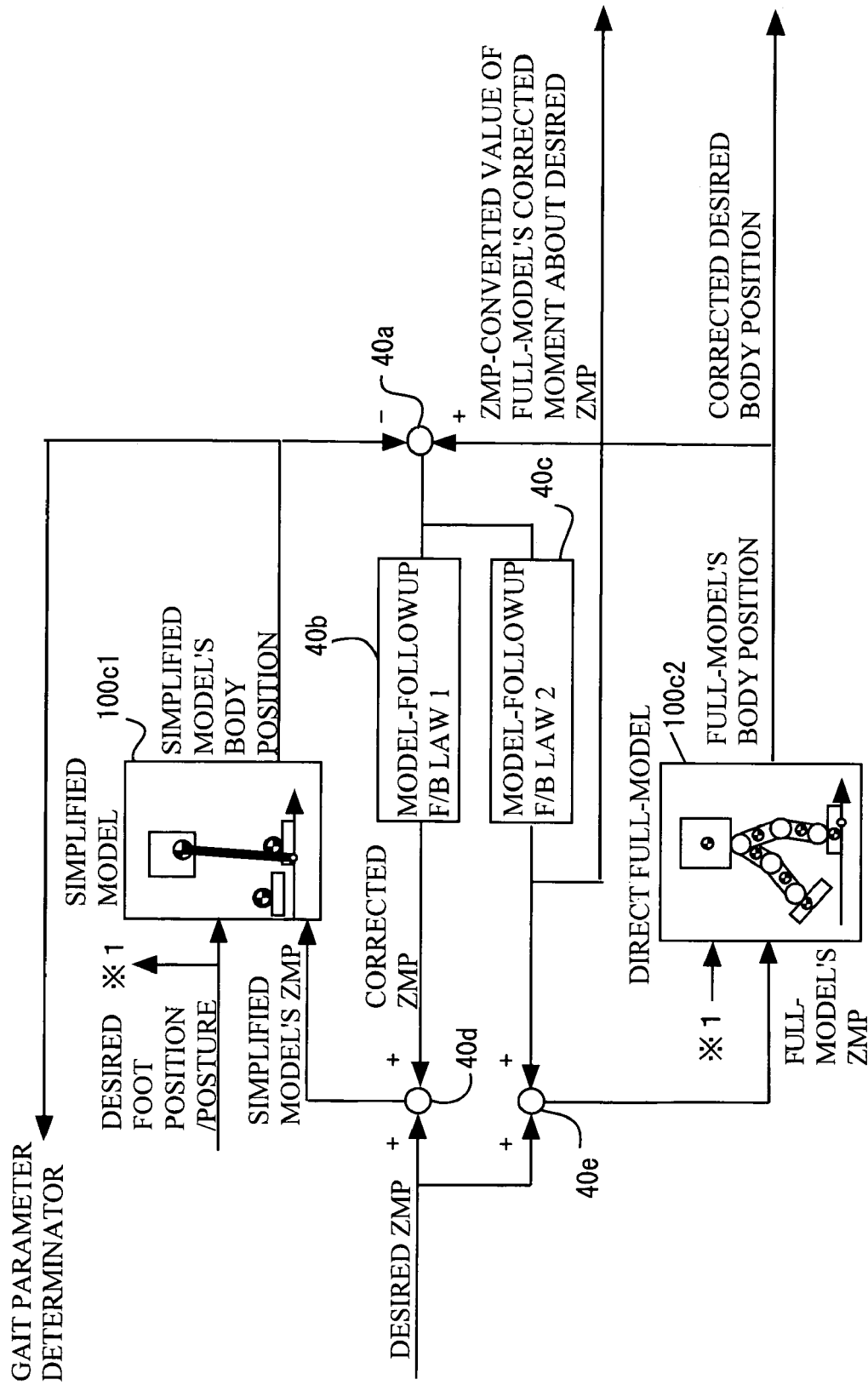
FIG. 40 is a functional block diagram showing the gait correction conducted in the motion generation system of a legged mobile robot according to a nineteenth embodiment of the present invention.

FIG. 40 is a functional block diagram showing the operation of the motion generation system of a legged mobile robot according to a nineteenth embodiment of the present invention. More specifically, it shows the gait correction explained with reference to S32 of the flow chart of FIG. 11.

The gait correction in the nineteenth embodiment is a method to use the direct dynamic full-model (direct full-model), and a method to correct both the simplified model's ZMP and the full-model's ZMP, using a model-followup control law 1 and a model-followup control law 2, such that the behavior of the direct full-model behavior and that of the simplified model approach to each other. Further, the system is arranged such that it determines or outputs an output of the model-followup control law 2 as the ZMP-converted value of full-model's corrected moment about the desired ZMP and determines or outputs the full-model's body position as the corrected desired body position.

In other words, it is an intermediate or compromise correction method constituted as a mixture of the corrections of the sixteenth and seventeenth embodiments. Since the behavior of the simplified model deviates from its desired behavior, similar to the fourteenth embodiment, the gait parameters should necessarily be corrected. Like the foregoing embodiments, the difference in the centers of gravity position of the models or both the difference in the body position and the difference in the centers of gravity position of the models may be inputted to the model-followup control law 1 and 2.

Having been arranged in the foregoing manner, the system according to the nineteenth embodiment can have same effects as those of the sixteenth and seventeenth embodiments or can have intermediate or compromise effects thereof.

Figure 41:
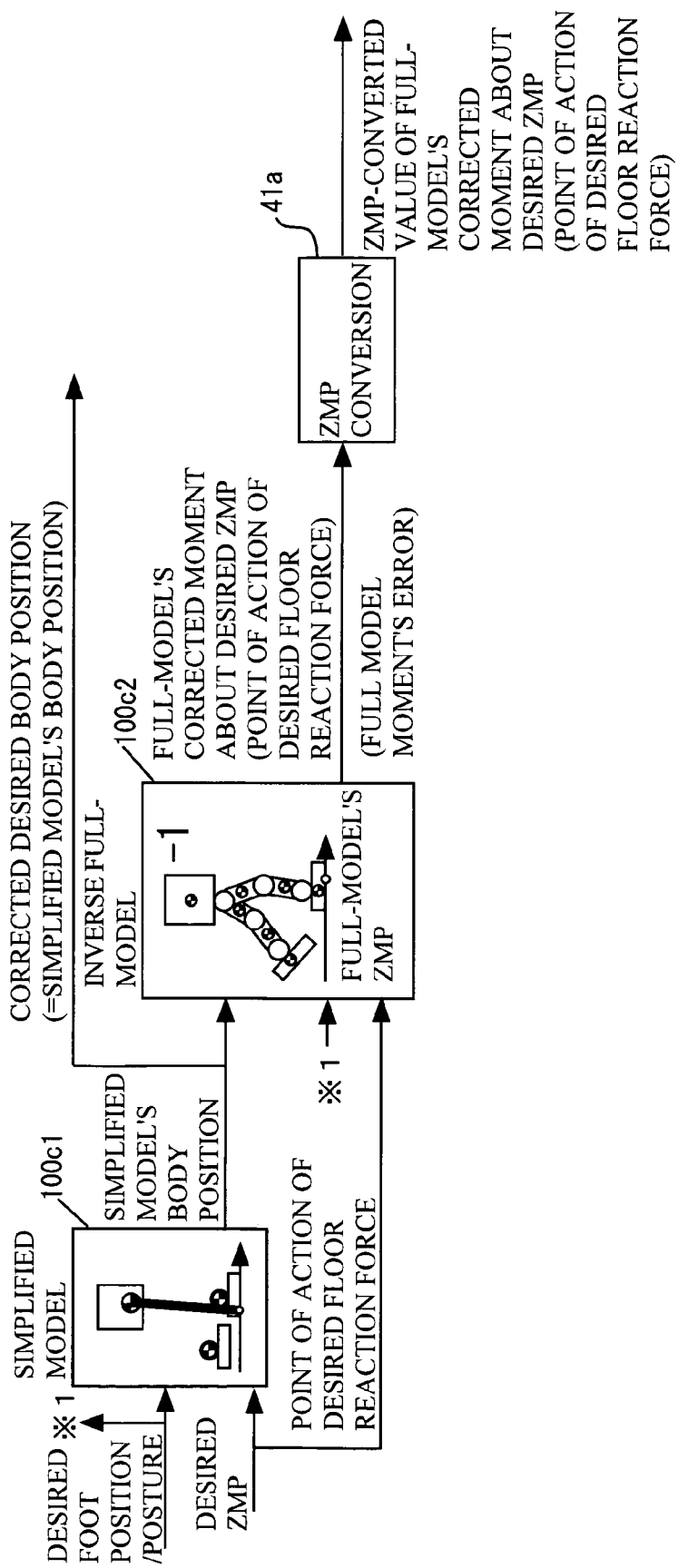
FIG. 41 is a functional block diagram showing the gait correction conducted in the motion generation system of a legged mobile robot according to a twentieth embodiment of the present invention.

FIG. 41 is a functional block diagram showing the operation of the motion generation system of a legged mobile robot according to a twentieth embodiment of the present invention. More specifically, it shows the gait correction explained with reference to S32 of the flow chart of FIG. 11.

The twentieth embodiment is a modification of the first embodiment illustrated in FIG. 16. The twentieth embodiment is arranged such that the inverse full-model 100c2 comprises a combination of the inverse full-model 100c2 and an addition point 16a illustrated in FIG. 16. Different from that illustrated in FIG. 16, in the twentieth embodiment, the inverse full-model outputs a full-model's corrected moment about the desired ZMP as a full-model's moment error, and the ZMP-converted value of full-model's corrected moment about the desired ZMP is determined or calculated at a ZMP conversion block 41a. The rest of the arrangement as well as the effects of the twentieth embodiment is the same as that of the first embodiment.

Figure 42:
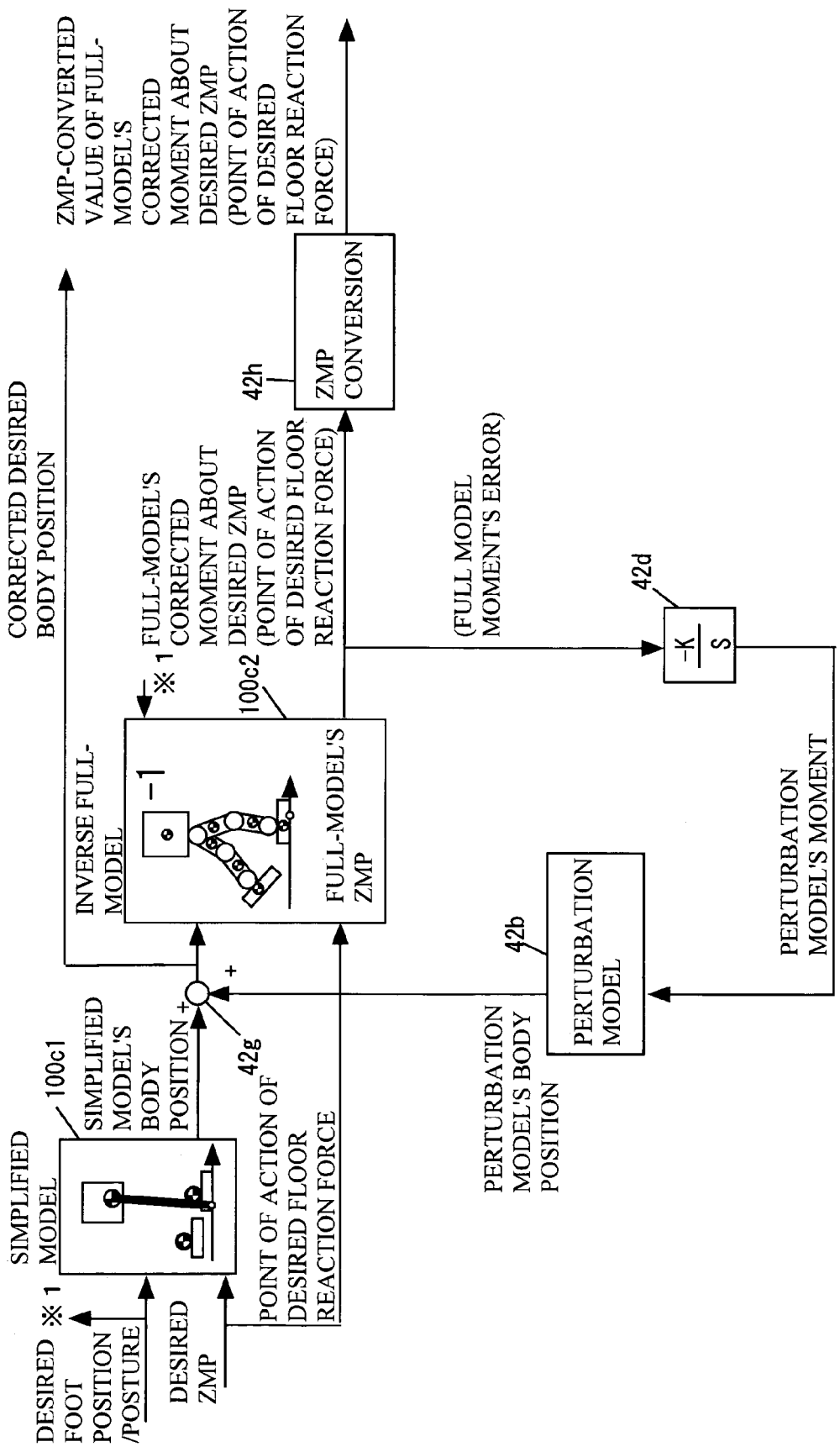
FIG. 42 is a functional block diagram, similar to FIG. 16, but showing the gait correction conducted in the motion generation system of a legged mobile robot according to a twenty-first embodiment of the present invention.

FIG. 42 is a functional block diagram showing the operation of the motion generation system of a legged mobile robot according to a twenty-first embodiment of the present invention. More specifically, it shows the gait correction explained with reference to S32 of the flow chart of FIG. 11.

The twenty-first embodiment is a modification of the second embodiment illustrated in FIG. 17. Similar to the twentieth embodiment, the twenty-first embodiment is arranged such that the inverse full-model 100c2 comprises a combination of the inverse full-model 100c2 and an addition point 17a illustrated in FIG. 17. Different from that illustrated in FIG. 17, in the twenty-first embodiment, the inverse full-model outputs the full-model's corrected moment about the desired ZMP as the full-model's moment error, and the ZMP-converted value of full-model's corrected moment about the desired ZMP is determined or calculated at a ZMP conversion block 42h. The rest of the arrangement as well as the effects of the twenty-first embodiment is the same as that of the second embodiment.

Figure 43:
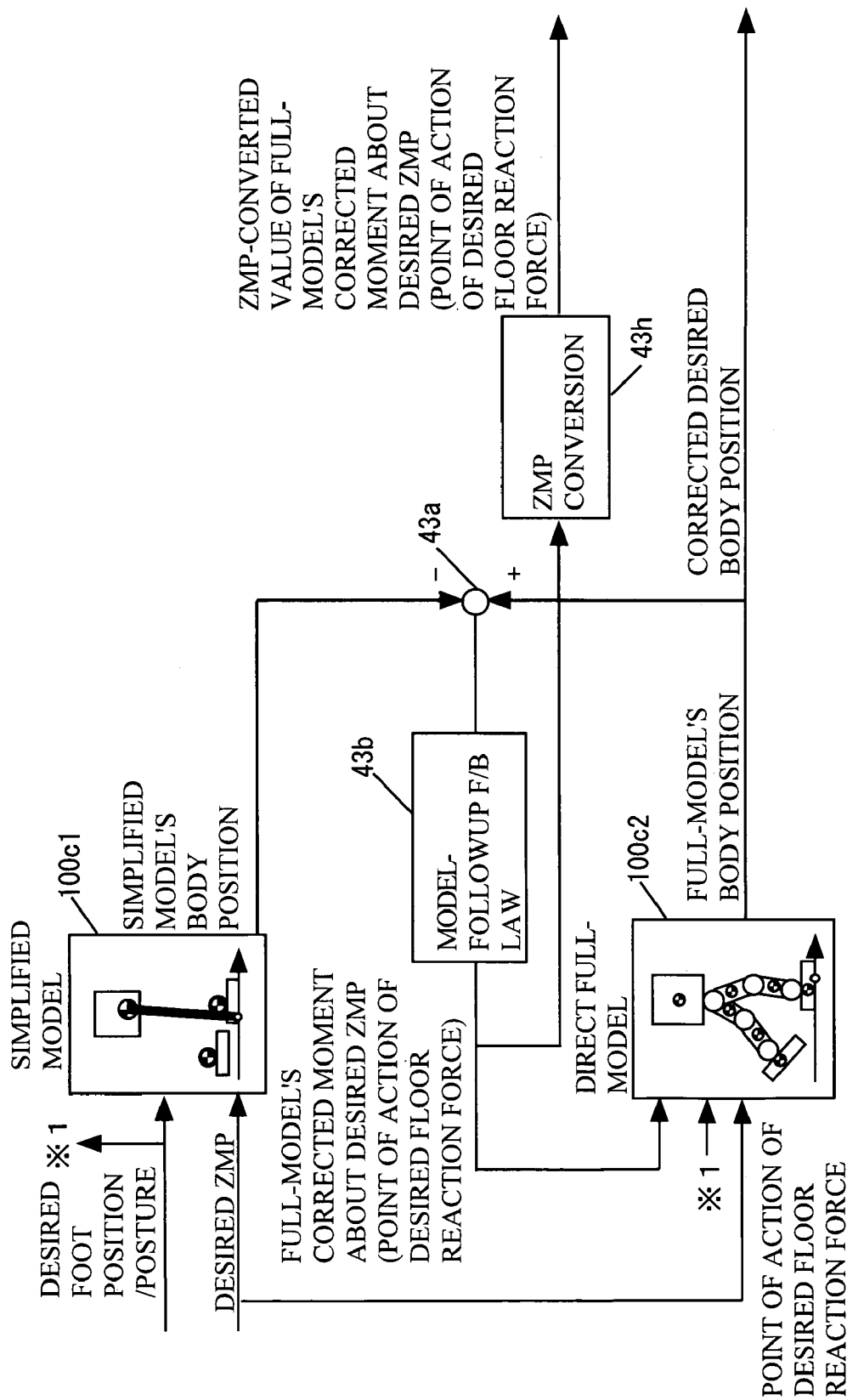
FIG. 43 is a functional block diagram, similar to FIG. 17, but showing the gait correction conducted in the motion generation system of a legged mobile robot according to a twenty-second embodiment of the present invention.

FIG. 43 is a functional block diagram showing the operation of the motion generation system of a legged mobile robot according to a twenty-second embodiment of the present invention. More specifically, it shows the gait correction explained with reference to S32 of the flow chart of FIG. 11.

The twenty-second embodiment is a modification of the sixteenth embodiment illustrated in FIG. 37. In the twenty-second embodiment, the model-followup control law outputs the full-model's corrected moment about the desired ZMP (the point of action of the desired floor reaction force) which is inputted to the direct full-model. The direct full-model generates a desired movement such that the full-model's corrected moment acts about the point of action of the desired floor reaction force, and outputs the body position of the desired movement as the full-model's body position. The system includes a ZMP-conversion block 43h that determines or calculates the ZMP-converted value of full-model's corrected moment about the desired ZMP. The rest of the arrangement as well as the effects of the twenty-second embodiment is the same as that of the sixteenth embodiment.

Figure 44:
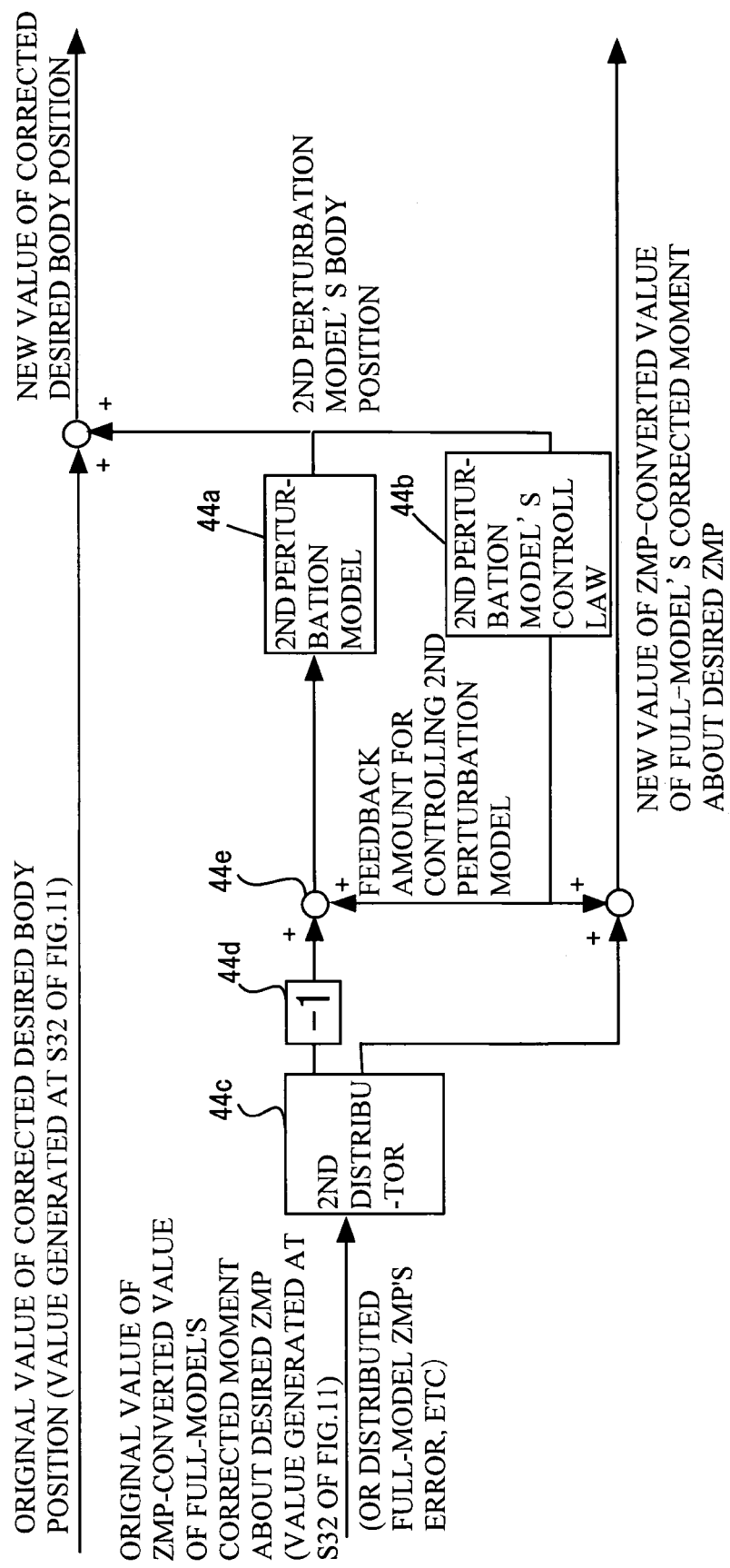
FIG. 44 is a functional block diagram, similar to FIG. 37, but showing the gait correction conducted in the motion generation system of a legged mobile robot according to a twenty-third embodiment of the present invention.

FIG. 44 is a functional block diagram showing the operation of the motion generation system of a legged mobile robot according to a twenty-third embodiment of the present invention. More specifically, it shows a gait correction method that further corrects the corrected gait corrected by the gait correction in the foregoing embodiments explained with reference to S32 of the flow chart of FIG. 11.

As illustrated in FIG. 44, the twenty-third embodiment is arranged such that, it inputs the corrected desired body position and the ZMP-converted value of full-model's corrected moment about the desired ZMP (obtained, by any of the correction methods explained in the first to twenty-second embodiments) to a conversion block shown there, and determines its outputs as new values of the corrected desired body position and the ZMP-converted value of full-model's corrected moment about the desired ZMP. By inserting such a conversion block, the system in this embodiment can further decrease fluctuation of the ZMP-converted value of full-model's corrected moment about the desired ZMP, like a case where the moment is filtered by a low-pass filter.

Explaining this conversion, the original value of the full-model's corrected moment about the desired ZMP (i.e., the input) is inputted to a second distributor 44c that distributes the input such that the sum of two outputs (a first distributed output and a second distributed output) are equal to the input. Then, a product obtained by multiplying the first distributed output by (−1) is added with a feedback amount for controlling a second perturbation model, and the sum obtained therefrom is inputted to the second perturbation model 44a. Thus, with the second perturbation model 44a, the body position of the second perturbation model is determined in such a manner that the sum, i.e., the input (to the second perturbation model) becomes equal to the second perturbation model's ZMP.

Next, the feedback amount for controlling the second perturbation model is determined by a second perturbation model control law 44b based on the determined second perturbation model's body position. The feedback amount for controlling the second perturbation model is fed back to the second perturbation model as mentioned above. At the same time, this amount is added to the second distributed output and the sum obtained therefrom is determined or outputted as the new value of the ZMP-converted value of full-model's corrected moment about the desired ZMP.

Further, the second perturbation model's body position is added to the original value of the corrected desired body position and the sum obtained therefrom is determined or outputted as the new value of the corrected desired body position.

The second perturbation model may be the same as the model, explained in the second embodiment with reference to FIG. 18, that expresses the relationship between the perturbation of the desired ZMP and that of the desired horizontal body position under the constraint condition that the foot posture and position are not perturbed. Or, it may be a model different from the above.

In the twenty-third embodiment, the second perturbation model control law may input other quantity of state or gait parameters, etc. The first distributed output may be the original value of the ZMP-converted value of full-model's corrected moment about the desired ZMP, whilst the second distributed output may be set to zero. In other words, the second distributor (and its output) may be removed. In that case, when incorporating into the arrangement of the first embodiment, it will be the ninth embodiment. It is alternatively possible to add a third distributor or more. The conversion block shown in FIG. 44 may be modified to multi-stage blocks connected in series.

Figure 45:
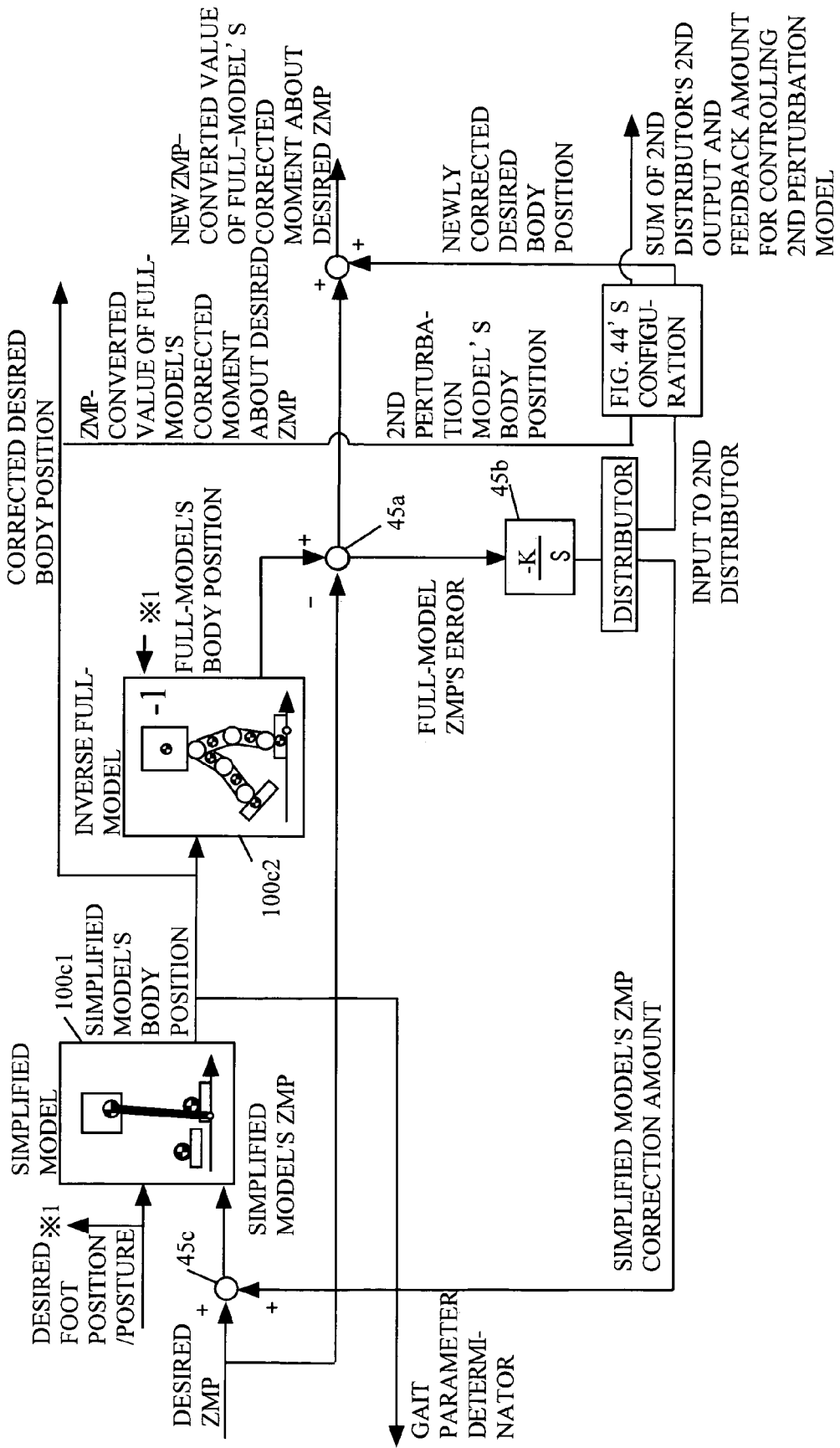
FIG. 45 is a functional block diagram, similar to FIG. 34, but showing a modification of the twenty-third embodiment.

Further, the illustrated arrangement of the twenty-third embodiment may be inserted in parallel to any of the first to twenty-second embodiments. In other words, it may be arranged such that the full-model's ZMP error or that obtained by passing it through a control law such as an integrator is distributed by a distributor and the conversion block illustrated is connected to the distributor. For example, when incorporating it into the fourteenth embodiment shown in FIG. 34, it will be as shown in FIG. 45. The arrangement may be inserted to the foregoing embodiments in a combination of series and parallel connections. However, the result will be complicated in structure and the effects will be not so much than expected.

Having been arranged in the foregoing manner, the system according to the twenty-third embodiment can further decrease fluctuation of the ZMP-converted value of full-model's corrected moment about the desired ZMP, like a case where the moment is filtered by a low-pass filter.

The concept of the twenty-third embodiment may be extended such that some of the first to twenty-second embodiment are rearranged to be combined with each other in series or in parallel.

Figure 46:
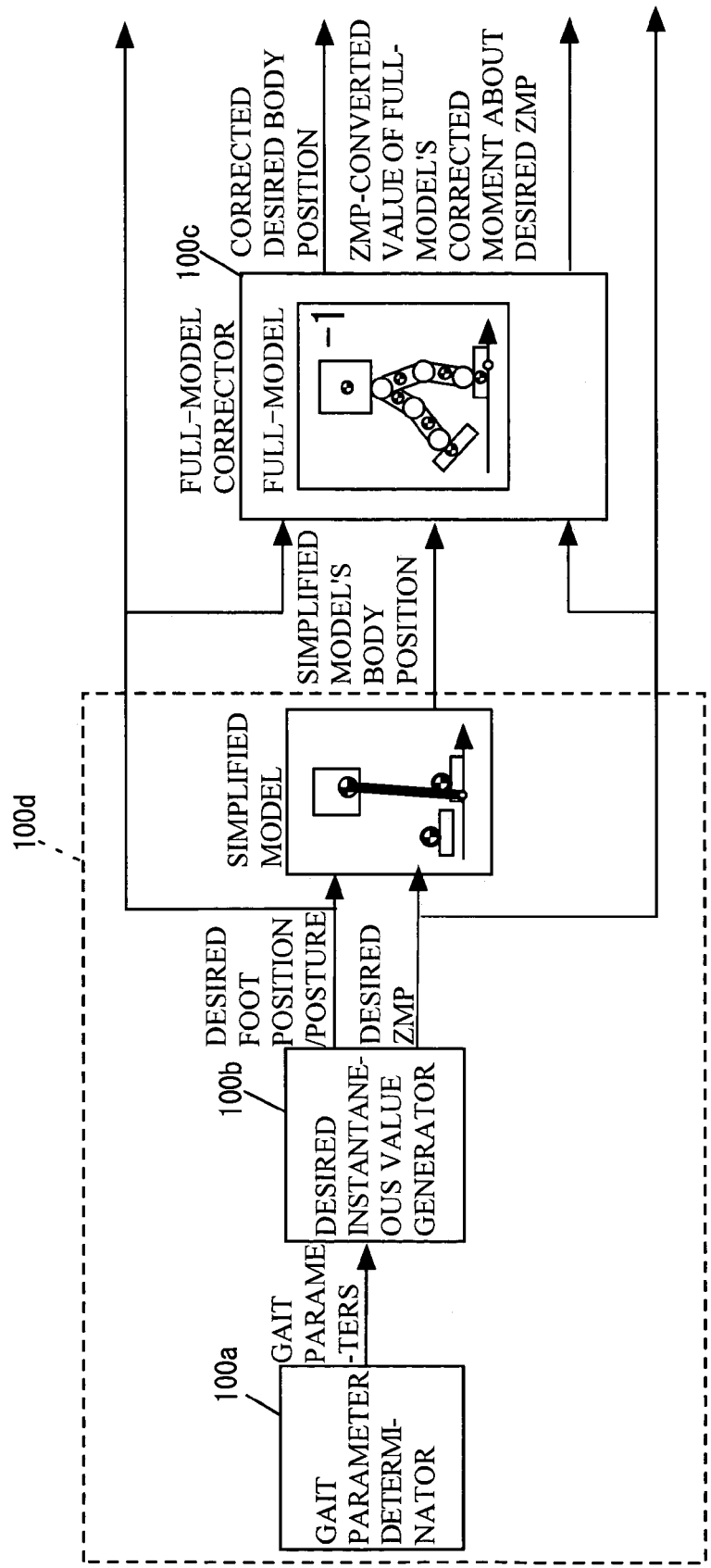
FIG. 46 is a functional block diagram, similar to FIG. 5, but showing an equivalent modification of the first embodiment, etc.

The gait generator (with full-model correction) 100 illustrated in FIG. 5 may be modified as shown in FIG. 46.

The arrangement shown in FIG. 46 is a method not to correct the ZMP of the simplified model (i.e., the gait correction method to bring the simplified model's ZMP to be equal to the desired ZMP), more particularly, is a modification of the methods of the first to thirteenth embodiments, the sixteenth embodiment, the twentieth to twenty-second embodiments and the twenty-third embodiment deriving therefrom.

To be more specific, since the desired gait parameters must have been generated based on the simplified model, in the method to bring the simplified model's ZMP to be equal to the desired ZMP, the simplified model's body trajectory must be the desired gait's body trajectory itself that has been generated based on the simplified model. Accordingly, in these methods, it becomes possible to separate the calculation of the simplified model's behavior from the full-model corrector.

Therefore, as illustrated in FIG. 46, it is arranged such that the gait parameter determinator, the desired instantaneous value generator and the simplified model are combined together to constitute a simplified model gait generator $100d$ such that the generator $100d$ generates the desired gait by calculating the simplified model's behavior, whereas the full-model corrector $100c$ corrects the generated desired gait to sufficiently satisfy the dynamic equilibrium condition. With this, since the arrangement obtained is a mere equivalent block conversion, it can achieve the same effects as those of the foregoing embodiments.

The simplified model gait generator $100d$ may not always be such a real-time-basis gait generator as proposed earlier. It may be a generator that generates a gait prepared as a table data beforehand. Alternatively, it may be a generator that generates a motion other than walking such as an operation using its arms. The motion or gait generated by the simplified model gait generator $100d$ may be a set of movement pattern and floor reaction force pattern generated only taking static balance into account (with paying no attention to the inertial force). In other words, it may be a set of movement pattern and floor points at which the center of gravity are projected. It may further be a set of movement pattern and the ZMP (point of action of floor reaction force) generated without taking the dynamic equilibrium condition into account. In that case, since the full-model's corrected moment about the desired ZMP becomes excessive if the generated gait or motion deviates far from the dynamic equilibrium condition, it is preferable to generate the gait or motion to satisfy the dynamic equilibrium condition as much as possible.

It should further be noted that, in the foregoing embodiments of feedback-type, when the feedback gain such as the integral gain K is set to be sufficiently large, the feedback amount for controlling the perturbation model (i.e., the output from the perturbation model control law) may be used as the ZMP-converted value of full-model's corrected moment about the desired ZMP, since, if doing so, the relationships expressed in Eqs. 15 and 17 can be satisfied and the full-model's correction error becomes almost zero when the feedback gain is sufficiently large. Further, when the ZMP-converted value of full-model's corrected moment about the desired ZMP is sufficiently small and it does not influence upon the posture control, the ZMP-converted value may always be zero or the value itself may be removed.

It should further be noted that the relationship expressed in Eq. 15 should be satisfied at a low frequency region that influences upon the posture behavior, but need not be satisfied at high frequency region unless it deviates excessively. Accordingly, a low-pass filter or some similar factor may be inserted in the block diagrams shown in the foregoing embodiments. For example, a non-linear element such as a change-rate-limiter may be added. For example, in the fifth, sixth and twelfth embodiments, the center of gravity difference may be passed through a non-linear element such as the change-rate-limiter or a filter. In Eq. 21, etc., instead of the perturbation model's horizontal body velocity, the change rate of the center of gravity difference may be used. In the eleventh embodiment, the desired settling position may be passed through a similar filter or non-linear element.

It should further be noted that, in the foregoing embodiments, instead of the integration, other control law (such as PID, a filter) may be used. In that case, the gain or filter characteristic may be varied in response to the gait parameters.

It should further be noted that, although the embodiments are arranged such that the ZMP-converted value of full-model's corrected moment about the desired ZMP is outputted, it is alternatively possible to output the full-model's corrected moment immediately.

It should further be noted that the arrangement shown in FIG. 4 may be modified such that the ZMP-converted value of full-model's corrected moment about the desired ZMP is added to the desired ZMP to produce a "corrected desired moment", whilst the ZMP-converted value of full-model's corrected moment about the desired ZMP is made zero and is inputted to the composite compliance motion determinator 104 (i.e., the ZMP-converted value of full-model's corrected moment about the desired ZMP may not not outputted from the gait generator (with full-model correction) and may not be inputted to the composite compliance motion determinator 104). In other words, instead of correcting by the full-model correct moment, it is alternatively possible to correct the desired ZMP. However, when doing so, it is difficult to set the foot floor reaction force central point in the composite compliance control. When the composite compliance motion determinator 104, etc., (that inputs the outputs from the gait generator 100) does not require the information on the floor reaction force such as the desired ZMP, the information itself may be removed.

It should further be noted that, although the term "(desired) ZMP" is used in the foregoing embodiments, the (desired) ZMP is an example for expressing the (desired) floor reaction force, and it is alternatively possible to express the force by a force and moment at a certain reference point.

It should further be noted that, although the gait should be corrected or changed when t=0 in S10 of the flow chart of FIG. 11, the gait may be corrected or changed at another time point. In that case, it suffices if the current time is deemed as the initial time of the current time gait. In other words, it suffices if the time of period of the current time gait is determined to extend from the current time to the terminal time of the current time gait.

It should further be noted that the block diagram illustrated in FIGS. 8 and 16, etc. may be altered insofar as equivalent operation is possible.

It should further be noted that, instead of correcting the body position, the body posture or the arm posture may be corrected if such a correction is able to vary the ZMP of the robot 1 to a great extent. It is alternatively possible to correct the both in a composite manner.

As mentioned above, the first embodiment is arranged to have a system for generating a motion including walking of a legged mobile robot 1 having at least a body 24 and a plurality of legs 2 each connected to the body, comprising: desired movement determining means (the gait parameter determinator 100*a*, the desired (and provisional) instantaneous value generator 100*b*, the calculation of the simplified model 100*c*1) for determining a desired movement that defines the motion; desired floor reaction force calculating means (the inverse full-model 100*c*2, the calculation of the inverse full-model shown in FIG. 16, the addition point 16*a*) for calculating a desired floor reaction force based on at least the determined desired movement, using a dynamic model that expresses a relationship between the movement of the robot and a floor reaction force; and floor reaction force controlling means (the block 102) for controlling the floor reaction force actually acting on the robot based on at least the calculated floor reaction force.

Further, the embodiment is arranged to have a system for generating a motion including walking of a legged mobile robot 1 having at least a body 24 and a plurality of legs 2 each connected to the body, comprising: desired motion determining means (the gait parameter determinator 100*a*, the desired (and provisional) instantaneous value generator 100*b*, the calculation of the simplified model 100*c*1) for determining a desired movement and a desired ZMP that define the motion; desired ZMP correction amount calculating means (the inverse full-model 100*c*2, the calculation of the inverse full-model shown in FIG. 16, the addition point 16*a*) for calculating a correction amount of the desired ZMP (the ZMP-converted value of full-model's corrected moment about the desired ZMP) based on at least the determined desired movement and the desired ZMP, using a dynamic model that expresses a relationship between the movement of the robot and a ZMP; and floor reaction force controlling means (the block 102) for controlling the floor reaction force actually acting on the robot based on at least the calculated correction amount of the desired ZMP.

As mentioned above, the twentieth embodiment is arranged to have a system for generating a motion including walking of a legged mobile robot 1 having at least a body 24 and a plurality of legs 2 each connected to the body, comprising: desired motion determining means (the gait parameter determinator 100*a*, the desired (and provisional) instantaneous value generator 100*b*, the calculation of the simplified model 100*c*1 shown in FIG. 41) for determining a desired movement and a desired a point of action of a desired floor reaction force that define the motion; desired floor reaction force moment calculating means (the full-model 100*c*2 (the inverse full-model shown in FIG. 41)) for calculating a desired floor reaction force's moment about the point of action of the desired floor reaction force based on at least the desired movement and the point of action of the desired floor reaction force, using a dynamic model that expresses a relationship between the movement of the robot and a floor reaction force; and floor reaction force controlling means (the block 102, the ZMP conversion block 41 a shown in FIG. 41)for controlling the floor reaction force actually acting on the robot based on at least the calculated desired floor reaction force's moment.

As mentioned above, the second embodiment is arranged to have a system for generating an instantaneous value of motion including walking of a legged mobile robot 1 having at least a body 24 and a plurality of legs 2 each connected to the body, when the robot performs the motion, comprising: provisional instantaneous value determining means (the gait parameter determinator 100*a*, the desired (and provisional) instantaneous value generator 100*b*, the calculation of the simplified model 100*c*1 shown in FIG. 17) for determining provisional instantaneous values of a desired movement and a desired floor reaction force that constitute the motion; model floor reaction force calculating means (the calculation of the inverse full-model 100*c*2 shown in FIG. 17) for calculating a model's floor reaction force (the full-model's ZMP shown in FIG. 17) based on at least the determined provisional instantaneous value of the desired movement, using a dynamic model that expresses a relationship between the movement of the robot and a floor reaction force; floor reaction force difference calculating means (the addition point 17*a* shown in FIG. 17) for calculating a difference (the full-model ZMP's error shown in FIG. 17) between the calculated model's floor reaction force and the determined provisional instantaneous value of the desired floor reaction force; and desired instantaneous value determining means (the gait generator (with full-model correction) 100, in particular the block 17*b*, the perturbation model 17*c*, the addition point 17*d* and to determine the output of the addition point 17*d* as the corrected desired body position) for determining a desired instantaneous value of the desired movement (the corrected desired body position shown in FIG. 17), by correcting at least the provisional instantaneous value of the desired movement based on at least the calculated difference. It should be noted that this will also be applied to the third to the thirteenth embodiments.

Further, the second embodiment is arranged to have a system for generating an instantaneous value of motion including walking of a legged mobile robot 1 having at least a body 24 and a plurality of legs 2 each connected to the body, when the robot performs the motion, comprising: provisional instantaneous value determining means (the gait parameter determinator 100*a*, the desired (and provisional) instantaneous value generator 100*b*, the calculation of the simplified model 100c1 shown in FIG. 17) for determining provisional instantaneous values of a desired movement and a desired ZMP that constitute the motion; model ZMP calculating means (the calculation of the inverse full-model 100c2 shown in FIG. 17) for calculating a model's ZMP (the full-model's ZMP shown in FIG. 17) based on at least the determined provisional instantaneous value of the desired movement, using a dynamic model that expresses a relationship between the movement of the robot and a ZMP; ZMP difference calculating means (the addition point 17a shown in FIG. 17) for calculating a difference (the full-model ZMP's error shown in FIG. 17) between the calculated model's ZMP and the determined provisional instantaneous value of the desired ZMP; and desired instantaneous value determining means (the gait generator (with full-model correction) 100, in particular the block 17b, the perturbation model 17c, the addition point 17d and to determine the output of the addition point 17d as the corrected desired body position) for determining a desired instantaneous value of the desired movement (the corrected desired body position shown in FIG. 17), by correcting at least the provisional instantaneous value of the desired movement based on at least the calculated difference. It should be noted that this will also be applied to the third to the thirteenth embodiments.

As mentioned above, the twenty-first embodiment is arranged to have a system for generating an instantaneous value of motion including walking of a legged mobile robot 1 having at least a body 24 and a plurality of legs 2 each connected to the body, when the robot performs the motion, comprising: provisional instantaneous value determining means (the gait parameter determinator 100a, the desired (and provisional) instantaneous value generator 100b, the calculation of the simplified model 100c1 shown in FIG. 42) for determining provisional instantaneous values of a desired movement and a desired ZMP that constitute the motion; model floor reaction force moment calculating means (the calculation of the inverse full-model 100c2 shown in FIG. 42) for calculating a model floor reaction force's moment about the provisional instantaneous value of the desired ZMP (the full-model's corrected moment about the desired ZMP) based on at least the determined provisional instantaneous values of the desired movement and the desired ZMP, using a dynamic model that expresses a relationship between the movement of the robot and a floor reaction force; and desired instantaneous value determining means (the gait generator (with full-model correction) 100, in particular the perturbation model 42b, the block 42d, the addition point 42g and to determine the output of the addition point 42g as the corrected desired body position) for determining a desired instantaneous value of the desired movement (the corrected desired body position shown in FIG. 42), by correcting at least the provisional instantaneous value of the desired movement based on at least the calculated model floor reaction force's moment.

As mentioned above, the second embodiment is arranged to have a system for generating an instantaneous value of motion including walking of a legged mobile robot 1 having at least a body 24 and a plurality of legs 2 each connected to the body, when the robot performs the motion, comprising: provisional instantaneous value determining means (the gait parameter determinator 100a, the desired (and provisional) instantaneous value generator 100b, the calculation of the simplified model 100c1 shown in FIG. 17) for determining provisional instantaneous values of a desired movement and a desired floor reaction force that constitute the motion; model floor reaction force calculating means (the calculation of the inverse full-model 100c2 shown in FIG. 17) for calculating a model's floor reaction force (the full-model's ZMP shown in FIG. 17) based on at least the determined provisional instantaneous value of the desired movement, using a dynamic model that expresses a relationship between the movement of the robot and a floor reaction force; floor reaction force difference calculating means (the addition point 17a shown in FIG. 17) for calculating a difference (the full-model ZMP's error shown in FIG. 17) between the calculated model's floor reaction force and the determined provisional instantaneous value of the desired floor reaction force; and desired instantaneous value determining means (the gait generator (with full-model correction) 100, in particular the block 17b, the perturbation model 17c, the addition point 17d, to determine the output of the addition point 17d as the corrected desired body position and to determine the output of the addition point 17a as the ZMP-converted value of full-model's corrected moment about the desired ZMP) for determining desired instantaneous values of the desired movement and the desired floor reaction force (the corrected desired body position and the ZMP-converted value of full-model's corrected moment about the desired ZMP, etc., shown in FIG. 17), by correcting at least the provisional instantaneous value of the desired movement based on at least the calculated difference such that the relationship between the movement and the floor reaction force is satisfied. It should be noted that this will also be applied to the third to the thirteenth embodiments.

The second embodiment is also arranged to have a system for generating an instantaneous value of motion including walking of a legged mobile robot 1 having at least a body 24 and a plurality of legs 2 each connected to the body, when the robot performs the motion, comprising: provisional instantaneous value determining means (the gait parameter determinator 100a, the desired (and provisional) instantaneous value generator 100b, the calculation of the simplified model 100c1 shown in FIG. 17) for determining provisional instantaneous values of a desired movement and a desired ZMP that constitute the motion; model ZMP calculating means (the calculation of the inverse full-model 100c2 shown in FIG. 17) for calculating a model's ZMP (the full-model's ZMP shown in FIG. 17) based on at least the determined provisional instantaneous value of the desired movement, using a dynamic model that expresses a relationship between the movement of the robot and a ZMP; ZMP difference calculating means (the addition point 17a shown in FIG. 17) for calculating a difference (the full-model ZMP's error shown in FIG. 17) between the calculated model's ZMP and the determined provisional instantaneous value of the desired ZMP; and desired instantaneous value determining means (the gait generator (with full-model correction) 100, in particular the block 17b, the perturbation model 17c, the addition point 17d, to determine the output of the addition point 17d as the corrected desired body position and to determine the output of the addition point 17a as the ZMP-converted value of full-model's corrected moment about the desired ZMP) for determining desired instantaneous values of the desired movement and the desired floor reaction force (the corrected desired body position and the ZMP-converted value of full-model's corrected moment about the desired ZMP, etc., shown in FIG. 17) such that the relationship between the movement and the floor reaction force is satisfied, by correcting at least the provisional instantaneous value of the desired movement based on at least the calculated difference. It should be noted that this will also be applied to the third to the thirteenth embodiments.

As mentioned above, the twenty-first embodiment is arranged to have a system for generating an instantaneous value of motion including walking of a legged mobile robot 1 having at least a body 24 and a plurality of legs 2 each connected to the body, when the robot performs the motion, comprising: provisional instantaneous value determining means (the gait parameter determinator 100a, the desired (and provisional) instantaneous value generator 100b, the calculation of the simplified model 100c1 shown in FIG. 42) for determining provisional instantaneous values of a desired movement and a desired ZMP that constitutes the motion; model floor reaction force moment calculating means (the calculation of the inverse full-model 100c2 shown in FIG. 42) for calculating a model floor reaction force's moment about the provisional instantaneous value of the desired ZMP (the full-model's corrected moment about the desired ZMP shown in FIG. 42) based on at least the determined provisional instantaneous values of the desired movement and the desired ZMP, using a dynamic model that expresses a relationship between the movement of the robot and a floor reaction force; and desired instantaneous value determining means (the gait generator (with full-model correction) 100, in particular the perturbation model 42b, the block 42d, the addition point 42g, the block 42h, to determine the output of the addition point 42g as the corrected desired body position and to determine the output of the block 42h as the ZMP-converted value of full-model's corrected moment about the desired ZMP (the point of action of desired floor reaction force)) for determining a desired instantaneous values of the desired movement and the desired floor reaction force (the corrected desired body position and the ZMP-converted value of full-model's corrected moment about the desired ZMP, etc., shown in FIG. 42), by correcting at least the provisional instantaneous value of the desired movement based on at least the calculated model floor reaction force's moment such that the relationship between the movement and the floor reaction force is satisfied.

As mentioned above, the second embodiment is arranged to have a system for generating an instantaneous value of motion including walking of a legged mobile robot 1 having at least a body 24 and a plurality of legs 2 each connected to the body, when the robot performs the motion, comprising: provisional instantaneous value determining means (the gait parameter determinator 100a, the desired (and provisional) instantaneous value generator 100b, the calculation of the simplified model 100c1 shown in FIG. 17) for determining provisional instantaneous values of a desired movement and a desired floor reaction force that constitute the motion; model output calculating means (the calculation of the inverse full-model 100c2 shown in FIG. 17) for inputting at least the determined provisional instantaneous value of the desired movement to a dynamic model that expresses a relationship between the movement of the robot and a floor reaction force, and for calculating an output of the model (the full-model's ZMP shown in FIG. 17); floor reaction force difference calculating means (the addition point 17a and its output shown in FIG. 17) for calculating a difference (the full-model ZMP's error shown in FIG. 17) between the calculated output of the model and the determined provisional instantaneous value of the desired floor reaction force; desired movement correction amount calculating means (the perturbation model 17c and the block 17b shown in FIG. 17) for calculating a correction amount of at least the desired movement (the perturbation model's body position shown in FIG. 17) based on at least the calculated difference; model input correcting means (the addition point 17d shown in FIG. 17) for additionally inputting the calculated correction amount to the dynamic model; and desired instantaneous value determining means (the gait generator (with full-model correction) 100, in particular to determine the output of the addition point 17d as the corrected desired body position and to determine the output of the addition point 17a as the ZMP-converted value of full-model's corrected moment about the desired ZMP) for determining desired instantaneous values of the desired movement and the desired floor reaction force based on at least the input to and the output from the dynamic model. It should be noted that this will also be applied to the third to the seventh embodiments.

The second embodiment is also arranged to have a system for generating an instantaneous value of motion including walking of a legged mobile robot 1 having at least a body 24 and a plurality of legs 2 each connected to the body, when the robot performs the motion, comprising: provisional instantaneous value determining means (the gait parameter determinator 100a, the desired (and, provisional) instantaneous value generator 100b, the calculation of the simplified model 100c1 shown in FIG. 17) for determining provisional instantaneous values of a desired movement and a desired ZMP that constitute the motion; model output calculating means (the calculation of the inverse full-model 100c2 shown in FIG. 17) for inputting at least the determined provisional instantaneous value of the desired movement to a dynamic model that expresses a relationship between the movement of the robot and a ZMP, and for calculating an output of the model (the full-model's ZMP shown in FIG. 17); ZMP difference calculating means (the addition point 17a and its output shown in FIG. 17) for calculating a difference (the full-model ZMP's error shown in FIG. 17) between the calculated output of the model and the determined provisional instantaneous value of the desired ZMP; desired movement correction amount calculating means (the perturbation model 17c and the block 17b shown in FIG. 17) for calculating a correction amount of at least the desired movement (the perturbation model's body position shown in FIG. 17) based on at least the calculated difference; model input correcting means (the addition point 17d shown in FIG. 17) for additionally inputting the calculated correction amount to the dynamic model; and desired instantaneous value determining means (the gait generator (with full-model correction) 100, in particular to determine the output of the addition point 17d as the corrected desired body position and to determine the output of the addition point 17a as the ZMP-converted value of full-model's corrected moment about the desired ZMP) for determining desired instantaneous values of the desired movement and the desired floor reaction force based on at least the input to and the output from the dynamic model. It should be noted that this will also be applied to the third to the seventh embodiments.

As mentioned above, the twenty-first embodiment is arranged to have a system for generating an instantaneous value of motion including walking of a legged mobile robot 1 having at least a body 24 and a plurality of legs 2 each connected to the body, when the robot performs the motion, comprising: provisional instantaneous value determining means (the gait parameter determinator 100a, the desired (and provisional) instantaneous value generator 100b, the calculation of the simplified model 100c1 shown in FIG. 42) for determining provisional instantaneous values of a desired movement and a desired ZMP that constitute the motion; model output calculating means (the calculation of the inverse full-model 100c2 shown in FIG. 42) for inputting at least the determined provisional instantaneous values of the desired movement and the desired ZMP to a dynamic model that expresses a relationship between the movement of the robot and a floor reaction force's moment about a point of action of a floor reaction force, and for calculating an output of the model as a floor reaction force's moment about the provisional instantaneous value of the desired ZMP (the full-model's corrected moment about the desired ZMP shown in FIG. 42); desired movement correction amount calculating means (the perturbation model 42b and the block 42d shown in FIG. 42) for calculating a correction amount of at least the desired movement (the perturbation model's body position shown in FIG. 42) based on at least the output of the model; model input correcting means (the addition point 42g shown in FIG. 42) for additionally inputting the calculated correction amount to the dynamic model; and desired instantaneous value determining means (the gait generator (with full-model correction) 100, in particular the block 42h, to determine the output of the addition point 42g as the corrected desired body position and to determine the output of the block 42h as the ZMP-converted value of full-model's corrected moment about the desired ZMP (the point of action of desired floor reaction force)) for determining desired instantaneous values of the desired movement and the desired floor reaction force based on at least the input to and the output from the dynamic model.

As mentioned above, the third embodiment is arranged such that, in addition to the arrangement of the second embodiment, the desired movement correction amount calculating means includes: a perturbation model (the perturbation model 23b shown in FIG. 23) that expresses a dynamic relationship between perturbation of the floor reaction force and perturbation of the movement of the robot; first feedback amount calculating means (the perturbation model control law 23e) for calculating a first feedback amount (the feedback amount for controlling the perturbation model shown in FIG. 23) based on at least one of a quantity of state of the perturbation model (e.g., the perturbation model's body position and/or velocity) and a quantity of state of the dynamic model (e.g., the dynamic model's center of gravity position); and second feedback amount calculating means (the addition point 23c and the block 23d shown in FIG. 23) for calculating a second feedback amount based on at least a difference between the calculated difference and the first feedback amount; and calculates the correction amount of the desired movement by inputting a sum of the first and second feedback amounts to the perturbation model (the addition point 23f and the perturbation model 23b shown in FIG. 23).

The fifth embodiment and the seventh embodiment are arranged such that, the first feedback amount calculating means calculates the first feedback amount based on at least the dynamic model's center of gravity position. 16.

As mentioned above, the eighth embodiment is arranged to have a system for generating an instantaneous value of motion including walking of a legged mobile robot 1 having at least a body 24 and a plurality of legs 2 each connected to the body, when the robot performs the motion, comprising: provisional instantaneous value determining means (the gait parameter determinator 100a, the desired (and provisional) instantaneous value generator 100b, the calculation of the simplified model 100c1 shown in FIG. 28) for determining provisional instantaneous values of a desired movement and a desired floor reaction force that constitute the motion; model output calculating means (the calculation of the inverse full-model 100c2 shown in FIG. 28) for inputting at least the determined provisional instantaneous value of the desired movement to a dynamic model that expresses a relationship between the movement of the robot and a floor reaction force, and for calculating an output of the model (the full-model's ZMP shown in FIG. 28); floor reaction force difference calculating means (the addition point 28a shown in FIG. 28) for calculating a difference (the full-model ZMP's error shown in FIG. 28) between the calculated output of the model and the determined provisional instantaneous value of the desired floor reaction force; desired movement correction amount calculating means (the block 28b and the perturbation model 28c shown in FIG. 28) for calculating a correction amount of at least the desired movement (the perturbation model's body position shown in FIG. 28) based on at least the calculated difference; and desired instantaneous value determining means (the gait generator (with full-model correction) 100, in particular the addition point 28d, to determine the output of the addition point 28d as the desired corrected body position and to determine the ZMP-converted value of full-model's corrected moment about the desired ZMP to zero) for determining desired instantaneous values of the desired movement and the desired floor reaction force based on at least the calculated correction amount. It should be noted that this will also be applied to the ninth to the thirteenth embodiments.

The eighth embodiment is also arranged to have a system for generating an instantaneous value of motion including walking of a legged mobile robot 1 having at least a body 24 and a plurality of legs 2 each connected to the body, when the robot performs the motion, comprising: provisional instantaneous value determining means (the gait parameter determinator 100a, the desired (and provisional) instantaneous value generator 100b, the calculation of the simplified model 100c1 shown in FIG. 28) for determining provisional instantaneous values of a desired movement and a desired ZMP that constitute the motion; model output calculating means (the calculation of the inverse full-model 100c2 shown in FIG. 28) for inputting at least the determined provisional instantaneous value of the desired movement to a dynamic model that expresses a relationship between the movement of the robot and a ZMP, and for calculating an output of the model (the full-model's ZMP shown in FIG. 28); ZMP difference calculating means (the addition point 28a shown in FIG. 28) for calculating a difference (the full-model ZMP's error shown in FIG. 28) between the calculated output of the model and the determined provisional instantaneous value of the desired ZMP; desired movement correction amount calculating means (the block 28b and the perturbation model 28c shown in FIG. 28) for calculating a correction amount of at least the desired movement (the perturbation model's body position shown in FIG. 28) based on at least the calculated difference; and desired instantaneous value determining means (the gait generator (with full-model correction) 100, in particular the addition point 28d, to determine the output of the addition point 28d as the corrected desired body position and to determine the ZMP-converted value of full-model's corrected moment about the desired ZMP to zero) for determining desired instantaneous values of the desired movement and the desired floor reaction force based on at least the calculated correction amount. It should be noted that this will also be applied to the ninth to the thirteenth embodiments.

The eighth embodiment is further arranged to have a system for generating an instantaneous value of motion including walking of a legged mobile robot 1 having at least a body 24 and a plurality of legs 2 each connected to the body, when the robot performs the motion, comprising: provisional instantaneous value determining means (the gait parameter determinator 100a, the desired (and provisional) instantaneous value generator 100b, the calculation of the simplified model 100c1 shown in FIG. 28) for determining provisional instantaneous values of a desired movement and a desired ZMP that constitute the motion; model output calculating means (the calculation of the inverse full-model 100c2, the addition point 28a shown in FIG. 28) for inputting at least the determined provisional instantaneous value of the desired movement to a dynamic model that expresses a relationship between the movement of the robot and a floor reaction force's moment about a point of action of the floor reaction, and for calculating an output of the model as a floor reaction force's moment about the provisional instantaneous value of the desired ZMP (the full-model ZMP's error shown in FIG. 28); desired movement correction amount calculating means (the block 28b and the perturbation model 28c shown in FIG. 28) for calculating a correction amount of at least the desired movement (the perturbation model's body position shown in FIG. 28) based on at least the output of the model; and desired instantaneous value determining means (the gait generator (with full-model correction) 100, in particular the addition point 28d, to determine the output of the addition point 28d as the corrected desired body position and to determine the ZMP-converted value of full-model's corrected moment about the desired ZMP to zero) for determining desired instantaneous values of the desired movement and the desired floor reaction force based on at least the calculated correction amount. It should be noted that this will also be applied to the ninth to the thirteenth embodiments.

The ninth embodiment is arranged such that, in addition to the arrangement of the eighth embodiment, the desired movement correction amount calculating means includes: a perturbation model (the perturbation model shown in FIG. 29) that expresses a dynamic relationship between perturbation of the floor reaction force and perturbation of the movement of the robot; feedback amount calculating means (the perturbation model control law 29e shown in FIG. 29) for calculating a feedback amount (the feedback amount for controlling the perturbation model shown in FIG. 29) based on at least one of a quantity of state of the perturbation model (e.g., the perturbation model's body position and/or velocity) and a quantity of state of the dynamic model (e.g., the dynamic model's center of gravity position); and feedforward amount calculating means (the block 29b shown in FIG. 29) for calculating a feedforward amount such that the calculated difference or an output of the dynamic model is canceled; and calculates the correction amount of the desired movement by inputting a sum of the feedback amount and the feedforward amount to the perturbation model (the addition point 29c and the perturbation model shown in FIG. 29).

The eleventh and the thirteenth embodiments are arranged such that, the first feedback amount calculating means calculates the first feedback amount based on at least a position of the dynamic model's center of gravity (the full-model's center of gravity position shown in FIG. 31 or 33).

As mentioned above, the fourteenth embodiment is arranged to have a system for generating an instantaneous value of motion including walking of a legged mobile robot 1 having at least a body 24 and a plurality of legs 2 each connected to the body, when the robot performs the motion, comprising: desired floor reaction force provisional instantaneous value determining means (the gait parameter determinator 100a, the desired (and provisional) instantaneous value generator 100b) for determining a provisional instantaneous value of at least a desired floor reaction force (the desired ZMP shown in FIG. 34) in a desired movement and the desired floor reaction force that constitute the motion; desired movement provisional instantaneous value calculating means (the calculation of the simplified model 100c1 shown in FIG. 34) for inputting at least the determined provisional instantaneous value of the desired floor reaction force to a first dynamic model that expresses a relationship between the movement of the robot and a floor reaction force, and for calculating a provisional instantaneous value of the desired movement (the simplified model's body position shown in FIG. 34); second model output calculating means (the calculation of the inverse full-model 100c2 shown in FIG. 34) for inputting at least the determined provisional instantaneous value of the desired movement to a second dynamic model that expresses the relationship between the movement of the robot and the floor reaction force, and for calculating an output of the second dynamic model (the full-model's ZMP shown in FIG. 34); floor reaction force difference calculating means (the addition point 34a shown in FIG. 34) for calculating a difference (the full-model ZMP's error shown in FIG. 34) between the calculated output of the second dynamic model and the determined provisional instantaneous value of the desired floor reaction force; desired floor reaction force correction amount calculating means (the block 34b shown in FIG. 34) for calculating a correction amount of at least the desired floor reaction force (the simplified model's ZMP correction amount shown in FIG. 34) based on at least the calculated difference; model input correcting means (the addition point 34c shown in FIG. 34) for additionally inputting the calculated correction amount to the first dynamic model; and desired instantaneous value determining means (the gait generator (with full-model correction) 100, in particular to determine the simplified model's body position shown in FIG. 34 as the corrected desired body position and to determine the output of the addition point 34a as the ZMP-converted value of full-model's corrected moment about the desired ZMP) for determining desired instantaneous values of the desired movement and the desired floor reaction force (the corrected desired body position and the ZMP-converted value of full-model's corrected moment about the desired ZMP shown in FIG. 34) based on at least the input to and output from the second dynamic model.

The fourteenth embodiment is also arranged to have a system for generating an instantaneous value of motion including walking of a legged mobile robot 1 having at least a body 24 and a plurality of legs 2 each connected to the body, when the robot performs the motion, comprising: desired ZMP provisional instantaneous value determining means (the gait parameter determinator 100a, the desired (and provisional) instantaneous value generator 100b) for determining a provisional instantaneous value of at least a desired ZMP (the desired ZMP shown in FIG. 34) in a desired movement and the desired ZMP that constitute the motion; desired movement provisional instantaneous value calculating means (the calculation of the simplified model 100c1 shown in FIG. 34) for inputting at least the determined provisional instantaneous value of the desired ZMP to a first dynamic model that expresses a relationship between the movement of the robot and a ZMP, and for calculating a provisional instantaneous value of the desired movement (the simplified model's body position shown in FIG. 34); second model output calculating means (the calculation of the inverse full-model 100c2 shown in FIG. 34) for inputting at least the determined provisional instantaneous value of the desired movement to a second dynamic model that expresses a relationship between the movement of the robot and the ZMP, and for calculating an output of the second dynamic model (the full-model's ZMP shown in FIG. 34); ZMP difference calculating means (the addition point 34a shown in FIG. 34) for calculating a difference (the full-model ZMP's error shown in FIG. 34) between the calculated output of the second dynamic model and the determined provisional instantaneous value of the desired ZMP; desired ZMP correction amount calculating means (the block 34b shown in FIG. 34) for calculating a correction amount of at least the desired ZMP (the simplified model's ZMP correction amount shown in FIG. 34) based on at least the calculated difference; model input correcting means (the addition point 34c shown in FIG. 34) for additionally inputting the calculated correction amount to the first dynamic model; and desired instantaneous value determining means (the gait generator (with full-model correction) 100, in particular to determine the simplified model's body position shown in FIG. 34 as the corrected desired body position and to determine the output of the addition point 34a as the ZMP-converted value of full-model's corrected moment about the desired ZMP) for determining desired instantaneous values of the desired movement and the desired floor reaction force (the corrected desired body position and the ZMP-converted value of full-model's corrected moment about the desired ZMP shown in FIG. 34) based on at least the input to and output from the second dynamic model.

The fourteenth embodiment is further arranged to have a system for generating an instantaneous value of motion including walking of a legged mobile robot 1 having at least a body 24 and a plurality of legs 2 each connected to the body, when the robot performs the motion, comprising: desired ZMP provisional instantaneous value determining means (the gait parameter determinator 100a, the desired (and provisional) instantaneous value generator 100b) for determining a provisional instantaneous value of at least a desired ZMP (the desired ZMP shown in FIG. 34) in a desired movement and the desired ZMP that constitute the motion; desired movement provisional instantaneous value calculating means (the calculation of the simplified model 100c1 shown in FIG. 34) for inputting at least the determined provisional instantaneous value of the desired ZMP to a first dynamic model that expresses a relationship between the movement of the robot and a ZMP, and for calculating a provisional instantaneous value of the desired movement (the simplified model's body position shown in FIG. 34); second model output calculating means (the calculation of the inverse full-model 100c2 and the addition point 34a shown in FIG. 34) for inputting at least the calculated provisional instantaneous value of the desired movement and the determined provisional instantaneous value of the desired ZMP to a second dynamic model that expresses a relationship between the movement of the robot and a floor reaction force's moment about a point of action of the floor reaction force, and for calculating an output of the second dynamic model as a floor reaction force's moment about the instantaneous value of the desired ZMP (the full-model's ZMP shown in FIG. 34); desired ZMP correction amount calculating means (the block 34b shown in FIG. 34) for calculating a correction amount of at least the desired ZMP (the simplified model's ZMP correction amount shown in FIG. 34) based on at least the calculated output of the second dynamic model; model input correcting means (the addition point 34c shown in FIG. 34) for additionally inputting the calculated correction amount to the first dynamic model; and desired instantaneous value determining means (the gait generator (with full-model correction) 100, in particular to determine the simplified model's body position shown in FIG. 34 as the corrected desired body position and to determine the output of the addition point 34a as the ZMP-converted value of full-model's corrected moment about the desired ZMP) for determining desired instantaneous values of the desired movement and the desired ZMP (the corrected desired body position and the ZMP-converted value of full-model's corrected moment about the desired ZMP shown in FIG. 34)based on at least the input to and output from the second dynamic model. The fifteenth embodiment is arranged such that, in addition to the arrangement of the fourteenth embodiment, it further includes: desired movement correction amount calculating means (the perturbation model control law 36b, the addition point 36c, the block 36d, the distributor 36e, the addition point 36f, the perturbation model 36g shown in FIG. 36) for calculating a correction amount of at least the desired movement (the perturbation model's body position shown in FIG. 36) based on at least the calculated difference; and second model input correcting means (the addition point 36h shown in FIG. 36) for additionally inputting the calculated correction amount of the desired movement to the second dynamic model.

Further, it is arranged such that, the desired movement correction amount calculating means includes: a perturbation model (the perturbation model 36g shown in FIG. 36) that expresses a dynamic relationship between perturbation of the floor reaction force and perturbation of the movement of the robot; first feedback amount calculating means (the perturbation model control law 36b shown in FIG. 36) for calculating a first feedback amount (the feedback amount for controlling the perturbation model shown) based on at least one of a quantity of state of the perturbation model (e.g., the perturbation model's body position and/or velocity) and a quantity of state of the dynamic model (e.g., the dynamic model's center of gravity position); and second feedback amount calculating means (the addition point 36c, the integrator 36d and the distributor 36e shown in FIG. 36) for calculating a second feedback amount (perturbation model's ZMP correction amount shown in FIG. 36) based on at least a difference between the calculated difference (or the output of the model) and the first feedback amount; and calculates the correction amount of the desired movement by inputting a sum of the first and second feedback amounts to the perturbation model (the addition point 36f and the perturbation model 36g shown in FIG. 36).

The sixteenth embodiment is arranged to have a system for generating an instantaneous value of motion including walking of a legged mobile robot 1 having at least a body 24 and a plurality of legs 2 each connected to the body, when the robot performs the motion, comprising: provisional instantaneous value determining means (the gait parameter determinator 100a and the desired (and provisional) instantaneous value generator 100b shown in FIG. 5, the calculation of the simplified model 100c1 shown in FIG. 37) for determining provisional instantaneous values of a desired movement and a desired floor reaction force that constitute the motion; model movement instantaneous value calculating means (the calculation of the direct full-model 100c2 shown in FIG. 37) for inputting the determined provisional instantaneous value of the desired floor reaction force to a dynamic model that expresses a relationship between the movement of the robot and a floor reaction force, and for calculating an instantaneous value of the dynamic model's movement; model movement difference calculating means (the addition point 37a shown in FIG. 37) for calculating a difference between the instantaneous value of the dynamic model's movement and the determined provisional instantaneous value of the desired movement; correction amount calculating means (the model-followup feedback control law 37b shown in FIG. 37) for calculating a correction amount based on the difference such that the difference approaches zero; model input correcting means (the addition point 37c shown in FIG. 37) for additionally inputting the calculated correction amount to the dynamic model; and desired instantaneous value determining means (the gait generator (with full-model correction) 100, in particular to determine the output of the direct full-model 100c2 shown in FIG. 37 as the corrected desired body position and to determine the output of the model-followup feedback control law 37b shown in FIG. 37 as the ZMP-converted value of full-model's corrected moment about the desired ZMP) for determining desired instantaneous values of the desired movement and the desired floor reaction force based on at least the input to and the output from the dynamic model.

The sixteenth embodiment is also arranged to have a system for generating an instantaneous value of motion including walking of a legged mobile robot 1 having at least a body 24 and a plurality of legs 2 each connected to the body, when the robot performs the motion, comprising: desired floor reaction force provisional instantaneous value determining means (the gait parameter determinator 100a and the desired (and provisional) instantaneous value generator 100b shown in FIG. 5) for determining a provisional instantaneous value of a desired floor reaction force that constitutes the motion; desired movement instantaneous value determining means (gait parameter determinator 100a and desired (and provisional) instantaneous value generator 100b shown in FIG. 5, the calculation of the simplified model 100c1 shown in FIG. 37) for determining an instantaneous value of a desired movement that constitutes the motion; model movement instantaneous value calculating means (the calculation of the direct full-model 100c2 shown in FIG. 37) for inputting at least the determined provisional instantaneous value of the desired floor reaction force to a dynamic model that expresses a relationship between the movement of the robot and a floor reaction force, and for calculating an instantaneous value of the dynamic model's movement; model movement difference calculating means (the addition point 37a shown in FIG. 37) for calculating a difference between the instantaneous value of the dynamic model's movement and the instantaneous value of the desired movement; correction amount calculating means (the model-followup feedback control law 37b shown in FIG. 37) for calculating a correction amount based on the difference such that the difference approaches zero; model input correcting means (the addition point 37c shown in FIG. 37) for additionally inputting the calculated correction amount to the dynamic model; and desired floor reaction force instantaneous value determining means (100, in particular to determine the output of the model-followup feedback control law 37b shown in FIG. 37 as the ZMP-converted value of full-model's corrected moment about the desired ZMP) for determining a desired instantaneous value of the desired floor reaction force based on at least the input to the dynamic model.

The sixteenth embodiment is further arranged to have a system for generating an instantaneous value of motion including walking of a legged mobile robot 1 having at least a body 24 and a plurality of legs 2 each connected to the body, when the robot performs the motion, comprising: provisional instantaneous value determining means (100a and 100b, the calculation of the simplified model 100c1 shown in FIG. 37) for determining provisional instantaneous values of a desired movement and a desired ZMP that constitute the motion; model movement instantaneous value calculating means (the calculation of the direct full-model 100c2 shown in FIG. 37) for inputting at least the determined provisional instantaneous value of the desired ZMP to a dynamic model that expresses a relationship between the movement of the robot and a ZMP, and for calculating an instantaneous value of the dynamic model's movement; model movement difference calculating means (the addition point 37a shown in FIG. 37) for calculating a difference between the instantaneous value of the dynamic model's movement and the determined provisional instantaneous value of the desired movement; correction amount calculating means (37b) for calculating a correction amount based on the difference such that the difference approaches zero; model input correcting means (the addition point 37c) for additionally inputting the calculated correction amount to the dynamic model; and desired instantaneous value determining means (100, in particular to determine the output of the direct full-model shown in FIG. 37 as the corrected desired body position and to determine the output of the model-followup feedback control law 37b shown in FIG. 37 as the ZMP-converted value of full-model's corrected moment about the desired ZMP) for determining desired instantaneous values of the desired movement and the desired ZMP based on at least the input to and the output from the dynamic model.

The sixteenth embodiment is further arranged to have a system for generating an instantaneous value of motion including walking of a legged mobile robot 1 having at least a body 24 and a plurality of legs 2 each connected to the body, when the robot performs the motion, comprising: desired ZMP provisional instantaneous value determining means (100a and 100b) for determining provisional instantaneous values of a desired ZMP that constitutes the motion; desired movement instantaneous value determining means (100a and 100b, the calculation of the simplified model 100c1 shown in FIG. 37) for determining an instantaneous value of a desired movement that constitutes the motion; model movement instantaneous value calculating means (the calculation of the direct full-model 100c2 shown in FIG. 37) for inputting at least the determined instantaneous value of the desired ZMP to a dynamic model that expresses a relationship between the movement of the robot and a ZMP, and for calculating an instantaneous value of the dynamic model's movement; model movement difference calculating means (the addition point 37a) for calculating a difference between the instantaneous value of the dynamic model's movement and the instantaneous value of the desired movement; correction amount calculating means (37b) for calculating a correction amount based on the difference such that the difference approaches zero; model input correcting means (the addition point 37c) for additionally inputting the calculated correction amount to the dynamic model; and desired ZMP instantaneous value determining means (100, in particular to determine the output of the model-followup feedback control law 37b shown in FIG. 37 as the ZMP-converted value of full-model's corrected moment about the desired ZMP) for determining a desired instantaneous value of the desired ZMP based on at least the input to the dynamic model.

As mentioned above, the twenty-second embodiment is to have a system for generating an instantaneous value of motion including walking of a legged mobile robot 1 having at least a body 24 and a plurality of legs 2 each connected to the body, when the robot performs the motion, comprising: desired ZMP provisional instantaneous value determining means (100a and 100b) for determining a provisional instantaneous value of a desired ZMP that constitutes the motion; desired movement instantaneous value determining means (100a and 100b, the calculation of the simplified model 100c1 shown in FIG. 43) for determining an instantaneous value of a desired movement that constitutes the motion; model movement instantaneous value calculating means (the calculation of the direct full-model 100c2 shown in FIG. 43) for inputting at least the determined instantaneous value of the desired ZMP to a dynamic model that expresses a relationship among the movement of the robot, a point of action of a floor reaction force and a floor reaction force's moment about the point, and for calculating an instantaneous value of the dynamic model's movement; model movement difference calculating means (the addition point 43a) for calculating a difference between the instantaneous value of the dynamic model's movement and the instantaneous value of the desired movement; correction amount calculating means (the model-followup feedback control law 43b) for calculating a correction amount based on the difference such that the difference approaches zero; and desired instantaneous value determining means (100, in particular the block 43h and to determine the output of the model-followup feedback control law 43b shown in FIG. 43 as the ZMP-converted value of full-model's corrected moment about the desired ZMP) for inputting the calculated correction amount to the dynamic model as the floor reaction force's moment, and for determining the correction amount as a desired instantaneous value of corrected moment about the desired ZMP, while correcting the input to the model.

As mentioned above, the seventeenth embodiment is arranged to have a system for generating an instantaneous value of motion including walking of a legged mobile robot 1 having at least a body 24 and a plurality of legs 2 each connected to the body, when the robot performs the motion, comprising: desired floor reaction force instantaneous value determining means (the gait parameter determinator 100a and the desired (and provisional) instantaneous value generator 100b shown in FIG. 5) for determining an instantaneous value of at least a desired floor reaction force in a desired movement and the desired floor reaction force that constitute the motion; first model movement instantaneous value calculating means (the calculation of the simplified model 100c1 shown in FIG. 38) for inputting at least the determined instantaneous value of the desired floor reaction force to a first dynamic model that expresses a relationship between the movement of the robot and a floor reaction force, and for calculating an instantaneous value of the first dynamic model's movement; second model movement instantaneous value calculating means (the calculation of the direct full-model 100c2 shown in FIG. 38) for inputting at least the determined instantaneous value of the desired floor reaction force to a second dynamic model that expresses the relationship between the movement of the robot and the floor reaction force, and for calculating instantaneous value of the second dynamic model's movement; model movement difference calculating means (the addition point 38a shown in FIG. 38) for calculating a difference between the instantaneous value of the second dynamic model's movement and the instantaneous value of the first dynamic model's movement; correction amount calculating means (the model-followup feedback control law 38b shown in FIG. 38) for calculating a correction amount based on at least the difference such that the difference approaches zero; and first model input correcting means (the addition point 38c) for additionally inputting the calculated correction amount to the first dynamic model; and determines at least one of an output of the first dynamic model and an output of the second dynamic model as a desired instantaneous values of the desired movement (the gait generator (with full-model correction) 100 shown in FIG. 4, in particular to determine the output of the simplified model 100c1 or the output of the direct full-model 100c2 shown in FIG. 38 as the corrected desired body position).

The seventeenth embodiment is also arranged to have a system for generating an instantaneous value of motion including walking of a legged mobile robot 1 having at least a body 24 and a plurality of legs 2 each connected to the body, when the robot performs the motion, comprising: desired ZMP instantaneous value determining means (100a, 100b) for determining an instantaneous value of at least a desired ZMP in a desired movement and the desired ZMP that constitute the motion; first model movement instantaneous value calculating means (the calculation of the simplified model 100c1 shown in FIG. 38) for inputting at least the determined instantaneous value of the desired ZMP to a first dynamic model that expresses a relationship between the movement of the robot and a ZMP, and for calculating an instantaneous value of the first dynamic model's movement; second model movement instantaneous value calculating means (the calculation of the direct full-model 100c2 shown in FIG. 38) for inputting at least the determined instantaneous value of the desired ZMP to a second dynamic model that expresses the relationship between the movement of the robot and the ZMP, and for calculating instantaneous value of the second dynamic model's movement; model movement difference calculating means (the addition point 38a) for calculating a difference between the instantaneous value of the second dynamic model's movement and the instantaneous value of the first dynamic model's movement; correction amount calculating means (38b) for calculating a correction amount based on at least the difference such that the difference approaches zero; and first model input correcting means (38c) for additionally inputting the calculated correction amount to the first dynamic model; and determines at least one of an output of the first dynamic model and an output of the second dynamic model as a desired instantaneous values of the desired movement (the gait generator (100, in particular to determine the output of the simplified model 100c1 or the output of the direct full-model 100c2 shown in FIG. 38 as the corrected desired body position).

As mentioned above, the eighteenth embodiment is arranged to have a system for generating an instantaneous value of motion including walking of a legged mobile robot 1 having at least a body 24 and a plurality of legs 2 each connected to the body, when the robot performs the motion, comprising: desired floor reaction force instantaneous value determining means (100a, 100b) for determining an instantaneous value of at least a desired floor reaction force in a desired movement and the desired floor reaction force that constitute the motion; first model movement instantaneous value calculating means (the calculation of the direct full-model 100c2 shown in FIG. 39) for inputting at least the determined instantaneous value of the desired floor reaction force to a first dynamic model that expresses a relationship between the movement of the robot and a floor reaction force, and for calculating an instantaneous value of the first dynamic model's movement; second model state quantity calculating means (the block 39*a*) for calculating a quantity of state of a second dynamic model corresponding to the instantaneous value of the first dynamic model's movement; and desired motion parameter correcting means (S28 in the flow chart of FIG. 11) for correcting a parameter of a desired motion based on at least the quantity state of the second dynamic model; and determines an output of the first dynamic model as a desired instantaneous values of the desired movement (100, in particular to determine the output of the direct full-model 100*c*2 shown in FIG. 39 as the corrected desired body position).

The eighteenth embodiment is also arranged to have a system for generating an instantaneous value of motion including walking of a legged mobile robot 1 having at least a body 24 and a plurality of legs 2 each connected to the body, when the robot performs the motion, comprising: desired ZMP instantaneous value determining means (100*a*, 100*b*) for determining an instantaneous value of at least a desired ZMP in a desired movement and the desired ZMP that constitute the motion; first model movement instantaneous value calculating means (the calculation of the direct full-model 100*c*2 shown in FIG. 39) for inputting at least the determined instantaneous value of the desired ZMP to a first dynamic model that expresses a relationship between the movement of the robot and a ZMP, and for calculating an instantaneous value of the first dynamic model's movement; second model state quantity calculating means (39*a*) for calculating a quantity of state of a second dynamic model corresponding to the instantaneous value of the first dynamic model's movement; and desired motion parameter correcting means (S28 in the flow chart of FIG. 11) for correcting a parameter of a desired motion based on at least the quantity state of the second dynamic model; and determines an output of the first dynamic model as a desired instantaneous values of the desired movement (100, in particular to determine the output of the direct full-model 100*c*2 shown in FIG. 39 as the corrected desired body position).

As mentioned above, the nineteenth embodiment is arranged to have a system for generating an instantaneous value of motion including walking of a legged mobile robot 1 having at least a body 24 and a plurality of legs 2 each connected to the body, when the robot performs the motion, comprising: desired floor reaction force provisional instantaneous value determining means (100*a*, 100*b*) for determining a provisional instantaneous value of at least a desired floor reaction force in a desired movement and the desired floor reaction force that constitute the motion; first model movement instantaneous value calculating means (the calculation of the simplified model 100*c*1 shown in FIG. 40) for inputting at least the determined provisional instantaneous value of the desired floor reaction force to a first dynamic model that expresses a relationship between the movement of the robot and a floor reaction force, and for calculating an instantaneous value of the first dynamic model's movement; second model movement instantaneous value calculating means (the calculation of the direct full-model 100*c*2 shown in FIG. 40) for inputting at least the determined provisional instantaneous value of the desired floor reaction force to a second dynamic model that expresses the relationship between the movement of the robot and the floor reaction force, and for calculating an instantaneous value of the second dynamic model's movement; model movement difference calculating means (the addition point 40*a* shown in FIG. 40) for calculating a difference between the instantaneous value of the first dynamic model's movement and the instantaneous value of the second dynamic model's movement; first correction amount calculating means (the model-followup feedback control law 1 (40*b*)) for calculating a first correction amount based on the difference such that the difference approaches zero; second correction amount calculating means (the model-followup feedback control law 2 (40*c*)) for calculating a second correction amount based on the difference such that the difference approaches zero; first model input correcting means (the addition point 40*d*) for additionally inputting the calculated first correction amount to the first dynamic model; and second model input correcting means (the addition point 40*e*) for additionally inputting the calculated second correction amount to the second dynamic model; and determines at least one of an output of the first dynamic model and an output of a second dynamic model as a desired instantaneous values of the desired movement (100, in particular to determine the output of the simplified model 100*c*1 or the output of the direct full-model 100*c*2 shown in FIG. 40 as the corrected desired body position).

The nineteenth embodiment is also arranged to have a system for generating an instantaneous value of motion including walking of a legged mobile robot 1 having at least a body 24 and a plurality of legs 2 each connected to the body, when the robot performs the motion, comprising: desired ZMP provisional instantaneous value determining means (100*a*, 100*b*) for determining a provisional instantaneous value of at least a desired ZMP in a desired movement and the desired ZMP that constitute the motion; first model movement instantaneous value calculating means (the calculation of the simplified model 100*c*1 shown in FIG. 40) for inputting at least the determined provisional instantaneous value of the desired ZMP to a first dynamic model that expresses a relationship between the movement of the robot and a ZMP, and for calculating an instantaneous value of the first dynamic model's movement; second model movement instantaneous value calculating means (the calculation of the direct full-model 100*c*2 shown in FIG. 40) for inputting at least the determined provisional instantaneous value of the desired ZMP to a second dynamic model that expresses the relationship between the movement of the robot and the ZMP, and for calculating an instantaneous value of the second dynamic model's movement; model movement difference calculating means (the addition point 40*a*) for calculating a difference between the instantaneous value of the first dynamic model's movement and the instantaneous value of the second dynamic model's movement; first correction amount calculating means (40*b*) for calculating a first correction amount based on the difference such that the difference approaches zero; second correction amount calculating means (40*c*) for calculating a second correction amount based on the difference such that the difference approaches zero; first model input correcting means (the addition point 40*d*) for additionally inputting the calculated first correction amount to the first dynamic model; and second model input correcting means (the addition point 40*e*) for additionally inputting the calculated second correction amount to the second dynamic model; and determines at least one of an output of the first dynamic model and an output of a second dynamic model as a desired instantaneous values of the desired movement (100, in particular to determine the output of the simplified model 100*c*1 or the output of the direct full-model 100*c*2 shown in FIG. 40 as the corrected desired body position).

As mentioned above, the twenty-third embodiment is arranged to further include: a second perturbation model (the second perturbation model 44*a* shown in FIG. 44) that expresses a dynamic relationship between perturbation of the floor reaction force and perturbation of the movement of the robot; third feedback amount calculating means (the second perturbation model's control law 44b shown in FIG. 44) for calculating a third feedback amount based on at least one of a quantity of state of the second perturbation model and a quantity of state of the dynamic model; second feedforward amount calculating means (the second distributor 44c and the block 44d shown in FIG. 44) for calculating a difference between the desired instantaneous value of the determined desired floor reaction force or the desired ZMP, and the provisional instantaneous value of the desired floor reaction force or the desired ZMP to input, and for calculating a second feedforward amount such that the difference decreases; and third desired movement correction amount calculating means (the addition point 44e and the perturbation model 44a shown in FIG. 44) for inputting a sum of the third feedback amount and the second feedforward amount to the second perturbation model to calculate a third correction amount of the desired movement (the second perturbation model's body position shown in FIG. 44).

Further, it is arranged such that the third desired movement correction amount calculating means calculates the third correction amount of the desired movement, and calculates a third correction amount of the desired floor reaction force or the desired ZMP (the ZMP-converted value of full-model's corrected amount about the desired ZMP shown in FIG. 44) by adding a sum of the calculated third feedback amount and the second feedforward amount, to the difference between the desired instantaneous value of the determined desired floor reaction force or the desired ZMP, and the provisional instantaneous value of the desired floor reaction force or the desired ZMP.

Further, it is arranged such that the perturbation model comprises an inverted pendulum.

Further, it is arranged such that second perturbation model comprises an inverted pendulum.

Further, it is arranged to further include: desired motion parameter correcting means (S28 in the flow chart of FIG. 11) for determining or correcting a parameter of desired motion based on a quantity of state of the dynamic model (the dynamic model's poison and/or velocity).

It should further be noted that, in the foregoing embodiments, although the present invention has been described with reference to a biped robot, the present invention can also be applied to any other legged mobile robots having legs of three or more.

It should further be noted that, the present invention can be applied not only to actual robots, but also to the motion control or motion generation in virtual robots in simulation or in a computer game.

Industrial Field in Which the Invention is Applicable

According to the present invention, there is provided a motion generation system of a legged mobile robot, in which provisional instantaneous values of a desired movement and a desired floor reaction force or ZMP (that constitute a motion) are determined, a model's floor reaction force or ZMP is then calculated based on the determined provisional instantaneous values of the desired movement, using a dynamic model that expresses a relationship between the robot movement and the floor reaction force or ZMP, a difference between the calculated model's floor reaction force and the determined provisional instantaneous value of the desired floor reaction force, or a difference between the calculated model's ZMP and the determined instantaneous value of the desired ZMP is then calculated, and instantaneous values of the desired movement and the desired floor reaction force are determined by correcting at least the provisional instantaneous value of the desired movement based on the calculated difference such that the relationship between the movement and the floor reaction force expressed by the dynamic model is satisfied. With this, the system can generate a motion such as a gait that satisfies the dynamic equilibrium condition accurately, and can improve the stability during walking or operations.

Further, since the system is arranged such that, a desired movement that defines the robot motion is determined, a desired floor reaction force is then calculated based on the determined desired movement, using the dynamic model that expresses the relationship between the robot motion and the floor reaction force, and the floor reaction force actually acting on the robot is controlled based on the calculated desired floor reaction force, the system can generate a motion such as a gait that satisfies the dynamic equilibrium condition accurately, and can improve posture stability of the robot by controlling the robot to follow up the generated motion.

The invention claimed is:

1. A system for generating a desired instantaneous value of a desired movement of a legged mobile robot having at least a body and a plurality of legs each connected to the body, comprising:
   a. provisional instantaneous value determining means for determining provisional instantaneous values of the desired movement and a desired floor reaction force of the robot;
   b. model floor reaction force calculating means for inputting at least the determined provisional instantaneous value of the desired movement to a dynamic model that expresses a relationship between a movement of the robot and a floor reaction force and for calculating a model's floor reaction force that is a floor reaction force on the dynamic model;
   c. floor reaction force difference calculating means for calculating a difference between the calculated model's floor reaction force and the determined provisional instantaneous value of the desired floor reaction force;
   d. correction amount determining means for determining a correction amount of the desired floor reaction force for correcting the determined provisional instantaneous value of the desired floor reaction force and a correction amount of the desired movement for correcting the determined provisional instantaneous value of the desired movement; and
   e. desired instantaneous value determining means for determining the desired instantaneous value of the desired movement, by correcting the determined provisional instantaneous value of the desired movement based on at least the determined correction amount of the desired movement,
   wherein the correction amount determining means determines the correction amount of the desired floor reaction force and the correction amount of the desired movement based on the calculated difference, such that the floor reaction force presumably obtained if the provisional instantaneous value of the desired floor reaction force is corrected by the correction amount of the desired floor reaction force and the movement presumably obtained if the provisional instantaneous value of the desired movement is corrected by the correction amount of the desired movement, satisfy the dynamic equilibrium condition on the dynamic model, while preventing the correction amount of the desired movement from oscillating.

2. A system according to claim 1, wherein the correction amount determining means includes:
f. a perturbation model that expresses a dynamic relationship between perturbation of the floor reaction force and perturbation of the movement of the robot;
g. feedback amount calculating means for calculating a feedback amount as the correction amount of the desired floor reaction force based on at least one of a quantity of state of the perturbation model and a quantity of state of the dynamic model; and
h. feedforward amount calculating means for calculating a feedforward amount such that the calculated difference is canceled;
wherein the correction amount determining means determines the correction amount of the desired movement based on perturbation of the movement obtained by inputting a sum of the calculated feedback amount and the calculated feedforward amount to the perturbation model.

3. A system according to claim 2, wherein a floor reaction force that satisfies dynamic equilibrium condition on the dynamic model relative to the determined desired instantaneous value of the desired movement, is determined as the desired instantaneous value of the desired floor reaction force.

4. A system according to claim 2, wherein the perturbation model comprises an inverted pendulum.

5. A system according to claim 2, wherein the feedback amount calculating means calculates the feedback amount based on at least a position of the dynamic model's center of gravity.

6. A system according to claim 5, wherein a floor reaction force that satisfies dynamic equilibrium condition on the dynamic model relative to the determined desired instantaneous value of the desired movement, is determined as the desired instantaneous value of the desired floor reaction force.

7. A system according to claim 5, wherein the perturbation model comprises an inverted pendulum.

8. A system according to claim 1, further including:
α. a second perturbation model that expresses a dynamic relationship between perturbation of the floor reaction force and perturbation of the movement of the robot;
β. second feedback amount calculating means for calculating a second feedback amount based on at least one of a quantity of state of the second perturbation model and a quantity of state of the dynamic model;
γ. second feedforward amount calculating means for calculating a second feedforward amount based on the determined correction amount of the desired floor reaction force;
δ. second desired movement correction amount calculating means for inputting a sum of the calculated second feedback amount and the calculated second feedforward amount to the second perturbation model to calculate a second correction amount of the desired movement; and
x. desired movement instantaneous value correcting means for determining a final value of the desired instantaneous value of the desired movement by correcting the desired instantaneous value of the desired movement based on the calculated second correction amount of the desired movement.

9. A system according to claim 8, wherein the second perturbation model comprises an inverted pendulum.

10. A system according to claim 9, further including:
ε. desired movement parameter correcting means for determining or correcting a parameter of desired movement based on a quantity of state of the first dynamic model.

11. A system according to claim 1, wherein the provisional instantaneous value of the desired floor reaction force comprises a provisional instantaneous value of a desired ZMP.

12. A system according to claim 1, wherein the provisional instantaneous value of the desired floor reaction force comprises a provisional instantaneous value of a desired ZMP, and the calculated difference comprises a floor reaction force's moment that the model floor reaction force produces about the provisional instantaneous value of the desired ZMP.

13. A system for generating a desired instantaneous value of a desired movement of a legged mobile robot having at least a body and a plurality of legs each connected to the body, comprising:
a. provisional instantaneous value determining means for determining provisional instantaneous values of the desired movement and a desired floor reaction force of the robot;
b. model floor reaction force calculating means for inputting at least the determined provisional instantaneous value of the desired movement to a dynamic model that expresses a relationship between a movement of the robot and a floor reaction force and for calculating a model's floor reaction force that is a floor reaction force on the dynamic model;
c. floor reaction force difference calculating means for calculating a difference between the calculated model's floor reaction force and the determined provisional instantaneous value of the desired floor reaction force; and
d. desired instantaneous value determining means for determining the desired instantaneous values of the desired movement by correcting the determined provisional instantaneous value of the desired movement based on at least the calculated difference and for determining the desired instantaneous value of the desired floor reaction force by correcting the determined provisional instantaneous value of the desired floor reaction force;
wherein the desired instantaneous value determining means determines the desired instantaneous value of the desired movement and the desired instantaneous value of the desired floor reaction force based on at least the calculated difference, such that the desired instantaneous value of the desired movement and the desired instantaneous value of the desired floor reaction force satisfy the dynamic equilibrium condition on the dynamic model, while preventing a correction amount of the desired movement that is a second difference between the desired instantaneous value of the desired movement and the provisional instantaneous value of the desired floor reaction force, from oscillating.

14. A system according to claim 13, further including:
α. a perturbation model that expresses a dynamic relationship between perturbation of the floor reaction force and perturbation of the movement of the robot;
β. feedback amount calculating means for calculating a feedback amount based on at least one of a quantity of state of the perturbation model and a quantity of state of the dynamic model;

γ. feedforward amount calculating means for calculating a feedforward amount based on a difference between the determined desired instantaneous value of the desired floor reaction force and the determined provisional instantaneous value of the desired floor reaction force, such that the difference is canceled;

δ. second desired movement correction amount calculating means for inputting a sum of the calculated feedback amount and the calculated feedforward amount to the perturbation model to calculate a second correction amount of the desired movement; and x. desired movement instantaneous value correcting means for determining a final value of the desired instantaneous value of the desired movement by correcting the desired instantaneous value of the desired movement based on the calculated second correction amount of the desired movement.

15. A system according to claim 14, wherein the second perturbation model comprises an inverted pendulum.

16. A system according to claim 15, further including:
ε. desired movement parameter correcting means for determining or correcting a parameter of desired movement based on a quantity of state of the first dynamic model.

17. A system according to claim 13, wherein the provisional instantaneous value of the desired floor reaction force comprises a provisional instantaneous value of a desired ZMP.

18. A system according to claim 13, wherein the provisional instantaneous value of the desired floor reaction force comprises a provisional instantaneous value of a desired ZMP, and the calculated difference comprises a floor reaction force's moment that the model floor reaction force produces about the provisional instantaneous value of the desired ZMP.

19. A system for generating a desired instantaneous value of a desired movement of a legged mobile robot having at least a body and a plurality of legs each connected to the body, comprising:

a. provisional instantaneous value determining means for determining provisional instantaneous values of the desired movement and a desired floor reaction force of the robot;

b. model floor reaction force calculating means for inputting at least the determined provisional instantaneous value of the desired movement to a dynamic model that expresses a relationship between a movement of the robot and a floor reaction force and for calculating a model's floor reaction force that is a floor reaction force on the dynamic model;

c. floor reaction force difference calculating means for calculating a first difference between the calculated model's floor reaction force and the determined provisional instantaneous value of the desired floor reaction force;

d. desired movement correction amount determining means for determining at least a correction amount of the desired movement based on at least the calculated first difference;

e. model input adding means for additionally inputting the determined correction amount of the desired movement to the dynamic model as a feedback; and f. desired instantaneous value determining means for determining the desired instantaneous value of the desired movement based on at least the input to the dynamic model.

20. A system according to claim 19, wherein the desired movement correction amount determining means includes:

g. a perturbation model that expresses a dynamic relationship between perturbation of the floor reaction force and perturbation of the movement of the robot;

h. first feedback amount calculating means for calculating a first feedback amount based on at least one of a quantity of state of the perturbation model and a quantity of state of the dynamic model; and i. second feedback amount calculating means for calculating a second feedback amount based on at least a second difference between the calculated first difference and the calculated first feedback amount;

wherein said system is configured to determine the correction amount of the desired movement based on perturbation of the movement obtained by inputting a sum of the calculated first and second feedback amounts to the perturbation model.

21. A system according to claim 20, wherein a floor reaction force that satisfies dynamic equilibrium condition on the dynamic model relative to the determined desired instantaneous value of the desired movement, is determined as the desired instantaneous value of the desired floor reaction force.

22. A system according to claim 20, wherein the perturbation model comprises an inverted pendulum.

23. A system according to claim 20, wherein the first feedback amount calculating means calculates the first feedback amount based on at least the dynamic model's center of gravity position.

24. A system according to claim 23, wherein the perturbation model comprises an inverted pendulum.

25. A system according to claim 23, wherein a floor reaction force that satisfies dynamic equilibrium condition on the dynamic model relative to the determined desired instantaneous value of the desired movement, is determined as the desired instantaneous value of the desired floor reaction force.

26. A system according to new claim 23, wherein the second perturbation model comprises an inverted pendulum.

27. A system according to claim 26, further including:
ε. desired movement parameter correcting means for determining or correcting a parameter of desired movement based on a quantity of state of the first dynamic model.

28. A system according to claim 19, wherein a floor reaction force that satisfies dynamic equilibrium condition on the dynamic model relative to the determined desired instantaneous value of the desired movement, is determined as the desired instantaneous value of the desired floor reaction force.

29. A system according to claim 19, wherein the provisional instantaneous value of the desired floor reaction force comprises a provisional instantaneous value of a desired ZMP.

30. A system according to claim 19, wherein the provisional instantaneous value of the desired floor reaction force comprises a provisional instantaneous value of a desired ZMP, and the calculated difference comprises a floor reaction force's moment that the model floor reaction force produces about the provisional instantaneous value of the desired ZMP.

31. A system for generating a desired instantaneous value of a desired movement of a legged mobile robot having at least a body and a plurality of legs each connected to the body, comprising:

a. desired floor reaction force provisional instantaneous value determining means for determining a provisional instantaneous value of the desired floor reaction force;

b. desired movement provisional instantaneous value calculating means for inputting at least the determined provisional instantaneous value of the desired floor reaction force to a first dynamic model that expresses a relationship between the movement of the robot and a floor reaction force, and for calculating an output of the first dynamic model as a provisional instantaneous value of the desired movement;

c. second model floor reaction force calculating means for inputting at least the determined provisional instantaneous value of the desired movement to a second dynamic model that expresses the relationship between the movement of the robot and the floor reaction force, and for calculating an output of the second dynamic model as a model's floor reaction force;

d. floor reaction force difference calculating means for calculating a difference between the calculated model's floor reaction force and the determined provisional instantaneous value of the desired floor reaction force;

e. correction amount determining means for determining a correction amount of the floor reaction force based on at least the calculated difference;

f. model input adding means for additionally inputting the determined correction amount of the floor reaction force to the first dynamic model as a feedback; and g. desired instantaneous value determining means for determining the desired instantaneous value of the desired movement based on at least the input to the second dynamic model.

32. A system according to claim 31, further including:

h. desired movement correction amount determining means for determining a correction amount of the desired movement based on at least the calculated difference; and i. second model input adding means for additionally inputting the determined correction amount of the desired movement to the second dynamic model as a feedback.

33. A system according to claim 32, wherein a floor reaction force that satisfies dynamic equilibrium condition on the second dynamic model relative to the determined desired instantaneous value of the desired movement, is determined as the desired instantaneous value of the desired floor reaction force.

34. A system according to claim 32, wherein the desired movement correction amount determining means includes:

j. a perturbation model that expresses a dynamic relationship between perturbation of the floor reaction force and perturbation of the movement of the robot;

k. first feedback amount calculating means for calculating a first feedback amount based on at least one of a quantity of state of the perturbation model and a quantity of state of the dynamic model; and l. second feedback amount calculating means for calculating a second feedback amount based on at least a difference between the calculated difference and the calculated first feedback amount;

wherein the system is configured to determine the correction amount of the desired movement based on the perturbation of the movement obtained by inputting a sum of the calculated first and second feedback amounts to the perturbation model.

35. A system according to claim 34, wherein a floor reaction force that satisfies dynamic equilibrium condition on the second dynamic model relative to the determined desired instantaneous value of the desired movement, is determined as the desired instantaneous value of the desired floor reaction force.

36. A system according to claim 34, wherein the perturbation model comprises an inverted pendulum.

37. A system according to claim 34, further including:

ε. desired movement parameter correcting means for determining or correcting a parameter of desired movement based on a quantity of state of the first dynamic model.

38. A system according to claim 31, further including:

α. a perturbation model that expresses a dynamic relationship between perturbation of the floor reaction force and perturbation of the movement of the robot;

β. feedback amount calculating means for calculating a feedback amount based on at least one of a quantity of state of the perturbation model and a quantity of state of the dynamic model;

γ. feedforward amount calculating means for calculating a feedforward amount based on the determined correction amount of the desired floor reaction force;

δ. second desired movement correction amount calculating means for inputting a sum of the calculated feedback amount and the calculated feedforward amount to the perturbation model to calculate a second correction amount of the desired movement; and χ. desired movement instantaneous value correcting means for determining a final value of the desired instantaneous value of the desired movement by correcting the desired instantaneous value of the desired movement based on the calculated second correction amount of the desired movement.

39. A system according to claim 38, wherein the second perturbation model comprises an inverted pendulum.

40. A system according to claim 39, further including:

ε. desired movement parameter correcting means for determining or correcting a parameter of desired movement based on a quantity of state of the first dynamic model.

41. A system according to claim 31, wherein a floor reaction force that satisfies dynamic equilibrium condition on the second dynamic model relative to the determined desired instantaneous value of the desired movement, is determined as the desired instantaneous value of the desired floor reaction force.

42. A system according to claim 31, further including:

ε. desired movement parameter correcting means for determining or correcting a parameter of desired movement based on a quantity of state of the first dynamic model.

43. A system according to claim 31, wherein the provisional instantaneous value of the desired floor reaction force comprises a provisional instantaneous value of a desired ZMP.

44. A system according to claim 31, wherein the provisional instantaneous value of the desired floor reaction force comprises a provisional instantaneous value of a desired ZMP, and the calculated difference comprises a floor reaction force's moment that the model floor reaction force produces about the provisional instantaneous value of the desired ZMP.

45. A system for generating a desired instantaneous value of a desired movement of a legged mobile robot having at least a body and a plurality of legs each connected to the body, comprising:

a. provisional instantaneous value determining means for determining provisional instantaneous values of the desired movement and a desired floor reaction force of the robot;
b. model movement instantaneous value calculating means for inputting the determined provisional instantaneous value of the desired floor reaction force to a dynamic model that expresses a relationship between the movement of the robot and a floor reaction force, and for calculating an instantaneous value of the model's movement that is a movement on the dynamic model;
c. model movement difference calculating means for calculating a difference between the calculated instantaneous value of the model's movement and the determined provisional instantaneous value of the desired movement;
d. correction amount determining means for determining a correction amount of the desired floor reaction force based on the calculated difference;
e. model input adding means for additionally inputting the determined correction amount of the desired floor reaction to the dynamic model; and
f. desired instantaneous value determining means for determining the desired instantaneous value of the desired movement based on at least the calculated instantaneous value of the model's movement.

46. A system according to claim 45, further including:
α. a perturbation model that expresses a dynamic relationship between perturbation of the floor reaction force and perturbation of the movement of the robot;
β. feedback amount calculating means for calculating a feedback amount based on at least one of a quantity of state of the perturbation model and a quantity of state of the dynamic model;
γ. feedforward amount calculating means for calculating a feedforward amount based on the determined correction amount of the desired floor reaction force;
δ. desired movement correction amount calculating means for inputting a sum of the calculated feedback amount and the calculated feedforward amount to the perturbation model to calculate a correction amount of the desired movement; and
χ. desired movement instantaneous value correcting means for determining a final value of the desired instantaneous value of the desired movement by correcting the desired instantaneous value of the desired movement based on the determined correction amount of the desired movement.

47. A system according to claim 46, wherein the second perturbation model comprises an inverted pendulum.

48. A system according to claim 47, further including:
ε. desired movement parameter correcting means for determining or correcting a parameter of desired movement based on a quantity of state of the first dynamic model.

49. A system according to claim 45, wherein the provisional instantaneous value of the desired floor reaction force comprises a provisional instantaneous value of a desired ZMP.

50. A system according to claim 45, wherein the provisional instantaneous value of the desired floor reaction force comprises a provisional instantaneous value of a desired ZMP, and the calculated difference comprises a floor reaction force's moment that the model floor reaction force produces about the provisional instantaneous value of the desired ZMP.

51. A system for generating a desired instantaneous value of a desired movement of a legged mobile robot having at least a body and a plurality of legs each connected to the body, comprising:
a. desired floor reaction force provisional instantaneous value determining means for determining a provisional instantaneous value of a desired floor reaction force of the robot;
b. first model movement instantaneous value calculating means for inputting at least the determined provisional instantaneous value of the desired floor reaction force to a first dynamic model that expresses a relationship between the movement of the robot and a floor reaction force, and for calculating an instantaneous value of the first dynamic model's movement;
c. second model movement instantaneous value calculating means for inputting at least the determined provisional instantaneous value of the desired floor reaction force to a second dynamic model that expresses the relationship between the movement of the robot and the floor reaction force, and for calculating an instantaneous value of the second dynamic model's movement;
d. model movement difference calculating means for calculating a difference between the calculated instantaneous value of the second dynamic model's movement and the calculated instantaneous value of the first dynamic model's movement;
e. first correction amount determining means for determining a first correction amount of the floor reaction force based on at least the calculated difference; and
f. first model input adding means for additionally inputting the determined first correction amount of the floor reaction force to the first dynamic model as a feedback;
wherein the system is configured to determine at least one of the calculated instantaneous value of first dynamic model's movement and the calculated instantaneous value of the second dynamic model's movement as the desired instantaneous values of the desired movement.

52. A system according to claim 51, further including:
h. second correction amount determining means for determining a second correction amount of the floor reaction force based on at least the calculated difference; and
i. second model input adding means for additionally inputting the determined second correction amount of the floor reaction force to the second dynamic model as a feedback.

53. A system according to claims 52, wherein a floor reaction force that satisfies dynamic equilibrium condition on the second dynamic model relative to the determined desired instantaneous value of the desired movement, is determined as the desired instantaneous value of the desired floor reaction force.

54. A system according to claim 52, further including:
ε. desired motion parameter correcting means for determining or correcting a parameter of desired movement based on a quantity of state of the first dynamic model.

55. A system according to claim 51, further including:
α. a perturbation model that expresses a dynamic relationship between perturbation of the floor reaction force and perturbation of the movement of the robot;
β. feedback amount calculating means for calculating a feedback amount based on at least one of a quantity of state of the perturbation model and a quantity of state of the dynamic model;
γ. feedforward amount calculating means for calculating a feedforward amount based on the determined correction amount of the desired floor reaction force;

δ. desired movement correction amount calculating means for inputting a sum of the calculated feedback amount and the calculated feedforward amount to the perturbation model to calculate a correction amount of the desired movement; and x. desired movement instantaneous value correcting means for determining a final value of the desired instantaneous value of the desired movement by correcting the desired instantaneous value of the desired movement based on the calculated correction amount of the desired movement.

56. A system according to claims 51, wherein a floor reaction force that satisfies dynamic equilibrium condition on the second dynamic model relative to the determined desired instantaneous value of the desired movement, is determined as the desired instantaneous value of the desired floor reaction force.

57. A system according to claim 51, further including:

ε. desired movement parameter correcting means for determining or correcting a parameter of desired movement based on a quantity of state of the first dynamic model.

58. A system according to claim 51, wherein the provisional instantaneous value of the desired floor reaction force comprises a provisional instantaneous value of a desired ZMP.

59. A system according to claim 51, wherein the provisional instantaneous value of the desired floor reaction force comprises a provisional instantaneous value of a desired ZMP, and the calculated difference comprises a floor reaction force's moment that the model floor reaction force produces about the provisional instantaneous value of the desired ZMP.

* * * * *

UNITED STATES PATENT AND TRADEMARK OFFICE
CERTIFICATE OF CORRECTION

PATENT NO. : 7,120,518 B2
APPLICATION NO. : 10/476153
DATED : October 10, 2006
INVENTOR(S) : Toru Takenaka et al.

It is certified that error appears in the above-identified patent and that said Letters Patent is hereby corrected as shown below:

Col. 62 Claim 26, line 1, "...to new claim 23..." should read --...to claim 23, ...--

Col. 65 Claim 45, line 27, "...reaction to..." should read --...reaction force to...--

Col. 66 Claim 51, line 35, "...of first..." should red --...of the first...--

Col. 66 Claim 53, line 1, "...claims..." should read --...claim...--

Col. 67 Claim 56, line 1, "...claims..." should read --...claim...--

Signed and Sealed this

Thirtieth Day of January, 2007

JON W. DUDAS
*Director of the United States Patent and Trademark Office*